United States Patent
Guo et al.

(10) Patent No.: US 10,015,515 B2
(45) Date of Patent: Jul. 3, 2018

(54) INTRA PREDICTION FROM A PREDICTIVE BLOCK

(71) Applicant: QUALCOMM Incorporated, San Diego, CA (US)

(72) Inventors: Liwei Guo, San Diego, CA (US); Chao Pang, San Diego, CA (US); Woo-Shik Kim, San Diego, CA (US); Wei Pu, San Diego, CA (US); Joel Sole Rojals, La Jolla, CA (US); Rajan Laxman Joshi, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 158 days.

(21) Appl. No.: 14/309,730

(22) Filed: Jun. 19, 2014

(65) Prior Publication Data

US 2014/0376634 A1    Dec. 25, 2014

Related U.S. Application Data

(60) Provisional application No. 61/838,209, filed on Jun. 21, 2013, provisional application No. 61/847,549, (Continued)

(51) Int. Cl.
*H04N 11/02* (2006.01)
*H04N 19/52* (2014.01)
(Continued)

(52) U.S. Cl.
CPC ........... *H04N 19/52* (2014.11); *H04N 19/105* (2014.11); *H04N 19/154* (2014.11);
(Continued)

(58) Field of Classification Search
CPC ....................................................... H04N 19/52
(Continued)

(56) References Cited

U.S. PATENT DOCUMENTS

| | | | | | |
|---|---|---|---|---|---|
| 5,987,180 | A | * | 11/1999 | Reitmeier | G06T 7/2026 348/E5.003 |
| 6,091,777 | A | * | 7/2000 | Guetz | H04N 19/172 375/240.03 |

(Continued)

FOREIGN PATENT DOCUMENTS

| | | |
|---|---|---|
| GB | 2495990 | 5/2013 |
| JP | 2010219842 A | 9/2010 |

(Continued)

OTHER PUBLICATIONS

Wiegand et al., "WD1: Working Draft 1 of High-Efficiency Video Coding", JCTVC-C403, 3rd Meeting: Guangzhou, CN, Oct. 7-15, 2010, 137 pp.

(Continued)

*Primary Examiner* — Leron Beck
(74) *Attorney, Agent, or Firm* — Shumaker & Sieffert, P.A.

(57) ABSTRACT

Techniques coding video data, including a mode for intra prediction of blocks of video data from predictive blocks of video data within the same picture, may include determining a predictive block of video data for the current block of video data, wherein the predictive block of video data is a reconstructed block of video data within the same picture as the current block of video data. A two-dimensional vector, which may be used by a video coder to identify the predictive block of video data, includes a horizontal displacement component and a vertical displacement component relative to the current block of video data. The mode for intra prediction of blocks of video data from predictive blocks of (Continued)

video data within the same picture may be referred to as Intra Block Copy or Intra Motion Compensation.

84 Claims, 19 Drawing Sheets

Related U.S. Application Data filed on Jul. 17, 2013, provisional application No. 61/866,965, filed on Aug. 16, 2013, provisional application No. 61/870,050, filed on Aug. 26, 2013, provisional application No. 61/883,612, filed on Sep. 27, 2013, provisional application No. 61/887,115, filed on Oct. 4, 2013, provisional application No. 61/893,539, filed on Oct. 21, 2013, provisional application No. 61/896,013, filed on Oct. 25, 2013, provisional application No. 61/923,698, filed on Jan. 5, 2014.

(51) Int. Cl.
```
H04N 19/593    (2014.01)
H04N 19/82     (2014.01)
H04N 19/563    (2014.01)
H04N 19/105    (2014.01)
H04N 19/176    (2014.01)
H04N 19/70     (2014.01)
H04N 19/513    (2014.01)
H04N 19/186    (2014.01)
H04N 19/154    (2014.01)
H04N 19/523    (2014.01)
H04N 19/55     (2014.01)
```
(52) U.S. Cl.
CPC ......... *H04N 19/176* (2014.11); *H04N 19/186* (2014.11); *H04N 19/513* (2014.11); *H04N 19/523* (2014.11); *H04N 19/55* (2014.11); *H04N 19/563* (2014.11); *H04N 19/593* (2014.11); *H04N 19/70* (2014.11); *H04N 19/82* (2014.11)

(58) Field of Classification Search
USPC ...................................... 375/240.01–240.29
See application file for complete search history.

(56) References Cited

U.S. PATENT DOCUMENTS

| | | | |
|---|---|---|---|
| 6,133,955 A * | 10/2000 | Han | G06T 9/20 375/240.16 |
| 6,665,344 B1 * | 12/2003 | Fimoff | H04N 19/176 375/240.2 |
| 7,899,115 B2 * | 3/2011 | Jeon | H04N 19/105 375/240.1 |
| 8,199,815 B2 | 6/2012 | Kim et al. | |
| 8,208,557 B2 * | 6/2012 | Lee | H04N 19/105 375/240.01 |
| 8,406,299 B2 | 3/2013 | Karczewicz | |
| 8,537,897 B2 * | 9/2013 | Lee | H04N 19/513 375/240.01 |
| 8,548,062 B2 * | 10/2013 | Ma | H04N 19/176 375/240.25 |
| 9,398,292 B2 * | 7/2016 | Agthe | H04N 19/159 |
| 2003/0194009 A1 * | 10/2003 | Srinivasan | H04N 19/523 375/240.16 |
| 2008/0031333 A1 * | 2/2008 | Li | H04N 19/56 375/240.16 |
| 2008/0159390 A1 * | 7/2008 | Lu | H04N 19/105 375/240.16 |
| 2010/0118940 A1 | 5/2010 | Yin et al. | |
| 2010/0232505 A1 | 9/2010 | Thoreau et al. | |
| 2012/0218442 A1 * | 8/2012 | Jandhyala | G06T 7/20 348/239 |
| 2012/0307905 A1 * | 12/2012 | Kim | H04N 19/52 375/240.16 |
| 2013/0034157 A1 * | 2/2013 | Helle | H04N 19/52 375/240.12 |
| 2013/0101033 A1 | 4/2013 | Joshi et al. | |
| 2013/0208814 A1 * | 8/2013 | Argyropoulos | H04N 17/004 375/240.27 |
| 2015/0016533 A1 | 1/2015 | Pang et al. | |
| 2015/0195559 A1 | 7/2015 | Chen et al. | |
| 2015/0271515 A1 | 9/2015 | Pang et al. | |

FOREIGN PATENT DOCUMENTS

| | | |
|---|---|---|
| JP | 2010233263 A | 10/2010 |
| JP | 2013059132 A | 3/2013 |
| WO | 2008131042 A1 | 10/2008 |
| WO | 2013077659 A1 | 5/2013 |

OTHER PUBLICATIONS

Wiegand et al., "WD2: Working Draft 2 of High-Efficiency Video Coding," JCTVC-D503, 4th Meeting: Daegu, KR, Jan. 20-28, 2011, 153 pp.
Wiegand et al., "WD3: Working Draft 3 of High-Efficiency Video Coding," Document JCTVC-E603, 5th Meeting: Geneva, CH, Mar. 16-23, 2011, 193 pp.
Bross et al., "WD4: Working Draft 4 of High-Efficiency Video Coding," 6th Meeting: JCTVC-F803_d2, Torino, IT, Oct. 4, 2011, 226 pp.
Bross et al., "WD5: Working Draft 5 of High-Efficiency Video Coding," 7th Meeting: Geneva, Switzerland, Dec. 30, 2011, JCTVC-G1103_d2, 214 pp.
Bross et al., "High efficiency video coding (HEVC) text specification draft 6," 8th Meeting: San Jose, CA, USA, Feb. 1-10, 2012, JCTVC-H1003, 259 pp.
Bross et al., "High efficiency video coding (HEVC) text specification draft 7," 9th Meeting: Geneva, CH, Apr. 27-May 7, 2012, JCTVC-I1003_d2, 290 pp.
Bross et al., "High efficiency video coding (HEVC) text specification draft 8," 10th Meeting: Stockholm, SE, Jul. 9, 2012, JCTVC-J1003_d7, 261 pp.
Bross et al., "High efficiency video coding (HEVC) text specification draft 9," 11th Meeting: Shanghai, CN, Nov. 2, 2012, JCTVC-K1003_v7, 290 pp.
Bross et al., "High efficiency video coding (HEVC) text specification draft 10 (for FDIS & Last Call)," 12th Meeting: Geneva, CH, Mar. 19, 2013, JCTVC-L1003_v34, 310 pp.
ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.
ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.
ITU-T H.265, Series H: Audiovisual and Multimedia Systems, Infrastructure of audiovisual services—Coding of moving video, Advanced video coding for generic audiovisual services, The International Telecommunication Union. Oct. 2014, 540 pp.
ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.
Bjontegaard, "Simplified chroma interpolation", VCEG Meeting; MPEG Meeting; Jan. 16-18, 2005; Hongkong, CN; (Video Coding Experts Group of ITU-T SG.16), No. VCEG-Y09, XP030003438, 2 pp.
Bjontegaard, "Modified simple chroma interpolation", VCEG Meeting; MPEG Meeting; Apr. 16-22, 2005; Busan,KR; (Video Coding Experts Group of ITU-T SG.16), No. VCEG-Z08, XP030003453, 2 pp.

(56) References Cited

OTHER PUBLICATIONS

Budagavi et al., "AHG8: Video coding using Intra motion compensation", JCT-VC Meeting; MPEG Meeting; Apr. 18-26, 2013; Incheon; (Joint Collaborative Team on Video Coding of ISO/IEC JTC1/SC29/WG11 and ITU-T SG.16); URL: http://wftp3.itu.int/av-arch/jctvc-site/, No. JCTVE-M0350, XP030114307, 3 pp.

"H.261, Video Codec for Audiovisual Services AT p×64 kbit/s", No. H.261, Mar. 1993, XP030001504, 29 pp.

Lee, et al., "Cross-check of intra motion compensation by TI (JCTVC-M0350)", JCT-VC Meeting; MPEG Meeting; Apr. 18-26, 2013; Incheon; (Joint Collabarative Team on Video Coding of ISO/IEC JTC1/SC29/WG11 and ITU-T SG.16); URL: http:wftp3.itu.int/av-arch/jctvc-site/, No. JCTV-M0416, XP030114373, 2 pp.

Yu "New Intra Prediction using Self-Frame MCP", JVT Meeting; MPEG Meeting; May 6-10, 2002; Fairfax,US; (Joint Video Team of ISO/IEC JTC1/SC29/WG11 and ITU-T SG.16), No. JVT-C151r1-L, XP030005267, 10 pp.

Budagavi, et al., "AHG8: Video coding using Intra motion compensation," (Joint Collaborative Team on Video Coding of ISO/IEC JTC1/SC29/WG11 and ITU-T SG.16); Apr. 18-26, 2013, Document: JCTVC-M0350, 5 pp.

Dai, et al., "Fast 2D intra prediction (2DIP) mode decision for image and video coding", Image Processing (ICIP), 2009 16th IEEE International Conference on, IEEE, Piscataway, NJ, USA, Nov. 2009, XP031628875, ISBN: 978-1-4244-5653-6., pp. 2825-2828.

He, et al., "Non-CE2: Unification of IntraBC mode with inter mode," JCT-VC Meeting; Oct. 17-24, 2014; Strasbourg; (Joint Collaborative Team on Video Coding of ISO/IEC JTC1/SC29/WG11 and ITU-T SG.16); URL: http://wftp3.itu.int/av-arch/jctvc-site/ No. JCTVC-S0172-v3, XP030116950, 8 pp.

He, et al., "Non-SCCE1: Improved intra block copy coding with block vector Derivation," JCT-VC Meeting; Jun. 30-Jul. 9, 2014; Sapporo; (Joint Collaborative Team on Video Coding of ISO/IEC JTC1/SC29/WG11 and ITU-T SG.16); URL: http://wftp3.itu.int/av-arch/jctvc-site/, No. JCTVC-R0165, XP030116449, 8 pp.

Lin, et al., "Improved Advanced Motion Vector Prediction, " JCT-VC Meeting; MPEG Meeting; Jan. 20-28, 2011; MEGU; (Joint Collaborative Team on Video Coding of ISO/IEC JTC1/SC29/WG11and ITU-T SG.16); <URL: http://wftp3.itu.int/av-arch/jc tvc-site/>, No. JCTVC-D125, XP030008165, ISSN: 0000-0015; 8 pp.

Ma, et al., "Enhanced block vector predictor list construction for Intra block copy," JCT-VC Meeting; Oct. 17-25, 2014; Strasbourg; (Joint Collaborative Team on Video Coding of ISO/IEC JTC1/SC29/WG11 and ITU-T SG.16); URL: http://wftp3.itu.int/av-arch/jctvc-site/, No. JCTVC-S0093, XP030116837, 4 pp.

Naccari et al., "HEVC Range Extensions Test Model 5 Encoder Description", JCT-VC Meeting; Oct. 23-Nov. 1, 2013; Geneva; (Joint Collaborative Team on Video Coding of ISO/IEC JTC1/SC29/WG11 and ITU-T SG.16); URL: http://wftp3.itu.int/av-arch/jctvc-site/, No. JCTVC-01013, XP030115465, 16 pp.

Naccari et al., "HEVC Range Extensions Test Model 6 Encoder Description", JCT-VC Meeting; Jan. 9-17, 2014; San Jose; (Joint Collaborative Team on Video Coding of ISO/IEC JTC1/SC29/WG11 and ITU-T SG.16); URL: http://wftp3.itu.int/av-arch/jctvc-site/, No. JCTVC-P1013, XP030115885, 20 pp.

Pang, et al., "Block vector prediction method for Intra block copy", JCT-VC Meeting; Mar. 27-Apr. 4, 2014; Valencia; (Joint Collaborative Team on Video Coding of ISO/IEC JTC1/SC29/WG11 and ITU-T SG.16); URL: http://wftp3.itu.int/av-arch/jctvc-site/, No. JCTVC-Q0114-v3, XP030116035, 3 pp.

Pang, et al., "SCCE1: Test 3.1—Block vector prediction method for Intra block copy", JCT-VC Meeting; Jun. 30-Jul. 9, 2014; Sapporo; (Joint Collaborative Team on Video Coding of ISO/IEC JTC1/SC29/WG11 and ITU-T SG.16); URL: http://wftp3.itu.int/av-arch/jctvc-site/, No. JCTVC-R0185-v2, XP030116475, 8 pp.

Pang et al., "Non-RCE3: 2-D MV Supported Intra Motion Compensation", JCT-VC Meeting; Jul. 25-Aug. 2, 2013; Vienna; (Joint Collaborative Team on Video Coding of ISO/IEC JTC1/SC29/WG11 and ITU-T SG.16); URL: http://wftp3.itu.int/av-arch/jctvc-site/,, No. JCTVC-N0256, XP030114776, 5 pp.

Pang, et al., "Non-RCE3: Block vector signaling for intra block copy", JCT-VC Meeting; Jan. 9-17, 2014; San Jose; (Joint Collaborative Team on Video Coding of ISO/IEC JTC1/SC29/WG11 and ITU-TSG.16); URL: http://wftp3.itu.int/av-arch/jctvc-site/, No. JCTVC-P0149, XP030115663, 7 pp.

Pang, et al., "Non-RCE3: Pipeline Friendly Intra Motion Compensation", JCT-VC Meeting; Jul. 25-Aug. 2, 2013; Vienna; (Joint Collaborative Team on Video Coding of ISO/IEC JTC1/SC29/WG11 and ITU-T-SG.16); URL: http://wftp3.itu.int/av-arch/jctvc-site/,, No. JCTVC-N0254-v5, XP030114774, 9 pp.

Pang, et al., "Non-SCCE1: Combination of JCTVC-R0185 and JCTVC-R0203", JCT-VC Meeting; Jun. 30-Jul. 9, 2014; Sapporo; (Joint Collaborative Team on Video Coding of ISO/IEC JTC1/SC29/WG11 and ITU-T SG.16); URL: http://wftp3.itu.int/av-arch/jctvc-site/, No. JCTVC-R0309-v5, XP030116626, 7 pp.

Park, et al., "AHG5: Intra Motion Vector Coding," JCT-VC Meeting; Oct. 23-Nov. 1, 2013; Geneva; (Joint Collaborative Team on Video Coding of ISO/IEC JTC1/SC29/WG11 and ITU-T SG.16); URL: http://wftp3.itu.int/av-arch/jctvc-site/, No. JCTVC-O0167-v3, XP030115194, 17 pp.

Rosewarne, et al., "BoG report on Range Extensions", JCT-VC Meeting; Jan. 9-17, 2014; San Jose; (Joint Collaborative Team on Video Coding of ISO/IEC JTC1/SC29/WG11 and ITU-T SG.16); URL: http://wftp3.itu.int/av-arch/jctvc-site/, No. JCTVC-P0288-v4, XP030115839, 36 pp.

Sullivan, et al., "Meeting Report of 13th JCT-VC Meeting", JCT-VC Meeting; MPEG Meeting; Apr. 18-26, 2013; Incheon; (Joint Collaborative Team on Video Coding of ISO/IEC JTC1/SC29/WG11 and ITU-T SG.16); URL: http://wftp3.itu.int/av-arch/jctvc-site/,, No. JCTVC-M1000, XP030114425, pp. 216.

Sullivan, et al., "Overview of the High Efficiency Video Coding (HEVC) Standard", IEEE Transactions on Circuits and Systems for Video Technology, IEEE Service Center, Piscataway, NJ, US, vol. 22, No. 12, Dec. 2012; XP011487803, ISSN: 1051-8215, pp. 1649-1668.

Xu, et al., "SCCE1 Test 3.4: IntraBC BV prediction," JCT-VC Meeting; Jun. 30-Jul. 9, 2014; Sapporo; (Joint Collaborative Team on Video Coding of JSO/IEC JTC1/SC29/WG11 and ITU-T SG.16); URL: http://wftp3.itu.int/av-arch/jctvc-site/, No. JCTVC-R0061, XP030116305, 4 pp.

Xu, et al., "On unification of intra block copy and inter-picture motion compensation," JCT-VC Meeting; Jan. 9-17, 2014; Valencia; (Joint Collaborative Team on Video Coding of ISO/IEC JTC1/SC29/WG11 and ITU-T SG.16); URL: http://wftp3.itu.int/av-arch/jctvc-site/, No. JCTVC-Q0132-v5, XP030116062, 14 pp.

Kim, et al., "High Efficiency Video Coding (HEVC) Test Model 12 (HM 12) Encoder Description", JCT-VC Meeting; Jul. 25-Aug. 2013; Vienna; (Joint Collaborative Team on Video Coding of ISO/IEC JTC1/SC29/WG11 and ITU-T SG.16); URL: http://wftp3.itu.int/av-arch/jctvc-site/, No. JCTVC-N1002, XP030114946, 36 pp.

Tech, et al., "MV-HEVC Draft Text 5", Joint Collaborative Team on 3D Video Coding Extension Development of ITU-T SG 16 WP 3 and ISO/IEC JTC 1/SC 29/WG 11, Doc: JCT3V-E1004-v6, 5th Meeting: Vienna, AT, Jul. 27-Aug. 2, 2013, 65 pp.

Tech, et al., "3D-HEVC Draft Text 1", JCT-3V Meeting; MPEG Meeting; Jul. 27-Aug. 2, 2013; (The Joint Collaborative Team on 3D Video Coding Extension Development of ISO/IEC JTC1/SC29/WG11 and ITU-T SG.16); No. JCT3V-E1001_v3, XP030130664, 89 pp.

Flynn, et al., "Range Extensions Draft 4," JCT-VC Meeting; Apr. 18-26, 2013, Vienna, (Joint Collaborative Team on Video Coding of ISO/IEC JTC1/SC29/WG11 and ITU-T SG.16 ); URL: http://wftp3.itu.int/av-arch/jctvc-site/, No. JCTVC-N1005-v3, XP030114950, 321 pp.

International Search Report and Written Opinion from International Application No. PCT/US2014/043397, dated Dec. 19, 2014, 20 pp.

Response to Written Opinion dated Dec. 19, 2014 from International Application No. PCT/US2014/043397, filed on Mar. 27, 2015, 4 pp.

Second Written Opinion from International Application No. PCT/US2014/043397, dated Jul. 28, 2015, 12 pp.

(56) References Cited

OTHER PUBLICATIONS

Response to Second Written Opinion dated Jul. 28, 2015 from International Application No. PCT/US2014/043397, filed on Aug. 28, 2015, 48 pp.

International Preliminary Report on Patentability from International Application No. PCT/US2014/043397, dated Sep. 16, 2015, 14 pp.

Flynn, et al., "High Efficiency Video Coding (HEVC) Range Extensions Text Specification: Draft 5," Document: JCTVC-O1005_V4, Oct. 23-Nov. 1, 2013, 361 pp. (uploaded in three parts).

Flynn., et al., "High Efficiency Video Coding (HEVC) Range Extensions text specification: Draft7," JCT-VC meeting, MPEG meeting; Mar. 27-Apr. 4, 2014; Incheon, KR; (Joint Collaborative Team on Video Coding of ISO/IEC JTC1/SC29/WG11 and ITU-T SG.16); Document: JCTVC-Q1005_v4, 376 pp. (uploaded in three parts).

Joshi et al., "Screen content coding test modell (SCM 1)," 17th Meeting; Valencia, ES, Mar. 27 through Apr. 4, 2014, JCTVC-Q1014, 5 pp.

Onno., et al., "AhG5: On the Displacement Vector Prediction Scheme for Intra Block Copy," JCT-VC meeting; MPEG meeting; Mar. 27-Apr. 4, 2014; Valencia, ES; (Joint Collaborative Team on Video Coding O ISO/IEC JTC1/SC29/WG11 and ITU-T SG.16), Document: JCTVC-Q0062_r1, Mar. 24, 2014; 6 pp.

Pang, et al., "RCE3: Subtest B.3-Intra block copy with NxN PU,", (Joint Collaborative Team on Video Coding of ISO/IEC JTC1/SC29/WG11 and ITU-T SG.16); 16th Meeting: San Jose; USA; Jan. 9-17, 2014, No. JCTVC-P0145, Jan. 15, 2014, 3 pp.

Wang, et al., "High Efficiency Video Coding (HEVC) Defect Report 2," Joint Collaboration Team of Video Coding, ITU-T SG 16 WP 3 and ISO/IEC JTC 1/SC 29/WG 11, Oct. 23-Nov. 1, 2013, Document JCTVC-O1003_V2, 311 pp. (uploaded in three parts).

Zhang L., et al., "3D-HEVC Test Model 5", 5. JCT-3V Meeting;Jul. 27, 2013-Aug. 2, 2013; Vienna; (The Joint Collaborative Team on 3D Video Coding Extension Development of ISO/IEC JTC1/SC29/WG11 and ITU-T SG.16 ); URL: http://phenix_int-evry.fr/jct2/,, No. JCT3V-E1005, Sep. 14, 2013 (Sep. 14, 2013), pp. 1-50, XP030131385, section [2.2.3.1 Usage of Inter-View Motion Parameter Prediction].

Zhu L., et al., "Initialization of block vector predictor for intra block copy", 16, JCT-VC Meeting; Jan. 9, 2014-Jan. 17, 2014 San Jose; (Joint Collaborative Team on Video Coding of ISO/IEC JTC1/SC29/WG11 and ITU-T SG.16); URL: http://wftp3.itu.int/av-arch/jctvc-site/, No. JCTVC-P0217, Jan. 4, 2014 (Jan. 4, 2014), pp. 1-6, XP030115758.

Pang C., et al., "AhG5: Fast encoder search and search region restriction for intra block copying," 15. JCT-VC Meeting; Oct. 23, 2013-Jan. 11, 2013; Geneva; (Joint Collaborative Team on Video Coding of ISO/IEC JTC1/SC29/WG11 and ITU-T SG.16); URL: http://wftp3.itu.int/av-arch/jctvc-site/, No. JCTVC-O0156-v3, Oct. 24, 2013 (Oct. 24, 2013), XP030115177, 5 pages.

* cited by examiner

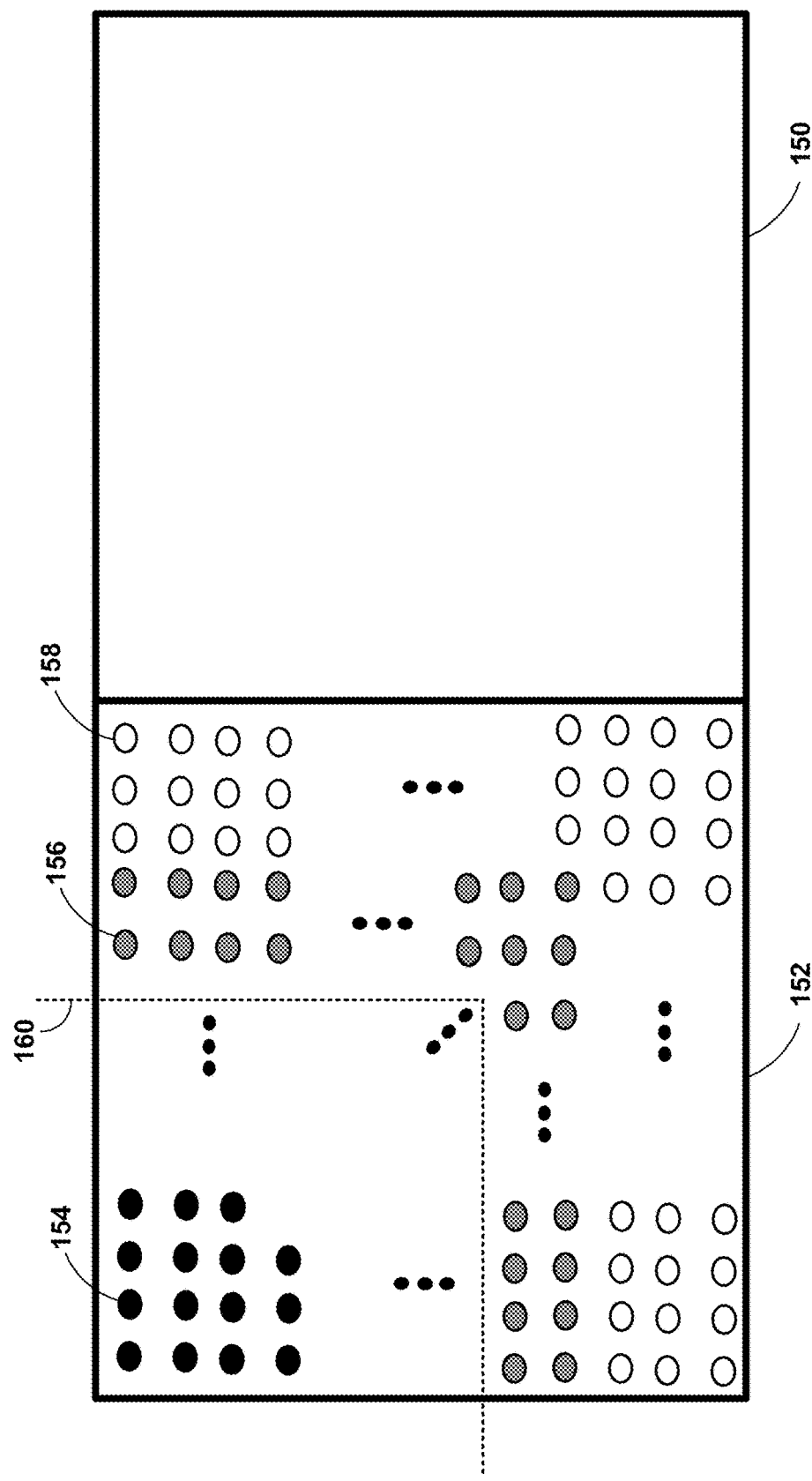

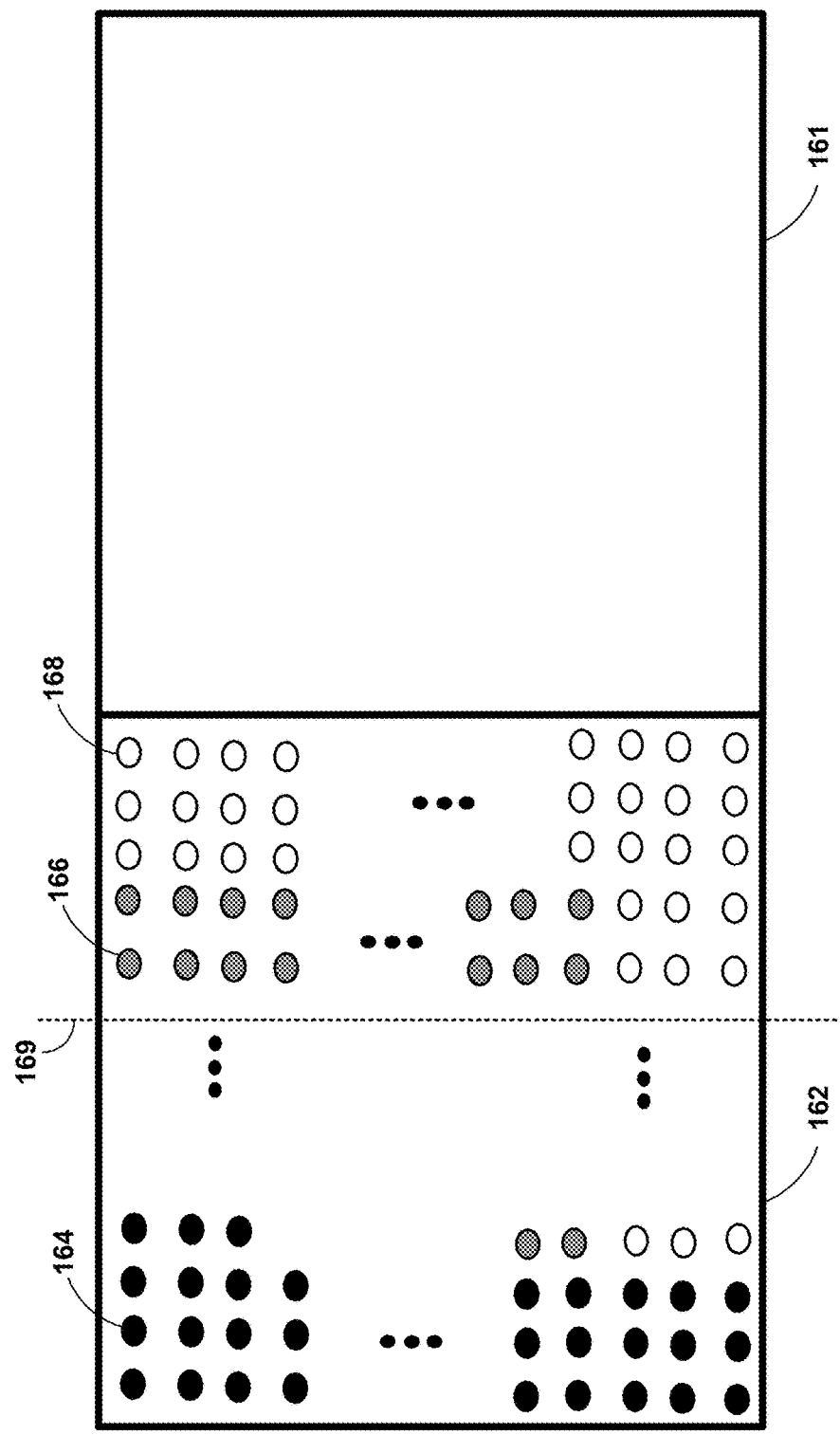

INTRA PREDICTION FROM A PREDICTIVE BLOCK

This application claims the benefit of each of the following U.S. Provisional Applications, the entire contents of each of which is incorporated herein by reference:

U.S. Provisional Application Ser. No. 61/838,209, filed Jun. 21, 2013;
U.S. Provisional Application Ser. No. 61/847,549, filed Jul. 17, 2013;
U.S. Provisional Application Ser. No. 61/866,965, filed Aug. 16, 2013;
U.S. Provisional Application Ser. No. 61/870,050, filed Aug. 26, 2013;
U.S. Provisional Application Ser. No. 61/883,612, filed Sep. 27, 2013;
U.S. Provisional Application Ser. No. 61/887,115, filed Oct. 4, 2013;
U.S. Provisional Application Ser. No. 61/893,539, filed Oct. 21, 2013;
U.S. Provisional Application Ser. No. 61/896,013, filed Oct. 25, 2013; and
U.S. Provisional Application Ser. No. 61/923,698, filed Jan. 5, 2014.

TECHNICAL FIELD

This disclosure relates to video coding and, more particularly, prediction of video blocks based on other video blocks.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264 MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

In general, this disclosure describes techniques for performing intra-prediction for video coding. More particularly, this disclosure describes techniques for coding video data that include a mode for intra prediction of blocks of video data from predictive blocks of video data within the same picture. Intra prediction of blocks of video data from predictive blocks of video data within the same picture may be referred to herein as Intra Block Copy (IntraBC) or Intra Motion Compensation (IntraMC).

The IntraBC or IntraMC techniques of this disclosure may include identifying predictive block of video data for the current block of video data, wherein the predictive block of video data is a reconstructed block of video data within the same picture as the current block of video data. The predictive block of video data may be from within an intended region that is within the picture, e.g., a region above, above-right, above-left, and/or left of the current block of video data. The predictive block of video data is not limited to being either above or left of the current video block and, consequently, the vector used to identify the predictive block relative to the current block is not necessarily and one-dimensional vector. Instead, to identify or determine the predictive block of video data, a video coder may code one or more syntax elements that define a two-dimensional vector that includes a horizontal displacement component and a vertical displacement component relative to the current block of video data. The two-dimensional vector may be referred to as a block vector or motion vector.

The techniques of this disclosure may improve the efficiency and accuracy of predicting current video blocks based on previously coded video blocks in the same picture using IntraBC, which may be referred to as IntraMC, by considering additional reconstructed blocks of video data as possible predictive blocks for the current block of video data, e.g., by not limiting predictive blocks to being above or left of the current block. In some examples, the techniques of this disclosure may improve the efficiency and accuracy of predicting current video blocks based on previously coded video blocks in the same picture using IntraBC by defining the intended area to include reconstructed samples without in-loop filtering, such as deblocking and sample adaptive offset (SAO) filtering. In some examples, the techniques of this disclosure may improve the efficiency and accuracy of predicting current video blocks based on previously coded video blocks in the same picture using IntraBC by enabling a video coder to identify and code a predictive two-dimensional vector the current two-dimensional vector, e.g., block vector or motion vector, of the current block of video data.

In one example, a method of decoding video data including a mode for intra prediction of blocks of video data from predictive blocks of video data within the same picture comprises receiving, in an encoded video bitstream, one or more syntax elements that define a horizontal displacement component and a vertical displacement component of a two-dimensional vector and a residual block for a current block of video data, and decoding the one or more syntax elements. The method further comprises determining a predictive block of video data for the current block of video data based on the decoded syntax elements that define the horizontal displacement component and the vertical displacement component of the two-dimensional vector, wherein the predictive block of video data is a reconstructed block of video data within the same picture as the current block of video data, and reconstructing the current block of video data based on the predictive block of video data and the residual block.

In another example, a method of encoding video data including a mode for intra prediction of blocks of video data from predictive blocks of video data within the same picture, the method comprises selecting a predictive block of video data for a current block of video data from a set of previously encoded blocks of video data within the same picture as the current block of video data. The method further comprises determining a two-dimensional vector, wherein the two-dimensional vector has a horizontal displacement component and a vertical displacement component, wherein the horizontal displacement component represents a horizontal displacement between the predictive block of video data and the current block of video data and the vertical displacement component represents a vertical displacement between the predictive block of video data and the current block of video data. The method further comprises determining a residual block based on the current block of video data and the predictive block of video data, and encoding, in an encoded video bitstream, one or more syntax elements that define the horizontal displacement component and the vertical displacement component of the two-dimensional vector and the residual block.

In another example, a device comprises a video decoder configured to decode video data using a mode for intra prediction of blocks of video data from predictive blocks of video data within the same picture. The video decoder comprises a memory configured to store an encoded video bitstream that comprises one or more syntax elements that define a horizontal displacement component and a vertical displacement component of a two-dimensional vector and a residual block for a current block of video data, and one or more processors. The one or more processors are configured to decode the one or more syntax elements, and determine a predictive block of video data for the current block of video data based on the decoded syntax elements that define the horizontal displacement component and the vertical displacement component of the two-dimensional vector, wherein the predictive block of video data is a reconstructed block of video data within the same picture as the current block of video data. The one or more processors are further configured to reconstruct the current block of video data based on the predictive block of video data and the residual block.

In another example, a device comprises a video encoder configured to encode video data using a mode for intra prediction of blocks of video data from predictive blocks of video data within the same picture. The video encoder comprises a memory configured to store an encoded video bitstream, and one or more processors. The one or more processors are configured to select a predictive block of video data for a current block of video data from a set of previously encoded blocks of video data within the same picture as the current block of video data. The one or more processors are further configured to determine a two-dimensional vector, wherein the two-dimensional vector has a horizontal displacement component and a vertical displacement component, wherein the horizontal displacement component represents a horizontal displacement between the predictive block of video data and the current block of video data and the vertical displacement component represents a vertical displacement between the predictive block of video data and the current block of video data. The one or more processors are further configured to determine a residual block based on the current block of video data and the predictive block of video data, and encode, in the encoded video bitstream, one or more syntax elements that define the horizontal displacement component and the vertical displacement component of the two-dimensional vector and the residual block.

In another example, a device comprises a video coder configured to code video data using a mode for intra prediction of blocks of video data from predictive blocks of video data within the same picture. The video coder comprises means for coding a video bitstream that includes one or more syntax elements that define a horizontal displacement component and a vertical displacement component of a two-dimensional vector and a residual block for a current block of video data, and means for determining a predictive block of video data for the current block of video data. The horizontal displacement component of the two-dimensional vector represents a horizontal displacement between the predictive block of video data and the current block of video data and the vertical displacement component of the two-dimensional vector represents a vertical displacement between the predictive block of video data and the current block of video data. The predictive block of video data is a reconstructed block of video data within the same picture as the current block of video data, and the residual block is determined based on the current block of video data and the predictive block of video data.

In another example, a non-transitory computer-readable storage medium has stored thereon instructions for coding video data including a mode for intra prediction of blocks of video data from predictive blocks of video data within the same picture that, when executed, cause one or more processors to code a video bitstream that includes one or more syntax elements that define a horizontal displacement component and a vertical displacement component of a two-dimensional vector and a residual block for a current block of video data, and determine a predictive block of video data for the current block of video data. The horizontal displacement component of the two-dimensional vector represents a horizontal displacement between the predictive block of video data and the current block of video data and the vertical displacement component of the two-dimensional vector represents a vertical displacement between the predictive block of video data and the current block of video data. The predictive block of video data is a reconstructed block of video data within the same picture as the current block of video data, and the residual block is determined based on the current block of video data and the predictive block of video data.

The details of one or more examples are set forth in the accompanying drawings and the description below. Other features, objects, and advantages will be apparent from the description and drawings, and from the claims.

BRIEF DESCRIPTION OF DRAWINGS

FIGS. 4A-4C are conceptual diagrams illustrating boundaries for defining an intended region relative to samples of video data that are deblock filtered in a neighboring largest coding unit.

DETAILED DESCRIPTION

Figure 1:
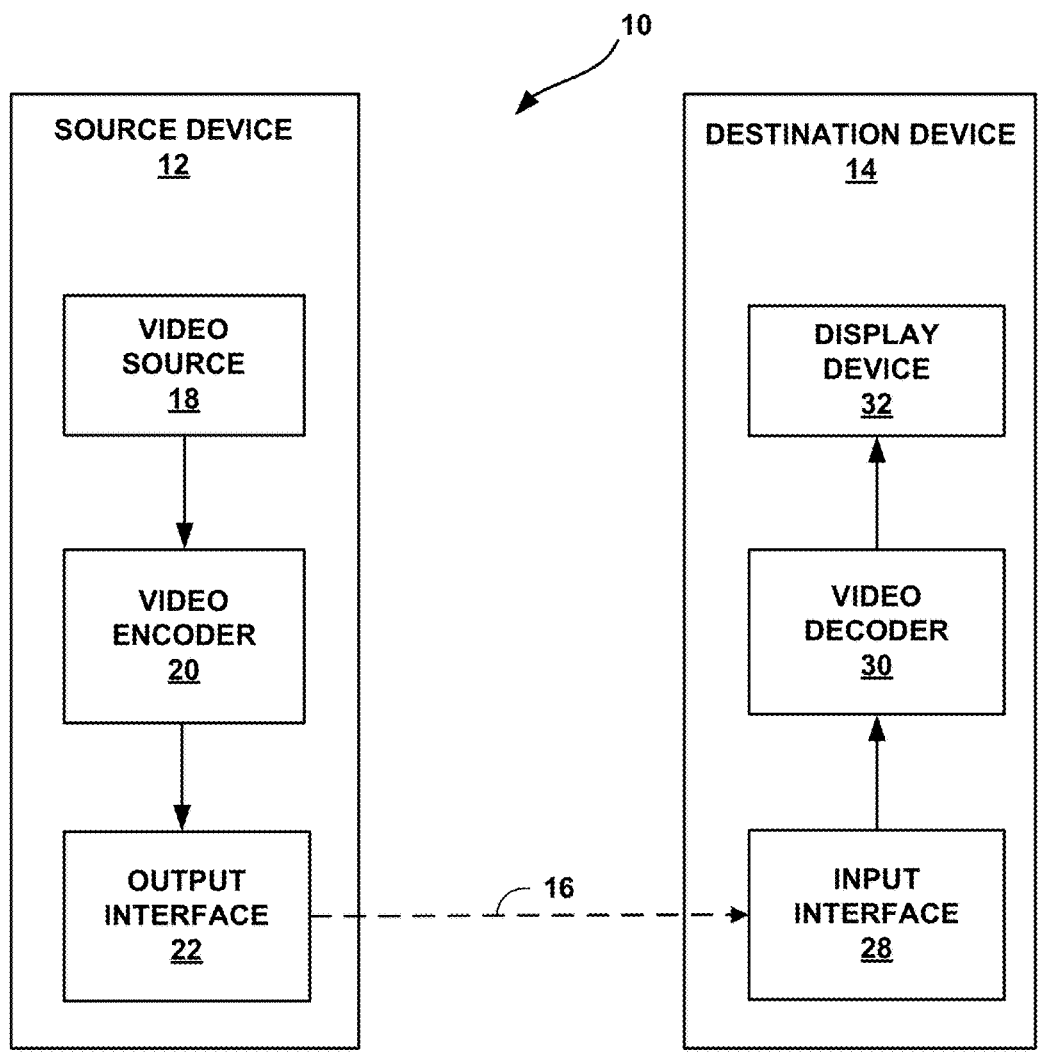
FIG. 1 is a block diagram illustrating an example video encoding and decoding system that may utilize the techniques described in this disclosure.

A video sequence is generally represented as a sequence of pictures. Typically, block-based coding techniques are used to code each of the individual pictures. That is, each picture is divided into blocks, and each of the blocks is individually coded. Coding a block of video data generally involves forming a predicted value for the block and coding a residual value, that is, the difference between the original block and the predicted value. Specifically, the original block of video data includes a matrix of pixel values, and the predicted value includes a matrix of predicted pixel values. The residual value corresponds to pixel-by-pixel differences between the pixel values of the original block and the predicted pixel values.

Prediction techniques for a block of video data are generally categorized as intra-prediction or inter-prediction. Intra-prediction, or spatial prediction, generally involves predicting the block from neighboring pixel values that are part of previously coded blocks. Inter-prediction, or temporal prediction, generally involves predicting the block from pixel values of previously coded pictures (e.g., frames or slices).

Many applications, such as remote desktop, remote gaming, wireless displays, automotive infotainment, cloud computing, and others, are becoming routine in daily lives. Video contents in these applications are usually combinations of natural content, text, artificial graphics, and other contents. In text and artificial graphics regions, repeated patterns such as characters, icons, symbols, or the like) often exist.

Intra prediction of blocks of video data from predictive blocks of video data within the same picture, which may be referred to as Intra Block Copy (IntraBC) or Intra Motion Compensation (IntraMC), is a technique which may enable a video coder to remove such redundancy, and improve intra-frame coding efficiency. In some video coding techniques, video coders may use blocks of previously reconstructed video data that are either directly above or below or directly in line horizontally with the current block of video data in the same picture for prediction of the current video block. In other words, if a picture or frame of video data is imposed on a 2-D grid, each block of video data would occupy a unique range of x-values and y-values. Accordingly, some video coders may predict a current block of video data based on blocks of previously coded video data in the same picture that share only the same set of x-values (i.e., vertically in-line with the current video block) or the same set of y-values horizontally in-line with the current video block).

It may be advantageous for a video coder to predict a current video block from a previously reconstructed block of video data within the same frame, i.e., same picture, that is not necessarily directly above or left (or directly right or below), the current block of video data. By including more video blocks in the predictive set, a video coder may achieve more accurate prediction of the current video block, thereby increasing coding efficiency.

In general, this disclosure describes techniques for coding video data that include a mode for intra prediction of blocks of video data from predictive blocks of video data within the same picture, which may be referred to as an IntraBC or IntraMC mode. The IntraBC or IntraMC techniques of this disclosure may include identifying predictive block of video data for the current block of video data, wherein the predictive block of video data is a reconstructed block of video data within the same picture as the current block of video data. The predictive block of video data may be from within an intended region that is within the picture, e.g., a region above, above-right, above-left, and/or left of the current block of video data. The predictive block of video data is not limited to being either above or left of the current video block and, consequently, the vector used to identify the predictive block relative to the current block is not necessarily and one-dimensional vector. Instead, to identify or determine the predictive block of video data, a video coder may code one or more syntax elements that define a two-dimensional vector that includes a horizontal displacement component and a vertical displacement component relative to the current block of video data. The two-dimensional vector may be referred to as a block vector or motion vector.

The techniques of this disclosure may improve the efficiency and accuracy of predicting current video blocks based on previously coded video blocks in the same picture using IntraBC or IntraMC by considering additional reconstructed blocks of video data as possible predictive blocks for the current block of video data, e.g., by not limiting predictive blocks to being above or left of the current block. In some examples, the techniques of this disclosure may improve the efficiency and accuracy of predicting current video blocks based on previously coded video blocks in the same picture using IntraBC by defining the intended region to include reconstructed samples without in-loop filtering, such as deblocking and sample adaptive offset (SAO) filtering. In some examples, the techniques of this disclosure may improve the efficiency and accuracy of predicting current video blocks based on previously coded video blocks in the same picture using IntraBC by enabling a video coder to identify and code a predictive two-dimensional vector the current two-dimensional vector, e.g., block vector or motion vector, of the current block of video data.

FIG. 1 is a block diagram illustrating an example video encoding and decoding system that may implement one or more of the techniques described herein. As used herein, the term "video coder" refers generically to both video encoders and video decoders. In this disclosure, the terms "video coding" or "coding" may refer generically to video encoding or video decoding.

As shown in FIG. 1, system 10 includes a source device 12 that provides encoded video data to be decoded by a destination device 14. In particular, source device 12 provides the video data to destination device 14 via a computer-readable medium 16. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via computer-readable medium 16. Computer-readable medium 16 may comprise any type of medium or device capable of moving the encoded video data from source device 12 to destination device 14. In one example, computer-readable medium 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some examples, computer-readable medium 16 may comprise a storage device, and source device may output encoded video data via output interface 22 to the storage device. Similarly, encoded data may be accessed from the storage device by input interface 28. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. For example, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples. In a further example, the storage device may correspond to a file server or another intermediate storage device that may store the encoded video generated by source device 12. Destination device 14 may access stored video data from the storage device via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system 10 may be configured to support one-way or two-way video transmission to support applications such as video streaming, video playback, video broadcasting, and/or video telephony.

FIG. 1 is merely an example and the techniques of this disclosure may apply to video coding settings (e.g., video encoding or video decoding) that do not necessarily include any data communication between the encoding and decoding devices. In other examples, data is retrieved from a local memory, streamed over a network, or the like. A video encoding device may encode and store data to memory and/or a video decoding device may retrieve and decode data from memory. In many examples, the encoding and decoding is performed by devices that do not communicate with one another, but simply encode data to memory and/or retrieve and decode data from memory.

In the example of FIG. 1, source device 12 includes video source 18, video encoder 20, and output interface 22. Destination device 14 includes input interface 28, video decoder 30, and display device 32. In other examples, a source device and a destination device may include other components or arrangements. For example, source device 12 may receive video data from an external video source 18, such as an external camera. Likewise, destination device 14 may interface with an external display device 32, rather than including an integrated display device 32.

The illustrated system 10 of FIG. 1 is merely one example. Any digital video encoding and/or decoding device may perform the techniques described herein. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device 12 and destination device 14 are merely examples of such coding devices in which source device 12 generates coded video data for transmission to destination device 14. In some examples, devices 12, 14 may operate in a substantially symmetrical manner such that each of devices 12, 14 include video encoding and decoding components. Hence, system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed interface to receive video from a video content provider. As a further alternative, video source 18 may generate computer graphics-based data as the source video, or a combination of live video, archived video, and computer-generated video. In some cases, if video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be output by output interface 22, onto a computer-readable medium 16. In some examples, output interface 22 may include a modulator/demodulator (modem) and/or a transmitter.

Input interface 28 of destination device 14 receives information from computer-readable medium 16. In some examples, input interface 28 includes a receiver and/or a modem. The information of computer-readable medium 16 may include an encoded video bitstream, which may include encoded video data and other syntax information defined by video encoder 20, which is used by video decoder 30, and that describes characteristics and/or processing of blocks and other coded units, e.g., slices, pictures, groups of pictures (GOPs), or video data. Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device. Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

This disclosure may generally refer to video encoder 20 "signaling" certain information to another device, such as video decoder 30. The term "signaling" may generally refer to the communication of syntax elements and/or other data used to decode the compressed video data. Such communication may occur in real- or near-real-time. Alternately, such communication may occur over a span of time, such as might occur when storing syntax elements to a computer-readable storage medium in an encoded bitstream at the time of encoding, which then may be retrieved by a decoding device at any time after being stored to this medium.

Video encoder 20 and video decoder 30 are described in this disclosure, for purposes of illustration, as being configured to operate according to one or more video coding standards. However, the techniques of this disclosure are not necessarily limited to any particular coding standard, and may be applied for a variety of different coding standards.

Video encoder 20 and video decoder 30 may operate according to a video coding standard, such as the High Efficiency Video Coding (HEVC) standard presently under development, including any extensions, modifications, or additions, and may conform to the HEVC Test Model (HM). Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard. Other examples of video coding standards include MPEG-2 and ITU-T H.263.

Examples of other proprietary or industry standards include the ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions, or extensions of, modifications of, or additions to, such standards. Furthermore, there is an ongoing effort to generate a three-dimensional video (3DV) coding extension to H.264/AVC, namely AVC-based 3DV. In other words, example video coding standards include ITU-T H.261, ISO/IEC MPEG-1 Visual, ITU-T H.262 or ISO/IEC MPEG-2 Visual, ITU-T H.263, ISO/IEC, MPEG-4 Visual and ITU-T H.264 (also known as ISO/IEC MPEG-4 AVC), including its Scalable Video Coding (SVC) and Multi-view Video Coding (MVC) extensions. The H.264 standard is described in ITU-T Recommendation H.264, Advanced Video Coding for generic audiovisual services, by the ITU-T Study Group, and dated March, 2005, which may be referred to herein as the H.264 standard or H.264 specification, or the H.264/AVC standard or specification. The Joint Video Team (JVT) continues to work on extensions to H.264/MPEG-4 AVC. A recent joint draft of MVC is described in "Advanced video coding for generic audiovisual services," ITU-T Recommendation H.264, March 2010.

In addition, there is anew developed video coding standard, namely High Efficiency Video Coding (HEVC), developed by the Joint Collaboration Team on Video Coding (JCT-VC) of ITU-T Video Coding Experts Group (VCEG) and ISO/IEC Motion Picture Experts Group (MPEG). In the example of FIG. 1, video encoder 20 and video decoder 30 may operate according to HEVC. Bross et al., "High Efficiency Video Coding (HEVC) text specification draft 10 (for FDIS & Last Call), Joint Collaborative Team on Video Coding (JCT-VC) of ITU-T SG 16 WP 3 and ISO/IEC, JTC 1/SC 29/WG 11, 12th Meeting: Geneva, CH, 14-23 Jan. 2013, document JCTVC-L1003_v34, which as of Oct. 17, 2013 is available from: http://phenix.int-evry.fr/jct/doc_end_userdocuments/12_Geneva/wg11/JCTVC-L1003-v34.zip, hereinafter, "JCTVC-L1003-v34" the entire content of which is incorporated by reference, is a recent draft of HEVC. The version of HEVC defined in JCTVC-L1003-v34 may be referred to as HEVC version 1 or "HEVC v1." McCann et al., "High Efficiency Video Coding (HEVC) Test Model 12 (HM 12) Encoder Description," document JCTVC-N1002, available from http://phenix.int-evry.fr/jct/doc_end_user/current_document.php?id=8143, the entire content of which is incorporated by reference, is a recent encoder description of HEVC.

Two extensions of HEVC supporting 3D services have been under development by the Joint Collaboration Team on 3D Video coding (JCT-3V) of ITU-T Video Coding Experts Group (VCEG) and ISO/IEC Motion Picture Experts Group (MPEG). The two extensions are namely MV-HEVC and 3D-HEVC respectively. In the example of FIG. 1, video encoder 20 and video decoder 30 may operate according to MV-HEVC and/or 3D-HEVC.

MV-HEVC supports the coding of multiple (texture) views without changing block level design. Tech et al., "MV-HEVC Draft Text 5," Joint Collaborative Team on 3D Video Coding Extension Development of ITU-T SG 16 WP 3 and ISO/IEC JTC 1/SC 29/WG 11, document no. JCT3V-E1004-v6, available from http://phenix.it-sudparis.eu/jct2/doc_end_user/documents/5_Vienna/wg11/JCT3V-E1004-v6.zip, the entire content of which is incorporated by reference, is a recent draft of MV-HEVC.

3D-HEVC codes multi-view video plus depth format and includes new coding tools built in addition to the HEVC coding modules. The newly introduced coding tools are applicable for both texture coding and depth coding. Tech et al., "3D-HEVC Draft Text 1," Joint Collaborative Team on 3D Video Coding Extension Development of ITU-T SG 16 WP 3 and ISO/IEC JTC 1/SC 29/WG 11, 5th Meeting: Vienna, AT, 27 Jul.-2 Aug. 2013, document no. JCT3V-E1001-v3, available from http://phenix.it-sudparis.eu/jct2/doc_end_user/documents/5_Vienna/wg11/JCT3V-E1001-v3.zip, the entire content of which is incorporated by reference, is a recent draft of 3D-HEVC. A recent software 3D-HTM for 3D-HEVC can be downloaded from the following link: [3D-HTM version 8.0]: https://hevc.hhi.fraunhofer.de/svn/svn_3DVCSoftware/tags/HTM-8.0/. A recent software description, Zhang et al., "3D-HEVC Test Model 5," Joint Collaborative Team on 3D Video Coding Extension Development of ITU-T SG 16 WP 3 and ISO/IEC JTC 1/SC 29/WG 11, 5th Meeting: Vienna, AT, 27 Jul.-2 Aug. 2013, document number: JCT3V-E1005, the entire content of which is incorporated by reference, is available from: http://phenix.it-sudparis.eu/jct2/doc_end_user/current_document.php?id=1360.

Additional development and extensions of the HEVC standard include the HEVC Range Extensions. An example of the HEVC Range Extensions is described in Flynn et al., "High Efficiency Video Coding (HEVC) Range Extensions text specification: Draft 4," Joint Collaborative Team on Video Coding (JCT-VC) of ITU-T SG 16 WP 3 and ISO/IEC JTC 1/SC 29/WG 11, Document JCTVC-N1005_v3, 13th Meeting: Incheon, KR, 18-26 Apr. 2013, which is incorporated herein by reference in its entirety, and is available at: http://phenix.int-evry.fr/jct/doc_end_user/current_document.php?id=8139.

In HEVC and other video coding specifications, a video sequence typically includes a series of pictures. Pictures may also be referred to as "frames." A picture may include three sample arrays, denoted $S_L$, $S_{Cb}$ and $S_{Cr}$. $S_L$ is a two-dimensional array (i.e., a block) of luma samples. $S_{Cb}$ is a two-dimensional array of Cb chrominance samples. $S_{Cr}$ is a two-dimensional array of Cr chrominance samples. Chrominance samples may also be referred to herein as "chroma" samples. In other instances, a picture may be monochrome and may only include an array of luma samples.

The HEVC standardization efforts are based on an evolving model of a video coding device referred to as the HEVC Test Model (HM). The HM presumes several additional capabilities of video coding devices relative to existing devices according to, e.g., ITU-T H.264/AVC. For example, whereas H.264 provides nine intra-prediction encoding modes, the HM may provide as many as thirty-three intra-prediction encoding modes.

In general, the working model of the HM describes that video encoder 20 may divide a video frame or picture into a sequence of coding tree units (CTUs), also referred to as largest coding units (LCUs) or treeblocks. Each of the CTUs may comprise a coding tree block (CTB) of luma samples, two corresponding coding tree blocks of chroma samples, and syntax structures used to code the samples of the coding tree blocks. In a monochrome picture or a picture comprising separate color planes, a CTU may comprise a single coding tree block and syntax structures used to code the samples of the single coding tree block.

Syntax data within a bitstream may define a size for the CTU, which is a largest coding unit in terms of the number of pixels. A CTU may be an N×N block of samples. The CTUs of HEVC may be broadly analogous to the macroblocks of other video coding standards, such as H.264/AVC. However, a CTU is not necessarily limited to a particular size and may include one or more coding units (CUs).

A video frame or picture may be partitioned into one or more slices. A slice includes a number of consecutive CTUs in coding or scanning order. Each CTU may be split into coding units (CUs) according to a quadtree. A CU may be an N×N block of samples. In general, a quadtree data structure includes one node per CU, with a root node corresponding to the treeblock. If a CU is split into four sub-CUs, the node corresponding to the CU includes four leaf nodes, each of which corresponds to one of the sub-CUs. A CU or sub-CU, which may also be referred to as a CU, may comprise a coding block of luma samples and two corresponding coding blocks of chroma samples of a picture that has a luma sample array, a Cb sample array, and a Cr sample array, and syntax structures used to code the samples of the coding blocks. In a monochrome picture or a picture comprising separate color planes, a CU may comprise a single coding block and syntax structures used to code the samples of the single coding block.

Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs. If a CU is not split further, it is referred as a leaf-CU. In this disclosure, four sub-CUs of a leaf-CU will also be referred to as leaf-CUs even if there is no explicit splitting of the original leaf-CU. For example, if a CU at 16×16 size is not split further, the four 8×8 sub-CUs will also be referred to as leaf-CUs although the 16×16 CU was never split. Syntax data associated with a coded bitstream may define a maximum number of times a treeblock may be split, referred to as a maximum CU depth, and may also define a minimum size of the coding nodes. Accordingly, a bitstream may also define a smallest coding unit (SCU).

A CU includes a coding node and prediction units (PUs) and transform units (TUs) associated with the coding node. A size of the CU corresponds to a size of the coding node and must be square in shape. The size of the CU may range from 8×8 pixels up to the size of the treeblock with a maximum of 64×64 pixels or greater. In general, video encoder 20 and video decoder 30 code each CU with one mode, e.g., intra prediction or inter prediction.

Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square (e.g., rectangular) in shape. Syntax data associated with a CU may also describe, for example, partitioning of the CU into one or more TUs according to a quadtree. A TU can be square or non-square (e.g., rectangular) in shape.

PUs and TUs of a CU may comprise a prediction block of luma samples, two corresponding prediction blocks of chroma samples of a picture, and syntax structures used to predict the prediction block samples. Video encoder 20 may generate predictive luma, Cb, and Cr blocks for luma, Cb, and Cr prediction blocks of each PU of the CU. In a monochrome picture or a picture comprising separate color planes, a PU may comprise a single prediction block and syntax structures used to predict the single prediction block.

Video encoder 20 and video decoder 30 may support PUs having various sizes. Assuming that the size of a particular CU is 2N×2N, video encoder 20 and video decoder 30 may support intra-prediction in PU sizes of 2N×2N or N×N, and inter-prediction in symmetric PU sizes of 2N×2N, 2N×N, N×2N, or N×N. Video encoder 20 and video decoder 30 may also support asymmetric partitioning for inter-prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up", "Down," "Left," or "Right." Thus, for example, "2N×nU" refers to a 2N×2N CU that is partitioned horizontally with a 2N×0.5N PU on top and a 2N×1.5N PU on bottom. In HEVC, the smallest PU sizes are 8×4 and 4×8.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a non-negative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

In general, a PU represents a spatial area corresponding to all or a portion of the corresponding CU, and may include data for retrieving a reference sample for the PU. Moreover, a PU includes data related to prediction. For example, when the PU is intra-mode encoded, data for the PU may describe an intra-prediction mode for a prediction block corresponding to the PU.

As another example, when the PU is inter-mode encoded, the PU may include data defining one or more motion vectors for the PU. The data defining the motion vector for a PU may describe, for example, a horizontal component of the motion vector, a vertical component of the motion vector, a resolution for the motion vector (e.g., one-quarter pixel precision or one-eighth pixel precision). The PU may also include data identifying a reference picture to which the motion vector points, such as an index into reference picture list that includes the reference picture.

Inter prediction may be uni-directional (i.e., uni-prediction) or bi-directional (i.e., bi-prediction). To perform uni-prediction or bi-prediction, video encoder 20 and video decoder may generate a first reference picture list (RefPicList0) and a second reference picture list (RefPicList1) for a current picture. Each of the reference picture lists may include one or more reference pictures. After a reference picture list is constructed (namely RefPicList0 and RefPicList1 if available), a reference index to a reference picture list can be used to identify any reference picture included in the reference picture list.

A reference picture may be a previous picture in temporal, e.g., display, order, a future picture, or a combination of predictions from two or more previously encoded pictures. Video coders, e.g., video encoder 20 and video decoder 30 use picture order count (POC) to identify a temporal order of a picture. Video coders also use POC values of pictures for reference picture list construction and motion vector scaling. Video encoder 20 or video decoder 30 may store the reference pictures in a reference picture memory, e.g., reference picture memory 368 (FIG. 8) and reference picture memory 396 (FIG. 9).

When a current video block, e.g., PU, is coded using IntraBC according to the techniques of this disclosure, data defining a two-dimensional vector (which may be referred to as a block vector, motion vector, or displacement vector) for the block may describe, for example, a horizontal component of the motion vector, a vertical component of the motion vector, a resolution for the motion vector (e.g., one-quarter pixel precision or one-eighth pixel precision). However, the data of the PU predicted using IntraBC according to the techniques of this disclosure need not identify a reference picture to which the motion vector points, as the reference block is within same frame or pictures as the current video block.

After video encoder 20 generates predictive luma, Cb, and Cr blocks for one or more PUs of a CU, video encoder 20 may generate a luma residual block for the CU. Each sample in the CU's luma residual block indicates a difference between a luma sample in a predictive luma block of a PU of the CU and a corresponding sample in the CU's original luma coding block. In addition, video encoder 20 may generate a Cb residual block for the CU. Each sample in the CU's Cb residual block may indicate a difference between a Cb sample in a predictive Cb block of a PU of the CU and a corresponding sample in the CUs original Cb coding block. Video encoder 20 may also generate a Cr residual block for the CU. Each sample in the CU's Cr residual block may indicate a difference between a Cr sample in a predictive Cr block of a PU of the CU and a corresponding sample in the CU's original Cr coding block.

A leaf-CU having one or more PUs may also include one or more transform units (TUs). A TU of a CU may comprise a transform block of luma samples, two corresponding transform blocks of chroma samples, and syntax structures used to transform the transform block samples. Video encoder 20 may transform pixel difference values within the residual blocks associated with the TUs to produce transform coefficients, which may be quantized. Video encoder 20 may, for examples, apply discrete cosine transform (DCT), an integer transform, a wavelet transform, or a conceptually similar transform to the residual video data.

The TUs may be specified using an RQT (also referred to as a TU quadtree structure), as discussed above. For example, a split flag may indicate whether a leaf-CU is split into four transform units. Then, each transform unit may be split further into further sub-TUs. When a TU is not split further, it may be referred to as a leaf-TU. TU is not necessarily limited to the size of a PU. Thus, TUs may be larger or smaller than a PU. For intra coding, a PU may be collocated with a corresponding leaf-TU for the same CU. In some examples, the maximum size of a leaf-TU may correspond to the size of the corresponding leaf-CU. In general, this disclosure uses the terms CU and TU to refer to leaf-CU and leaf-TU, respectively, unless noted otherwise.

This disclosure may use the term "video unit," "video block," or "block of video data" to refer to any one or more blocks of samples and syntax structures used to code samples of the one or more blocks of samples as described herein. Example types of video blocks may include CTUs, CUs, PUs, or TUs in the context of HEVC, or similar data structures in the context of other standards (e.g., macroblocks or macroblock partitions thereof in H.264/AVC).

Following any transforms to produce transform coefficients, video encoder 20 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

Following quantization, the video encoder may scan the transform coefficients, producing a one-dimensional vector from the two-dimensional matrix including the quantized transform coefficients. The scan may be designed to place higher energy (and therefore lower frequency) coefficients at the front of the array and to place lower energy (and therefore higher frequency) coefficients at the back of the array. In some examples, video encoder 20 may utilize a predefined scan order to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode the one-dimensional vector, e.g., according to context-adaptive variable length coding (CAVLC), context-adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data for use by video decoder 30 in decoding the video data.

To perform CABAC, video encoder 20 may assign a context within a context model to a symbol to be transmitted. The context may relate to, for example, whether neighboring values of the symbol are non-zero or not. To perform CAVLC, video encoder 20 may select a variable length code for a symbol to be transmitted. Codewords in VLC may be constructed such that relatively shorter codes correspond to more probable symbols, while longer codes correspond to less probable symbols. In this way, the use of VLC may achieve a bit savings over, for example, using equal-length codewords for each symbol to be transmitted. The probability determination may be based on a context assigned to the symbol.

In addition, video encoder 20 may decode encoded pictures, e.g., by inverse quantizing and inverse transforming residual data, and combine the residual data with prediction data. In this manner, video encoder 20 can simulate the decoding process performed by video decoder 30. Both video encoder 20 and video decoder 30, therefore, will have access to substantially the same decoded video data, e.g., pictures or blocks from pictures, for use in intra-picture, inter-picture, or IntraBC prediction.

Video encoder 20 may output an encoded video bitstream that includes a sequence of bits that form a representation of the coded pictures and associated data, including syntax elements. The bitstream may comprise a sequence of network abstraction layer (NAL) units. Each of the NAL units may include a NAL unit header and may encapsulate a raw byte sequence payload (RBSP). The NAL unit header may include a syntax element that indicates a NAL unit type code. The NAL unit type code specified by the NAL unit header of a NAL unit indicates the type of the NAL unit. A RBSP may comprise a syntax structure containing an integer number of bytes that is encapsulated within a NAL unit. In some instances, an RBSP includes zero bits.

Different types of NAL units may encapsulate different types of RBSPs. For example, a first type of NAL unit may encapsulate an RBSP for a parameter set, a second type of NAL unit may encapsulate an RBSP for a coded slice, a third type of NAL unit may encapsulate an RBSP for Supplemental Enhancement Information (SEI), and so on. NAL units that encapsulate RBSPs for video coding data (as opposed to RBSPs for parameter sets and SEI messages) may be referred to as video coding layer (VCL) NAL units. A NAL unit that encapsulates a coded slice may be referred to herein as a coded slice NAL unit. An RBSP for a coded slice may include a slice header and slice data.

Video encoder 20 may include in the encoded video bitstream, in addition to the encoded video data, syntax elements that inform video decoder how to decode a particular block of video data, or grouping thereof. Video encoder 20 may include the syntax elements in a variety of syntax structures, e.g., depending on the type of video structure (e.g., sequence, picture, slice, block) to which it refers, and how frequently its value may change. For example, video encoder 20 may include syntax elements in parameter sets, such as a Video Parameter Set (VPS), Sequence Parameter Set (SPS), or Picture Parameter Set (PPS). As other examples, video encoder 20 may include syntax elements in SEI messages and slice headers.

In general, video decoder 30 may perform a decoding process that is the inverse of the encoding process performed by video encoder. For example, video decoder 30 may perform entropy decoding using the inverse of the entropy encoding techniques used by video encoder to entropy encode the quantized video data. Video decoder 30 may further inverse quantize the video data using the inverse of the quantization techniques employed by video encoder 20, and may perform an inverse of the transformation used by video encoder 20 to produce the transform coefficients that quantized. Video decoder 30 may then apply the resulting residual blocks to adjacent reference video data (intra-prediction), predictive blocks from another picture (inter-prediction), or predictive blocks from the same picture (IntraBC) to produce the video block for eventual display. Video decoder 30 may be configured, instructed, controlled or directed to perform the inverse of the various processes performed by video encoder 20 based on the syntax elements provided by video encoder 20 with the encoded video data in the bitstream received by video decoder 30.

Each picture may comprise a luma component and one or more chroma components. Accordingly, the block-based encoding and decoding operations described herein may be equally applicable to blocks, e.g., CUs, PUs and TUs, including or associated with luma or chroma pixel values.

IntraMC (also referred to as IntraBC) is a dedicated technique which enables removing intra-picture redundancy and improving the intra-frame coding efficiency as reported in Budagavi et al., "AHG8: Video coding using intra motion compensation," Document: JCTVC-M0350, Joint Collaborative Team on Video Coding (JCT-VC) of ITU-T SG 16 WP 3 and ISO/IEC JTC 1/SC 29/WG 11, 13$^{th}$ Meeting: Incheon, KR, 18-26 Apr. 2013 (hereinafter, "JCT-VC M0350"). JCT-VC; M0350 is incorporated herein by reference in its entirety, and is available for download from http://phenix.int-evry.fr/jct/doc_end_user/current_document.php?id=7601. According to JCT-VC M0350, IntraMC includes coding: (1) a one-dimensional offset or displacement vector (also called here block vector, motion vector, or "MV"), which indicates the position of the prediction signal, e.g., a block within the same frame or picture, displaced from the current video block, e.g., CU, together with (2) the residual signal. For CUs or other blocks which use IntraMC, the prediction signals are obtained from the already reconstructed region in the same picture.

There are some limitations of and problems associated with existing proposals for IntraMC or IntraBC, e.g., as presented in JCT-VC M0350. For example, according to the IntraMC techniques presented in JCT-VC M0350, the predictive block of video data must be either directly above or directly left of the current block of video data, i.e., the search range for the predictive block only includes blocks directly above or directly left of the current block of video data. Consequently, according to the IntraMC techniques presented in JCT-VC M0350, a video encoder only signals information specifying a one-dimensional block vector to a video decoder. The block vector is either horizontal displacement or vertical displacement, and the video encoder encodes a flag to signal the direction to the video decoder.

As another example, according to the IntraMC techniques presented in JCT-VC M0350, the motion vector can point to a location outside the current LCU or CTU, which may complicate the system design when LCU level pipelining need to be supported. For example, when parallel coding is performed at the LCU level, other LCUs in the same picture as the current LCU will not be reconstructed during coding of the current CU. Thus, CUs within such LCUS will be unavailable to provide the prediction signal for IntraMC prediction. Additionally, according to the IntraMC techniques presented in JCT-VC M0350, the motion vectors are encoded with fixed-length code (FLC) coding, which may not be very effective.

As described above, it may be advantageous for a video coder, e.g., video encoder 20 and/or video decoder 30, to predict a current video block from a larger set of previously-reconstructed blocks of video data within the same frame, i.e., same picture, rather than only vertical or horizontal neighboring blocks identified with one-dimensional vectors. By including more video blocks in the predictive set, the video coder may achieve more accurate prediction of the current video block, thereby increasing coding efficiency. In some examples, a video coder, e.g., video encoder 20 and/or video decoder 30, may implement the techniques of this disclosure to improve the efficiency and accuracy of predicting current video blocks based on previously coded video blocks in the same picture using IntraBC by defining the intended region such that includes available reconstructed samples and, in some cases, samples for which in-loop filtering, such as deblocking and sample adaptive offset (SAO) filtering, has not been performed. In some examples, the techniques of this disclosure may improve the efficiency and accuracy of predicting current video blocks based on previously coded video blocks in the same picture using IntraBC by enabling the video coder to identify and code a predictive two-dimensional vector of the current two-dimensional vector, e.g., block vector or motion vector, of the current block of video data. Additionally, in some examples, video encoder 20 and/or video decoder 30 may improve the efficiency and accuracy of predicting current video blocks based on previously coded video blocks in the same picture using IntraBC by using different data encoding and decoding techniques, which may be adaptive based on block size, block position, or a variety of other factors.

Figure 2:
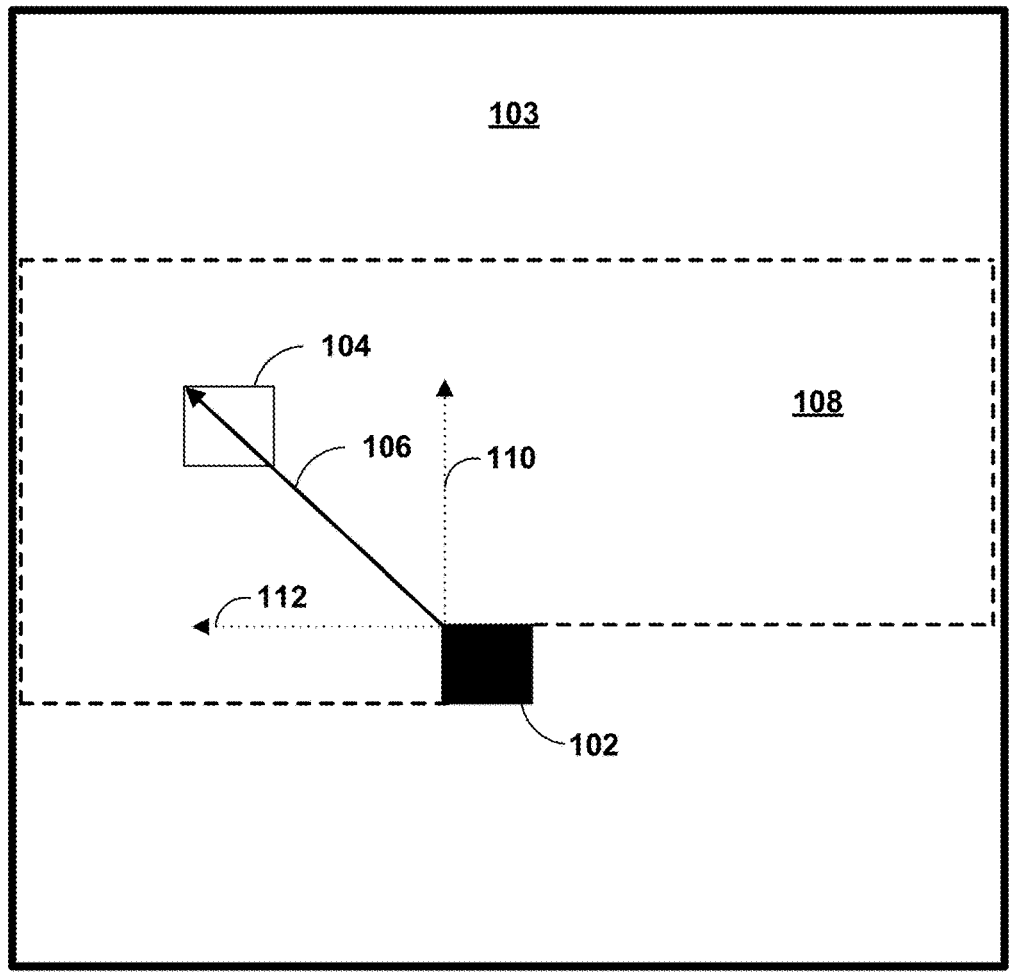
FIG. 2 is a conceptual diagram illustrating an example predictive block of video data within a current picture for predicting a current block of video data within the current picture according to the techniques of this disclosure.

FIG. 2 is a conceptual diagram illustrating an example technique for predicting a current block of video data 102 within a current picture 103 according to a mode for intra prediction of blocks of video data from predictive blocks of video data within the same picture according to this disclosure, e.g., according to an IntraBC mode in accordance with the techniques of this disclosure. FIG. 2 illustrates a predictive block of video data 104 within current picture 103. A video coder, e.g., video encoder 20 and/or video decoder 30, may use predictive video block 104 to predict current video block 102 according to an IntraBC mode in accordance with the techniques of this disclosure.

Video encoder 20 selects predictive video block 104 for predicting current video block 102 from a set of previously reconstructed blocks of video data. Video encoder 20 reconstructs blocks of video data by inverse quantizing and inverse transforming the video data that is also included in the encoded video bitstream, and summing the resulting residual blocks with the predictive blocks used to predict the reconstructed blocks of video data. In the example of FIG. 4, intended region 108 within picture 103, which may also be referred to as an "intended area" or "raster area," includes the set of previously reconstructed video blocks. Video encoder 20 may define intended region 108 within picture 103 in variety of ways, as described in greater detail below. Video encoder 20 may select predictive video block 104 to predict current video block 102 from among the video blocks in intended region 108 based on an analysis of the relative efficiency and accuracy of predicting and coding current video block 102 based on various video blocks within intended region 108.

Video encoder 20 determines two-dimensional vector 106 representing the location or displacement of predictive video block 104 relative to current video block 102. Two-dimensional motion vector 106 includes horizontal displacement component 112 and vertical displacement component 110, which respectively represent the horizontal and vertical displacement of predictive video block 104 relative to current video block 102. Video encoder 20 may include one or more syntax elements that identify or define two-dimensional motion vector 106, e.g., that define horizontal displacement component 112 and vertical displacement component 110, in the encoded video bitstream. Video decoder 30 may decode the one or more syntax elements to determine two-dimensional motion vector 106, and use the determined vector to identify predictive video block 104 for current video block 102.

In some examples, the resolution of two-dimensional motion vector 106 can be integer pixel, e.g., be constrained to have integer pixel resolution. In such examples, the resolution of horizontal displacement component 112 and vertical displacement component 110 will be integer pixel. In such examples, video encoder 20 and video decoder 30 need not interpolate pixel values of predictive video block 104 to determine the predictor for current video block 102.

In other examples, the resolution of one or both of horizontal displacement component 112 and vertical displacement component 110 can be sub-pixel. For example, one of components 112 and 114 may have integer pixel resolution, while the other has sub-pixel resolution. In some examples, the resolution of both of horizontal displacement component 112 and vertical displacement component 110 can be sub-pixel, but horizontal displacement component 112 and vertical displacement component 110 may have different resolutions.

In some examples, a video coder, e.g., video encoder 20 and/or video decoder 30, adapts the resolution of horizontal displacement component 112 and vertical displacement component 110 based on a specific level, e.g., block-level, slice-level, or picture-level adaptation. For example, video encoder 20 may signal a flag at the slice level, e.g. in a slice header, that indicates whether the resolution of horizontal displacement component 112 and vertical displacement component 110 is integer pixel resolution or is not integer pixel resolution. If the flag indicates that the resolution of horizontal displacement component 112 and vertical displacement component 110 is not integer pixel resolution, video decoder 30 may infer that the resolution is sub-pixel resolution. In some examples, one or more syntax elements, which are not necessarily a flag, may be transmitted for each slice or other unit of video data to indicate the collective or individual resolutions of horizontal displacement components 112 and/or vertical displacement components 110.

In still other examples, instead of a flag or a syntax element, video encoder 20 may set based on, and video decoder 30 may infer the resolution of horizontal displacement component 112 and/or vertical displacement component 110 from resolution context information. Resolution context information may include, as examples, the color space (e.g., YUV, RGB, or the like), the specific color format (e.g., 4:4:4, 4:2:2, 4:2:0, or the like), the frame size, the frame rate, or the quantization parameter (QP) for the picture or sequence of pictures that include current video block 102. In at least some examples, a video coder may determine the resolution of horizontal displacement component 112 and/or vertical displacement component 110 based on information related to previously coded frames or pictures. In this manner, the resolution of horizontal displacement component 112 and the resolution for vertical displacement component 110 may be pre-defined, signaled, may be inferred from other, side information (e.g., resolution context information), or may be based on already coded frames.

Current video block 102 may be a CU, or a PU of a CU. In some examples, a video coder, e.g., video encoder 20 and/or video decoder 30, may split a CU that is predicted according to IntraBC into a number of PUs. In such examples, the video coder may determine a respective (e.g., different) two-dimensional vector 106 for each of the PUs of the CU. For example, a video coder may split a 2N×2N CU into two 2N×N PUs, two N×2N PUs, or four N×N PUs. As other examples, a video coder may split a 2N×2N CU into ((N2)×N+(3N2)×N) PUs, ((3N/2)×N+(N/2)×N) PUs, (N×(N/2)+N×(3N/2)) PUs, (N×(3N/2)+N×(N/2)) PUs, four (N/2)×2N PUs, or four 2N×(N/2) PUs. In some examples, video coder may predict a 2N×2N CU using a 2N×2N PU.

Current video block 102 may be a luma video block, or a chroma video block corresponding to a luma video block. In some examples, video encoder 20 may only encode one or more syntax elements defining two-dimensional vectors 106 for luma video blocks into the encoded video bitstream. In such examples, video decoder 30 may derive two-dimensional vectors 106 for each of one or more chroma blocks corresponding to a luma block based on the two-dimensional vector signaled for the luma block.

Depending on the color format, e.g., color sampling format or chroma sampling format, a video coder may downsample corresponding chroma video blocks relative to the luma video block. Color format 4:4:4 does not include downsampling, meaning that the chroma blocks include the same number of samples in the horizontal and vertical directions as the luma block. Color format 4:2:2 is downsampled in the horizontal direction, meaning that there are half as many samples in the horizontal direction in the chroma blocks relative to the luma block. Color format 4:2:0 is downsampled in the horizontal and vertical directions, meaning that there are half as many samples in the horizontal and vertical directions in the chroma blocks relative to the luma block.

In examples in which video coders determine vectors 106 for chroma video blocks based on vectors 106 for corresponding luma blocks, the video coders may need to modify the luma vector. For example, if a luma vector 106 has integer resolution with horizontal displacement component 112 and/or vertical displacement component 110 being an odd number of pixels, and the color format is 4:2:2 or 4:2:0, the converted luma vector will not point an integer pixel location in the corresponding chroma block. In such examples, video coders may scale the luma vector for use as a chroma vector to predict a corresponding chroma block. In some examples, video encoder 20 may define intended region 108, or scale the converted vector, such that a converted luma vector 106 used for predicting a chroma block will not point to predictive chroma blocks that are not reconstructed, or that are in-loop filtered.

Figure 3:
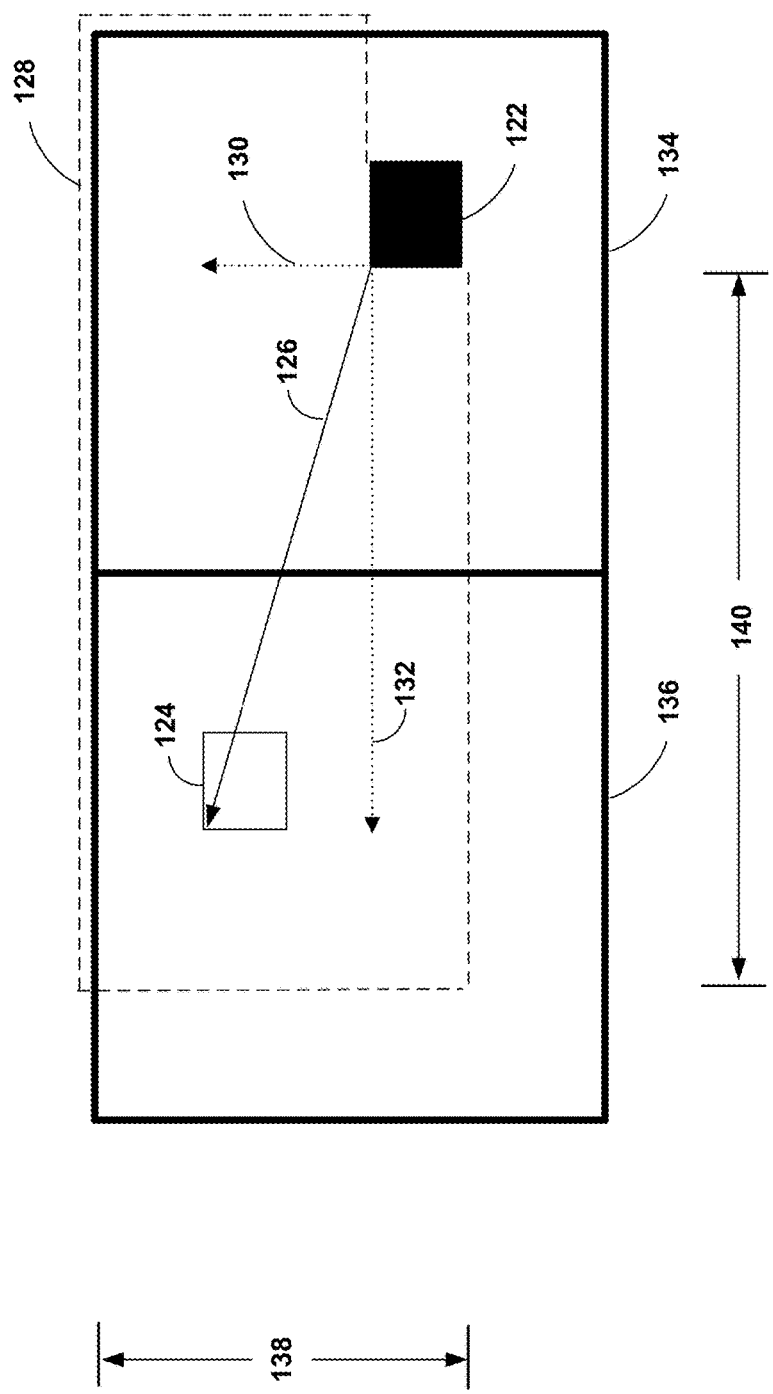
FIG. 3 is a conceptual diagram illustrating an example technique for defining an intended region, from which a predictive block of video data may be selected.

FIG. 3 is a conceptual diagram illustrating an example technique for defining an intended region, from which video encoder 20 may select a predictive block of video data to predict a current block of video data. In the example illustrated by FIG. 3, video encoder 20 is predicting and encoding current block of video data 122. Video encoder 20 selects predictive block of video data 124 within intended region 128 to predict current video block 122. Video encoder 20 determines two-dimensional vector 126, which includes a horizontal displacement component 132 and a vertical displacement component 130, that indicates the displacement of predictive video block 124 relative to current video block 122. Video encoder 20 encodes one or more syntax elements in the encoded video bitstream defining two-dimensional vector 126.

In some examples, video encoder 20 defines intended region 128, e.g., defines the size of intended region, such as a height, width, or other dimension, such that implementation and processing complexity, particularly at video decoder 30, can be reduced. In doing so, video encoder 20 limits the size of two-dimensional vector 126, e.g., limits the size of vertical displacement component 130 and/or horizontal displacement component 132. In some examples, video encoder 20 limits intended region 128 to facilitate parallel processing video data by video encoder 20 and video decoder 20. In some examples, video encoder 20 limits intended region 128 to facilitate use of predictive video blocks without in-loop filtering, such as deblocking and sample adaptive offset (SAO) filtering, and without unduly burdening the memory requirements of a video coder or delaying application of such in-loop filtering.

As illustrated in FIG. 3, current video block 122 is within a current LCD 134. FIG. 3 also illustrates the left-neighboring (left) LCU 136 of current LCU, Left LCU 136 is illustrated in FIG. 3 because video blocks of a picture are typically encoded in raster-scan order from top-left to bottom-right. In examples in which video blocks of a picture are coded in a different order, the following discussion regarding left LCU 136 may apply to a different, neighboring LCU of current LCU 134.

In some examples, video encoder 20 may limit intended region 128 such that the fetched predictive video block 124 is within the same LCU as current video block 122, i.e., within current LCU 134. Limiting intended region 128 to current LCU 134 may facilitate parallel processing of LCUs by video coders, because processing units of a video coder will not require information from another LCU when coding a block of a current LCU.

In some examples in which intended region 128 is limited to current LCU 134, two-dimensional vector 126 may be limited to a horizontal vector if current video block 122 is a top-most block of current LCU 134, and to a vertical vector if current video block 122 is a left-most block of current LCU 134, in such examples, video encoder 20 may encode one or more syntax elements defining horizontal displacement component 132 of two-dimensional vector 126, and need not encode one or more syntax elements defining vertical displacement component 130 of two-dimensional vector 126, which would be zero, if current video block 122 is a top-most block of current LCU 134. Similarly, video encoder 20 may encode one or more syntax elements defining vertical displacement component 130 of two-dimensional vector 126, and need not encode one or more syntax elements defining horizontal displacement component 132 of two-dimensional vector 126, which would be zero, if current video block 122 is a left-most block of current LCU 134. Similarly, if intended region 128 is limited to current LCU 134 and current video block 122 is the top-left unit of current LCU 134, both horizontal and vertical components 130, 132 of two-dimensional vector 126 have to be zero. In some examples in which this situation is encountered, video encoder 20 may not perform IntraBC, and need not single any syntax elements for IntraBC, such as syntax elements to indicate two-dimensional vector 126, or any flag indicating whether current video block 122 is predicted according to IntraBC.

These techniques to reduce signaling for IntraBC when an intended region is limited to a current LCU and a current video block is within certain positions in the current LCU may also be applied for IntraBC techniques limited to one-dimensional motion vectors, such as those proposed in JCT-VC M0350 as well. For example, if the vertical motion vector is restricted to be within the current LCU and the current unit is the lop-most unit, there is no need to signal whether the motion is vertical or horizontal.

In some examples, video encoder 20 may limit intended region 128 to be within current LCU 134 and part of the reconstructed area in one or more neighboring LCUs, e.g., left LCU 136 as illustrated in FIG. 3. In this manner, video encoder 20 limits two-dimensional vectors 126 such that they may refer, in addition to reconstructed blocks in current LCU 134, only to blocks in a reconstructed area of one or more neighboring LCUs, such as left LCU 136, as illustrated in FIG. 3.

In some examples, video encoder 20 limits a size of intended region 128 based on a size of current LCU 134. For example, as illustrated in FIG. 3, video encoder 20 may limit a height 138 of intended region 128 based on a height (or upper vertical limit) of current LCU 134, such that intended region 128 does not extend vertically beyond current LCU 134 and left LCU 136. The size of an LCU (or CTB) may be signaled by video encoder 20 to video decoder 30 in the encoded video bitstream, e.g., via a slice header, parameter set, or SEI message, and so a limit on the intended region based on LCU size may also be effectively signaled to video decoder 30. In some examples, video encoder 20 limits a size, e.g., height 138 or width 140 to the left of current video block 122, of intended region 128 based on an integer number of pixels. For example, video encoder 20 may limit width 140 to the left of current video block 122 to an integer number of pixels, such as 64, which may correspond to the width of LCUs 134 and 136.

Video encoder 20 may limit intended region 128 to include reconstructed video blocks without in-loop filtering, such as deblocking and sample adaptive offset (SAO) filtering. In this manner, video encoder 20 may limit two-dimensional vectors for IntraBC such that they may refer, in addition to current LCU 134, only to blocks in the reconstructed area of a neighboring LCU, such as left LCU 136, for which in-loop filtering was not performed. Video encoder 20 could increase the size of intended region 128, but such increases may delay in-loop filtering and further processing of video blocks in the intended region, or require additional memory to store samples prior to in-loop filtering. Accordingly, video encoder 20 may limit intended region 128, e.g., as described herein, to achieve a balance between prediction accuracy and efficiency.

Figure 4C:
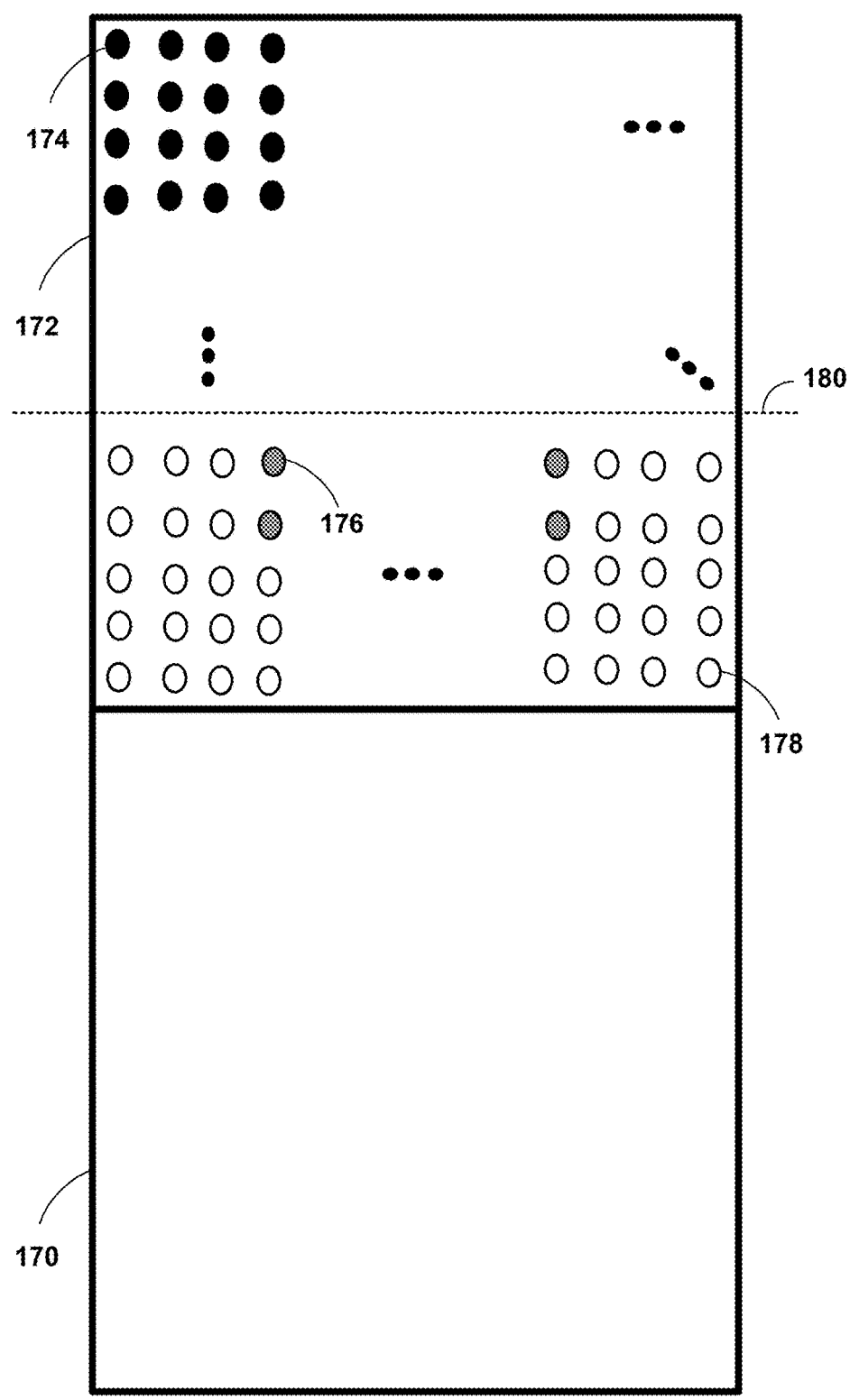

FIGS. 4A-4C are conceptual diagrams illustrating boundaries for defining intended region 128 relative to samples of video data that are deblock filtered in a neighboring LCU. According to HEVC, video coders may apply deblock filtering for each 8×8 block and, when applied, only three lines of samples along the edges are affected. Therefore, in some examples, video encoder 20 may expand an intended region and increase two-dimensional block vector size to refer outside a current LCU, but limit the intended region and block vector size to the area which has not been in-loop filtered in the previously coded, neighboring LCU.

FIG. 4A illustrates a current LCU 150 and a left-neighboring LCU 152. In FIG. 4A, deblock filtered pixels 154 in left LCU 152 are illustrated by filled-in circles. Non-deblock filtered pixels 156 that will not be deblock filtered because they are not proximate to the edge of left LCU 152, and therefore not affected by horizontal or vertical deblock filtering, are shown in FIG. 4A as shaded circles. Non-deblock filtered pixels 158 that have not yet been deblock filtered because, although they are proximate to the edge of left LCU 152, the right or below LCU is not available, are shown in FIG. 4A as empty circles. Line 160 illustrates an example boundary of an intended region and limit of two-dimensional block vector size that may be applied by video encoder 20 when encoding blocks of video data within current LCU 150.

FIG. 4B illustrates a current LCU 161 and a left-neighboring LCU 162. In FIG. 4B, deblock filtered pixels 164 in left LCU 162 are illustrated by filled-in circles. Non-deblock filtered pixels 166 that will not be deblock filtered because they are not proximate to the edge of left LCU 162, and therefore not affected by horizontal or vertical deblock filtering, are shown in FIG. 4B as shaded circles. Non-deblock filtered pixels 168 that have not yet been deblock filtered because, although they are proximate to the edge of left LCU 162, the right or below is not available, are shown in FIG. 4B as empty circles.

A video coder may perform horizontal deblock filtering followed by deblock vertical filtering. Therefore, a video coder may horizontally filter pixels in the lower-left portion of left LCU 162 prior to vertically filtering the pixels along the bottom of left LCU 162 when the lower neighboring LCUs become available. To facilitate such horizontal filtering, video encoder 20 may limit the intended region within left LCU 162, such as based on vertical line 169 illustrated in FIG. 4B, to allow horizontal filtering of those pixels.

FIG. 4C illustrates a current LCU 170 and an upper-neighboring LCU 172. In FIG. 4C, deblock filtered pixels 174 in upper-neighboring LCU 172 are illustrated by filled-in circles. Non-deblock filtered pixels 176 that will not be deblock filtered because they are not proximate to the edge of upper LCU 172, and therefore not affected by horizontal or vertical deblock filtering, are shown in FIG. 4C as shaded circles. Non-deblock filtered pixels 178 that have not yet been deblock filtered are shown in FIG. 4C as empty circles.

In case of upper neighboring LCU 172, video encoder 20 may limit the intended region and two-dimensional block vectors as illustrated by line 180 in FIG. 4C. However, in the case of upper neighboring LCU 172, the limit illustrated by line 180 may lead to delay of horizontal deblock filtering of pixels in the area below line 180. To allow horizontal deblock filtering in this area, video encoder 20 may define a vertical limit of the intended region and block vectors to be within the current LCU, or to not exceed the upper boundary of the current LCU, e.g., as illustrated in FIG. 3.

Figure 5A:
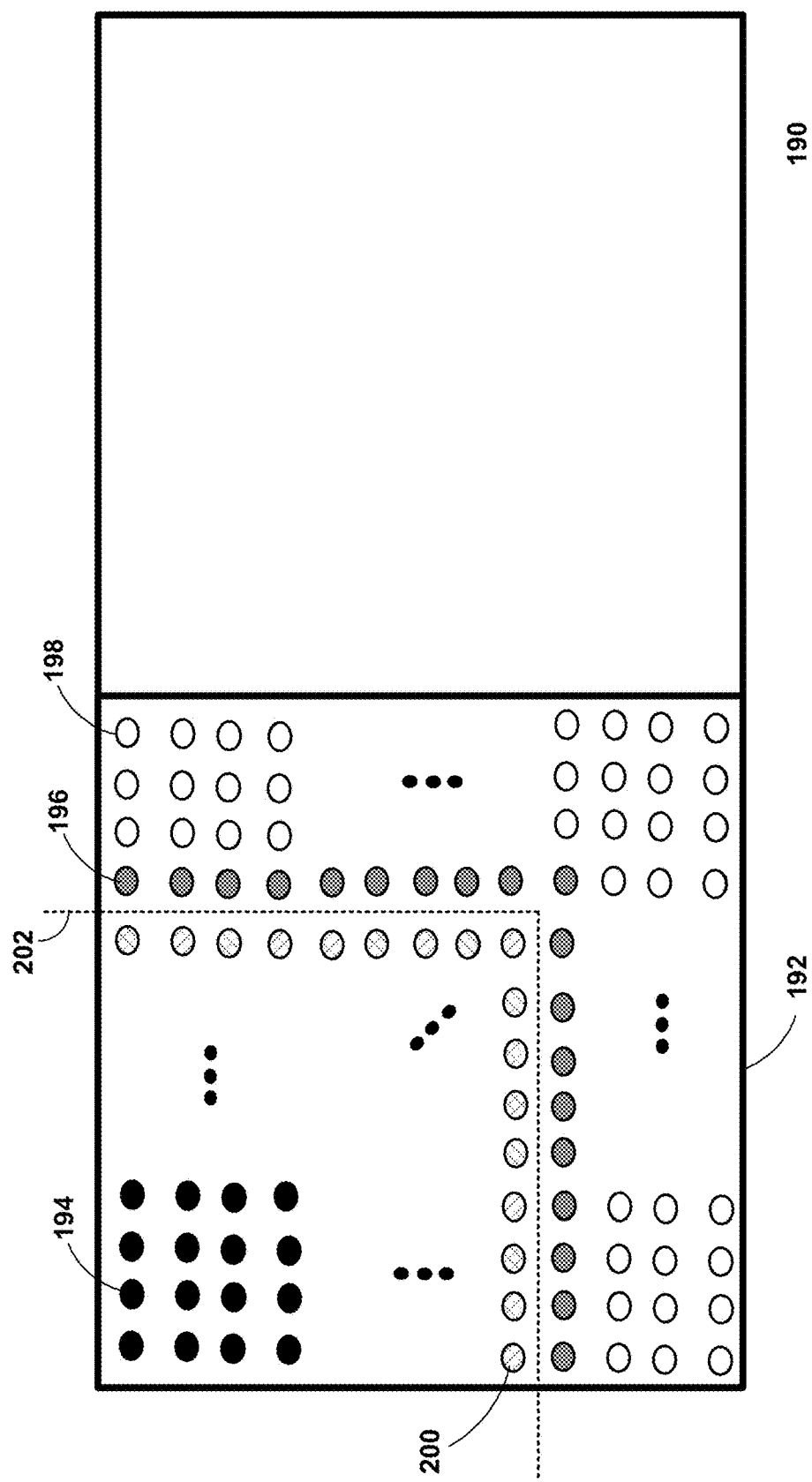
FIGS. 5A-5C are conceptual diagrams illustrating boundaries for defining an intended region relative to samples of video data that are deblock filtered and sample adaptive offset (SAO) filtered in a neighboring largest coding unit.
Figure 5B:
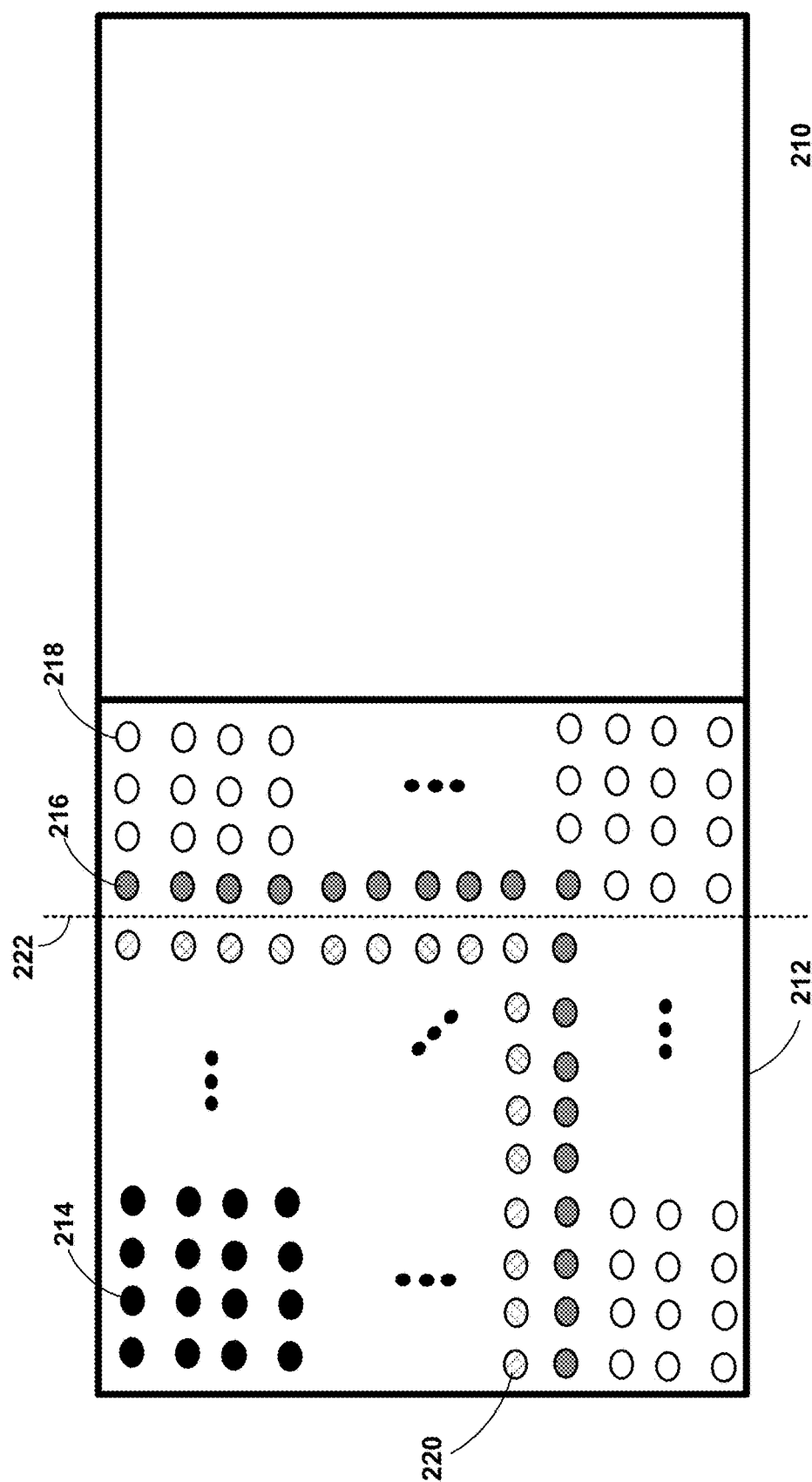
Figure 5C:
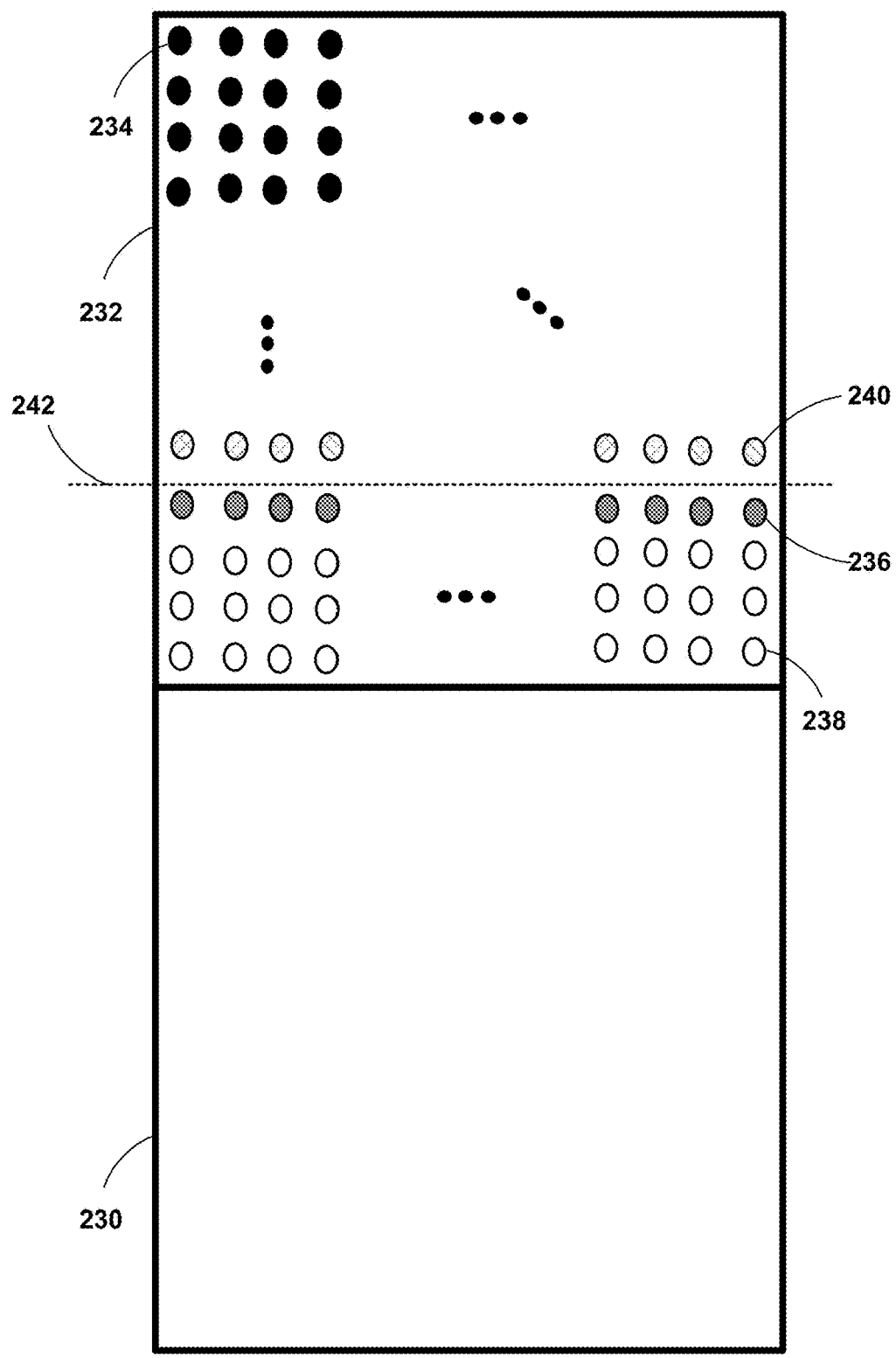

FIGS. 5A-5C are conceptual diagrams illustrating boundaries for defining an intended region relative to samples of video data that are deblock filtered and sample adaptive offset (SAO) filtered in a neighboring LCU. FIG. 5A illustrates a current LCU 190 and a left-neighboring LCU 192. In FIG. 5A, deblock filtered pixels 194 in left LCU 152 are illustrated by filled-in circles. Non-deblock filtered pixels 196 that will not be deblock filtered are shown in FIG. 5A as shaded circles. Non-deblock filtered pixels 198 that have not yet been deblock filtered are shown in FIG. 5A as empty circles.

Additionally, pixels 200 that have not been deblock filtered, but have been SAO filtered, are illustrated in FIG. 5A as cross-hatched circles. Line 202 illustrates an example boundary of an intended region and limit of two-dimensional block vector size that may be applied by video encoder 20 when encoding blocks of video data within current LCU 190. As illustrated by line 202, video encoder 20 may limit intended region to avoid SAO filtered pixels 200. Accordingly, line 202, and the corresponding boundary of the intended region, may be moved relative to line 160 of FIG. 4A.

FIG. 5B illustrates a current LCU 210 and a left-neighboring LCU 212. In FIG. 5B, deblock filtered pixels 214 in left LCU 212 are illustrated by filled-in circles. Non-deblock filtered pixels 216 that will not be deblock filtered are shown in FIG. 5B as shaded circles. Non-deblock filtered pixels 218 that have not yet been deblock filtered are shown in FIG. 5B as empty circles. Additionally, pixels 220 that have not been deblock filtered, but have been SAO filtered, are illustrated in FIG. 5B as cross-hatched circles.

As discussed above, a video coder may perform horizontal deblock filtering followed by deblock vertical filtering, e.g., may horizontally filter pixels in the lower-left portion of left LCU 212 prior to vertically filtering the pixels along the bottom of left LCU 162 when the lower neighboring LCUs become available. To facilitate such horizontal filtering, video encoder 20 may limit the intended region within 212, such as based on vertical line 222 illustrated in FIG. 5B, to allow horizontal filtering of those pixels. Additionally, as illustrated by line 222, video encoder 20 may limit intended region to avoid SAO filtered pixels 220. Accordingly, line 202, and the corresponding boundary of the intended region, may be moved relative to line 169 of FIG. 4B.

FIG. 5C illustrates a current LCU 230 and an upper-neighboring LCU 232. In FIG. 5C, deblock filtered pixels 234 in upper-neighboring LCU 232 are illustrated by filled-in circles. Non-deblock filtered pixels 236 that will not be deblock filtered are shown in FIG. 5C as shaded circles. Non-deblock filtered pixels 238 that have not yet been deblock filtered are shown in FIG. 5C as empty circles. Additionally, pixels 240 that have not been deblock filtered, but have been SAO filtered, are illustrated in FIG. 5C as cross-hatched circles.

In case of upper neighboring LCU 232, video encoder 20 may limit the intended region and two-dimensional block vectors to avoid deblock and SAO filtered pixels as illustrated by line 242 in FIG. 5C, which may be at a different position then line 180 in FIG. 4C. However, as discussed above, extending an intended region into an upper neighboring LCU may lead to delay of horizontal deblock filtering of pixels in the upper neighboring LCU. To allow horizontal deblock filtering in this area, video encoder 20 may define a vertical limit of the intended region and block vectors to be within the current LCU, or to not exceed the upper boundary of the current LCU, e.g., as illustrated in FIG. 3.

Figure 6:
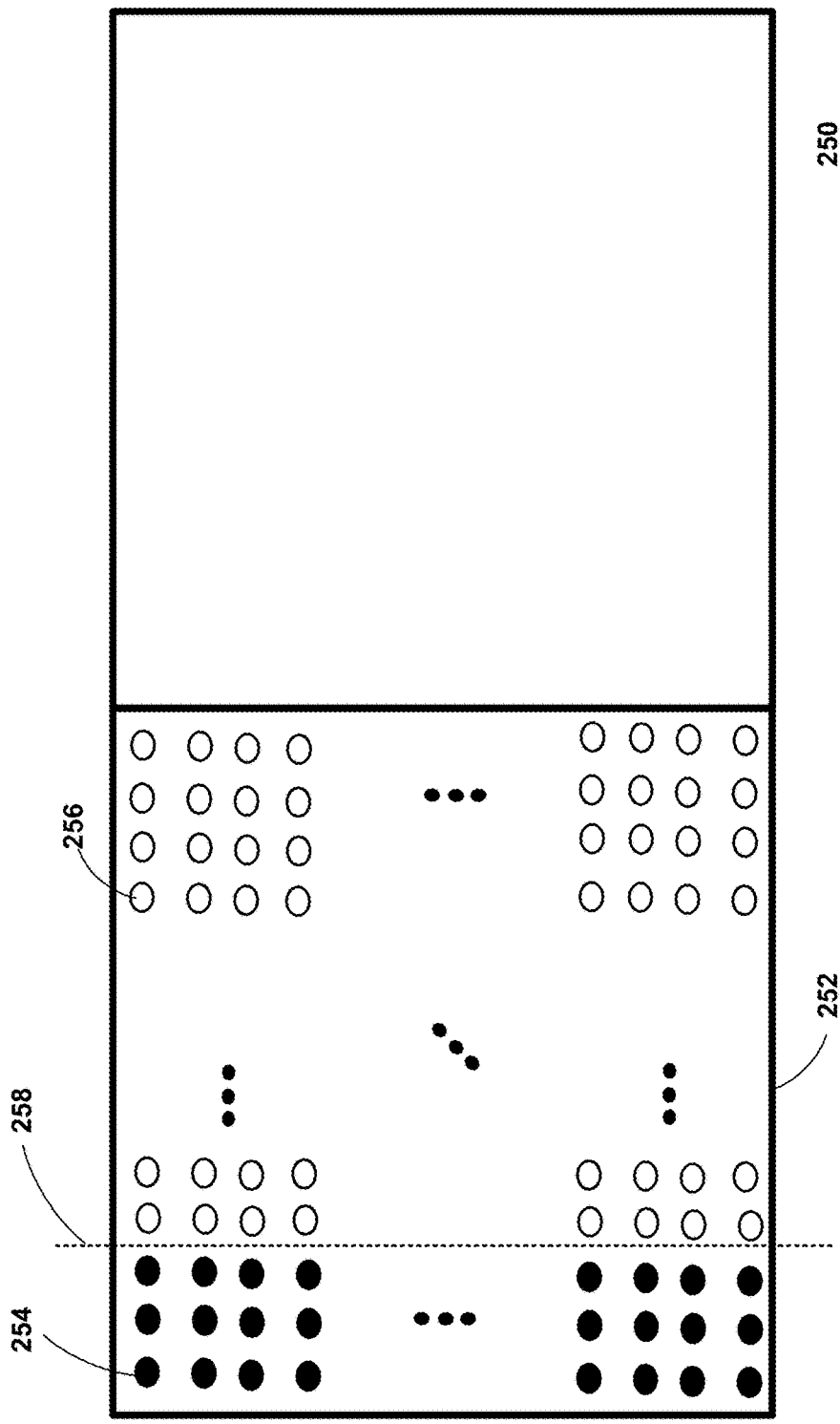
FIG. 6 is a conceptual diagram illustrating a boundary for defining an intended region relative to samples of video data that are deblock filtered in a neighboring largest coding unit.

FIG. 6 is a conceptual diagram illustrating a boundary for defining an intended region relative to samples of video data that are deblocking filtered in a neighboring largest coding unit. FIG. 6 illustrates a current LCU 250 and a left-neighboring LCU 252. FIG. 6 also illustrates deblock filtered pixels 254 with solid circles, and pixels 256 that have not been deblock filtered with empty circles.

In some examples, video encoder 20 may limit the intended region and the horizontal component of a two dimensional block vector such that only the part of left LCU 252 which is on the right of line 258 may be used as the intended region. Since the horizontal deblocking of the left boundary of left LCU 252 may only affect the three left most columns of pixels in left LCU 252, the coding of current LCU 250 and the deblocking of the left boundary of left LCU 252, can be performed at the same time.

Although described in the context of two-dimensional block vectors, the techniques for defining an intended region described with respect to FIGS. 3, 4A-4C, 5A-5C, and 6 may be applied to IntraBC using one-dimensional block vectors, e.g., such as the IntraBC using one-dimensional block vectors described in JCT-VC M0350. For example, when performing IntraBC using one-dimensional block vectors, instead of restricting the vertical motion vector to the current LCU, the vertical motion vector can be allowed to extend to four additional bottom-most lines from the top-neighboring LCU.

Although video encoder 20 may define the intended region to exclude in-loop filtered video blocks, video coders, e.g., video encoder 20 and/or video decoder 30, may eventually in-loop filter such video blocks and the current video block that was coded with the IntraBC mode. In some examples, the video coders apply a deblocking filter that is also applied to video blocks, e.g., CUs, coded with Intra mode to the video blocks, e.g., CUs, coded using the IntraBC mode as described herein. In some examples, the video coders apply a deblocking filter that is also applied to video blocks, e.g., CUs coded with Inter mode to the video blocks, e.g., CUs, coded using the IntraBC mode as described herein. In some examples, use of the deblocking filter from the Intra mode or the Inter mode, or the use of any other deblocking filter for the IntraBC mode, may be selective, e.g., on a per-unit, per-slice, per-picture, or per-sequence basis.

Video encoder 20 may also define the intended region for a current block of video data based on the on/off and the length of an interpolation filter. Generally the interpolation for pixels at sub-pel position (e.g., 1/2) needs pixels at neighboring integer positions (e.g., . . . , −k, . . . , −1, 0, 1, . . . k+1). HEVC, k=3 for luma pixels and k=1 for chroma pixels.

In the case of chroma pixels, to make sure a vertically fetched chroma pixel is in the intended region, e.g., below the vertical boundary of the current LCU, video encoder 20 may limit the minimum (e.g., the most negative one, or corresponding to the highest position from the top of the picture boundary) vertical chroma motion vector component MVC_y to point to row k (i.e., the first row is row 0) of the current LCU. Video encoder 20 may limit the maximum (e.g., the least negative one, or corresponding to lowest position from the top of the picture boundary) chroma motion vector MVc_y to be −CU_height_chroma−k. The reason for such limits on the intended region is that if MVc_y=−CU_height_chroma, the predictive block is the immediate top neighbor of the current CU. Consequently, if MVc_y is −CU_height_chroma −0.5, the video coder needs to interpolate predictive block using neighboring integer positions, including k pixels in the current CU, which are not available during prediction of the current CU.

Similarly, to make sure horizontally the fetched chroma pixels are in the intended region, e.g., the current LCU and the left LCU, MVc_x may be limited to 1. The minimum MVc_x points to column k (the first column is column 0) of the left LCU. 2. The maximum MVc_x=−CU_width_chroma −k.

In addition, video encoder 20 may limit the intended region such that the horizontally the fetched chroma pixels are in an intended region including the current LCU and the N most right columns of the left-neighboring LCU. As examples, N may be 2 for chroma and 4 for luma if the color format is 4:2:2 or 4:2:0, and 4 for both chroma and luma if the color format is 4:4:4. The N most right columns of the left-neighboring LCU may be designated column x, x+1 . . . x+N−1 of the left LCU. In some examples, video encoder 20 may limit MVc_x such that the minimum MVc_x points to column x+k of the left LCU. If the left-neighboring LCU has only K columns that K<x+k, the minimum MVc_x points to x+k−K in the current LCU. In some examples, video encoder 20 may limit MVc_x such that the maximum MVc_x=−CU_width_chroma−k.

Although described primarily with respect to chroma pixels, these techniques for video encoder 20 to determine the maximum and minimum values of the horizontal and vertical components of motion vectors, which are also referred to as block vectors or two-dimensional vectors, may be applied to luma pixels. Furthermore, as described above, in some examples, video encoder 20 may only encode one or more syntax elements defining two-dimensional vectors for luma video blocks into the encoded video bitstream, and video decoder 30 may derive two-dimensional vectors 106 for each of one or more chroma blocks corresponding to a luma block based on the two-dimensional vector signaled for the luma block. In such examples, the video coders may need to modify, e.g., scale or downsample, the luma vector for use as a chroma vector. In some examples, video encoder 20 may define intended region 108, set the maximum and/or minimum values of the horizontal and/or vertical components of a luma block vector, or scale the converted vector, such that a convened luma vector used for predicting a chroma block will not point to predictive chroma blocks that are not reconstructed, or that are in-loop filtered.

In addition, or as an alternative to defining the intended region avoid using unavailable or in-loop filtered pixels, video coders may use pixel padding to allow block vectors to point outside of the intended region. Using pixel padding, if a pixel outside the intended region is needed, a video coder may replace the pixel with the value of the closest pixel that is within in the intended region, as an example. For example, assuming the minimum MVc_x for a current LCU can point to column 0 of the left-neighboring LCU of the current LCU, and the maximum MVc_x=−CU_width_chroma, if MVc_x points to a sub-pel (say 1/2) position, a reference pixel from the left-neighboring LCU of the left-neighboring LCU is needed for interpolation. For example, if the location to be interpolated is (x=0.5, y) in the left-neighboring LCU, then (−k, y), (−k+1, y), . . . (−1, y) are needed for interpolating (x=0.5, y). These pixels may in the left-neighboring LCU of the left-neighboring LCU of the current LCU, in such examples, a video coder may use pixel value at (0, y), which is in the left-neighboring LCU, to replace these pixel values. Although described with respect to chroma pixels, a video coder tray apply these pixel padding techniques to luma pixels.

In some examples, rather than coding syntax elements that directly specify the two-dimensional vector for IntraBC of a current video block, e.g., a PU, video coders may code, e.g., video encoder 20 may encode and video decoder 30 may decode, a residual two-dimensional vector for the current video block. Video encoder 20 may determine a predictive two-dimensional vector, having a predictive horizontal component and a predictive vertical component, for the current two-dimensional vector of the current video block. Video encoder 20 may determine the residual two-dimensional vector, having a residual horizontal component and a residual vertical component, based on the difference between the current and predictive two-dimensional vectors. Video decoder 30 may also determine the same predictive two-dimensional vector video encoder 20, and determine the current two-dimensional vector based on the sum of the determined predictive two-dimensional vector and the decoded residual two-dimensional vector. In other words, rather than coding syntax elements for the horizontal and vertical components Vi (i can be x or y) of the current two-dimensional vector of the current video block, video coders may determine horizontal and vertical components PVi (where i may be x or y) of a predictive two-dimensional vector and code only the horizontal and vertical prediction error Vdi (where i may be x or y), or residual two-dimensional vector.

Video encoder 20 and video decoder 30 may determine the predictive two-dimensional vector in a variety of ways. In some examples, video coders, e.g., video encoder 20 and/or video decoder 30 may keep a variable storing the last two-dimensional vector used to most-recently predict a block according to IntraBC in memory. In such examples, video coders may use this stored last IntraBC vector for the last IntraBC block as the predictive two-dimensional vector for the current video block, e.g., PU.

Figure 7:
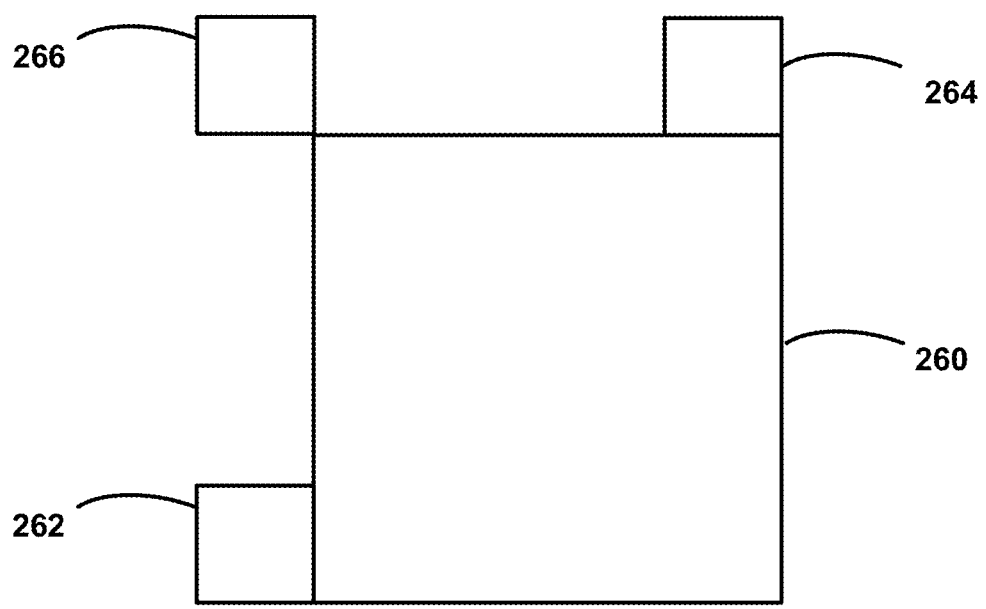
FIG. 7 is a conceptual diagram an example of a current block of video data and neighboring blocks of video data from which candidate predictive vectors for the current block of video data may be derived.

FIG. 7 is a conceptual diagram an example of a current block of video data 260 and neighboring blocks of video data 262, 264, 266 from which candidate predictive vectors for the current block of video data may be derived. In some examples, similar to merge mode or Advanced Motion Vector Prediction (AMVP) mode for inter prediction, video coders may determine the predictive two-dimensional vector for a current video block, e.g. PU, based on the two-dimensional vectors used to predict neighboring video blocks, e.g., PU, using IntraBC. The neighboring blocks illustrated in FIG. 7 include a left neighboring block 262, above (top) neighboring block 264, and above-left (top-left) neighboring block 266. The neighboring blocks illustrated in FIG. 7 are one example. In other examples, a video coder may consider the vectors of more, fewer and/or different neighboring blocks, such as any neighboring block that may be considered according to the merge and AMVP modes for inter-prediction.

The predictor may be the horizontal and/or vertical displacement component of the two-dimensional motion vector from a selected one of the neighboring blocks. In some examples, the predictor is always from a specific neighboring unit, e.g. the top one or the left one. In some examples, which of the neighboring blocks provides the predictive two-dimensional motion vector for a current PU is determined based on the index of the PU and/or the PU shape. In some examples, the predictor can be a function (such as a mean or median) of the horizontal and/or vertical components of the two-dimensional motion vector from a plurality of neighboring units.

In general, if a neighboring block cannot provide a predictive two-dimensional vector, then the predictive two-dimensional vector (or candidate predictive two-dimensional vector) may be set to zero or a default two-dimensional vector. In some examples, the vectors of neighboring blocks will only be available as predictive vectors for a current video block when the neighboring video block was predicted according to IntraBC. In other words, neighboring blocks not coded with the IntraMC mode may be considered unavailable for block vector prediction for the current video block. For example, when the predictor is always front the left neighboring block and the left neighboring block was predicted with IntraMC mode, its two-dimensional vector is used as the predictive two-dimensional vector. When the predictor is always from the left neighboring block and the left neighboring block was not predicted with IntraMC mode, video coders may use a zero vector or default vector as the predictive two-dimensional vector for the current video block.

In some examples, a video coder may consider the two-dimensional vector of neighboring video blocks unavailable for prediction of the two-dimensional vector of the current video block if it is not in the in the same LCU or other larger or largest coding unit as the current video block, e.g., CU or PU. In some examples, if the current two-dimensional vector for the current video block e.g., PU or CU, is the first one of the current CU or LCU, the predictive two-dimensional vector for the current video block may be set to zero or a default two-dimensional vector. It is possible that the upper neighboring CU is considered to be unavailable if the upper neighboring CU and the current CU are not in the same LCU. It is also possible that the left neighboring CU is considered to be unavailable if the left neighboring CU and the current CU are not in the same LCU.

In some examples, in a manner similar to merge mode and AMVP mode for inter-prediction, video encoder 20 and video decoder 30 may construct a set of candidate predictive vectors for the current video block that includes block vectors of a number of neighboring blocks. In such examples, video encoder 20 may encode, and video decoder 30 may decode an index that signals which candidate is used to provide the predictive two-dimensional vector for the current video block. In some examples video coders may determine the horizontal displacement component and vertical displacement component, respectively, of the predictive two-dimensional vector based on different candidate vectors, e.g., from different neighboring blocks. In such examples, video coders may code a respective index into the candidate list horizontal and vertical displacement components.

As one example, for a current CU coded according to the IntraBC mode, to code its block vector, video coders check the left and top neighboring CUs. If neither of them is available, e.g., was coded according to IntraBC, a video coder may determine that the predictive two-dimensional vector of the current CU is a zero vector (for both horizontal and vertical components). If only one of the neighboring CUs is available, e.g., was coded with IntraBC, the video coders use the vector that was used for prediction of the available neighboring CU as the predictive two-dimensional vector of current two-dimensional vector of the current CU. If both neighboring CUs are available, e.g., was coded with IntraBC, and their two-dimensional vectors are the same, then this two-dimensional vector is used as the predictive two-dimensional vector. If both neighboring CUs are available, e.g., were coded with IntraBC, and their block vectors are different, then the video coders may code a flag or other syntax element to indicate whether the block vector from the top neighboring CU or the block vector from the left neighboring CU is used as the predictive two-dimensional vector for the current CU In another example, video coders may define two or more default motion vectors, which can be from (as a non-limiting example) the set $(-w, 0)$, $(-2w, 0)$, $(-8, 0)$, $(0,0)$, $(0, 8)$, $(0, -h)$, $(0, -2h)$, where w and h are the width and the height of the current video block e.g., CU, and the first component is horizontal displacement and the second component is vertical displacement. If both the left neighboring CU and the upper neighboring CU are available, the video coders may use their vectors as the first and the second predictive two-dimensional vectors for the current CU. If one of them is not available, video coders may use a default predictive vector to replace the unavailable predictive vector in a list of candidate predictive vectors. If both of them are not available, the video coders may use two default predictive vectors, which may be the same or different, to replace the unavailable predictive vector in a list of candidate predictive vectors. An advantage of replacing unavailable predictive vectors with default vectors in a candidate list is that a flag for the selection between predictors may also be included in the encoded video bitstream, so that video decoder 30 does not need to conditionally parse this flag. Although examples are described herein with respect to a candidate list including two predictive vectors derived from two neighboring blocks, if the blocks/vectors are available, in other examples a video coder may consider more or fewer neighboring blocks, and include more or fewer predictive two-dimensional vectors in a candidate list.

In some examples, for the first video block and corresponding two-dimensional vector used for IntraBC in each LCU, the video coders may use a different derivation process for determining its predictive two-dimensional vector than for other blocks and associated vectors within the LCU. For example, a video coder, e.g., video encoder 20 and/or video decoder 30, may determine that the predictive two-dimensional vector for the first video block and corresponding two-dimensional vector used for IntraBC in the LCU is a default two-dimensional vector. The default two-dimensional vector may be (–w, 0), where w is the width of the current video block e.g., CU. In other examples, the default two-dimensional vector may be (–2w, 0), (–8, 0), (0,0), (0, 8), (0, –h), (0, –2h), where w and h are the width and the height of the current video block, e.g., CU. In other examples, a video coder, e.g., video encoder 20 and/or video decoder 30, may derive the predictive two-dimensional vector for the first video block and corresponding two-dimensional vector used for IntraBC in the LCU as in described in U.S. Provisional Application No. 61/893,794, filed on Oct. 21, 2013, and incorporated by reference in its entirety. In some examples, video coders may derive predictive two-dimensional vectors for the first video block coded using IntraBC in an LCU differently for video blocks, e.g., CUs, with different sizes or at different position in the LCU, or in other words may derive predictive two-dimensional vectors for the first video block coded using IntraBC in an LCU differently based on video block size or position in the LCU.

In some examples, video coders may select the method or methods used to determine the horizontal and vertical components of the two-dimensional vector of the current video block can be based on flags, syntax elements, of based on other information (such as the specific color space (e.g., YUV, RGB, or the like), the specific color format (e.g., 4:2:0, 4:4:4, or the like), the frame size, the frame rate, or the quantization parameter (QP), or based on previously coded frames).

In some examples, video encoder 20 may encode a flag, e.g., an IntraMC_flag Or IntraBC_flag, to indicate to video decoder 30 whether a video block, e.g., CU, is encoded using the mode for predicting current video blocks based on predictive video blocks in the same picture, which may be referred to as the IntraMC or IntraBC mode. The flag may be a 1-bit flag whose value indicates whether or not one or more CUs, or other blocks or units, are encoded using the IntraMC or IntraBC mode, e.g., as described herein. Video coders may code a value of the flag for each video block, e.g., CU or PU, or may code a value of the flag to each of a plurality of video blocks, e.g., within a slice, or within a frame or picture, or sequence of pictures. Video coders may code the flag in, as examples, a slice header, a parameter set (e.g., PPS), or an SEI message.

Video coders may code the flag in bypass mode, or arithmetic encode, e.g., CABAC encode, the flag with context. In some examples, video coders may arithmetic code, e.g., CABAC encode, the flag with a single, fixed context that does not depend on neighboring video blocks. Tri other examples, video coders may arithmetic code, e.g., CABAC encode, the flag with a context derived from neighboring video blocks.

Referring to FIG. 7, when video coders code the flag for a current video block 260 using CABAC context, the value of context can be derived from the neighboring video blocks such as the top (above) neighboring video block 264, the top-left (above-left) neighboring video block 266, or the left neighboring video block 262. Video coders may consider neighboring video blocks, such as top neighboring video block 264, available for deriving a context for the current video block when it is within the same LCU as the current video block, and unavailable when the neighboring video block is out of the current LCU.

As an example, for a current video block, video coders may derive the context value=(top IntraMC_flag==0) ? 0 : 1+(left IntraMC_flag==0) ? 0 : 1. In some examples, video coders may always derive the context for current video block 260 from a specific one of neighboring video blocks 262, 264, 266, e.g., left neighboring video block 262, and the context value for the current video block is (left IntraMC_flag==0) ? 0 : 1, in some examples, video coders code the flag using a context value that depends on the size of the video block, e.g., CU. In some examples, video blocks with different sizes have different context values. In other words, each video block, e.g., CU, size may be associated with a respective, unique, context value. In some examples, several video blocks, e.g., CUs, with different predefined sizes share the same context value, and video blocks with other sizes use one or more different context values. In other words, video coders may associate each of a plurality of context values with a respective set or range(s) of possible video block, e.g., CU, sizes.

In some examples, video coders, e.g., video encoder 20 and/or video decoder 30, may code the horizontal displacement component and vertical displacement component of a two-dimensional vector for IntraBC (e.g., horizontal displacement component 112 and vertical displacement component 110 of two-dimensional vector 106 in FIG. 2) based on unary codes. In other examples, video coders may code the horizontal displacement component and vertical displacement component based on exponential Golomb or Rice-Golomb codes.

In some examples, the horizontal and vertical displacement components may only indicate regions above and to the left of the current video block, and the video coders may not need to retain or code sign bits for these values. In some examples, video coders may construct a frame of reference such that the areas above and to the left of the current video block may represent positive directions relative to the current video block. In such examples, if only the video blocks above and/or to the left of the current video block are considered as candidate predictive video blocks, video coders may not need to retain or code sign bits because it may be pre-defined that all values of the horizontal displacement component and vertical displacement component represent positive (or negative) values and indicate video blocks above and/or to the left of the current video block.

In some examples, the maximum size of these two-dimensional vectors (or the difference between one or more two-dimensional vectors, such as a residual two-dimensional vector) may be small, e.g., due to the definition of the intended region and/or pipeline constraints, as discussed above. In such examples, video encoder 20 may binarize these two-dimensional motion vectors with truncated values. In some examples, video encoder 20 may employ truncated unary, truncated exponential-golomb, or truncated golombrice codes in entropy encoding the two-dimensional vectors, e.g., in encoding the horizontal displacement component and vertical displacement component of the two-dimensional vectors.

The truncation value video encoder 20 may use in any of the various truncated encoding schemes described herein can be constant, e.g., based on the LCU size. In some examples, the truncation value may be the same for the horizontal displacement component and vertical displacement component. In other examples, the truncation value may be different for horizontal displacement component and vertical displacement component.

As one illustrative example, if the size of an LCU is 64, e.g., 64×64, and the vertical components of the two-dimensional vectors are limited to be within the LCU, e.g., as described above with respect to FIG. 3, then the truncation can be equal to 63 for the horizontal component of the two-dimensional vector, and equal to 63−MinCUSize for the vertical component of the two-dimensional vector. In some examples, the truncation value can be adaptive depending on the position of the current video block within the LCU. For example, if the vertical component of the two-dimensional vector is limited to be within the LCU, then video encoder can truncate the vector binarization to the difference between the top position of the current video block and the top position of the LCU.

Video encoder 20 may entropy encode the binarizations of the horizontal and vertical components of the two-dimensional vector using bypass mode, or may arithmetic encode the binarizations, e.g., with CABAC context. For example, video encoder 20 limits the search for a predictive video block to an intended region, e.g., as illustrated in FIG. 3, the distribution of the components of the two dimensional vector (MV) may not be zero-centered. For example, MV_x tends to be negative since pixels on the right of the current video block, e.g., CU, (in the same row) have not been encoded/reconstructed. Similarly, MV_y tends to be negative since pixels below the current video block, e.g., CU, (in the same column) have not been encoded/reconstructed.

Bypass mode may assume equal probability for 0 and 1. For sign, this means that bypass mode assumes an equal probability of being positive or negative. Because the components of the two-dimensional vector do not have equal probability of being positive or negative, video encoder 20 may arithmetic encode, e.g., CABAC encode, the sign with context, e.g., with an initial probability other than 0.5.

One example of how video encoder 20 may encode the horizontal component of the two-dimensional vector (MV_x) is as follows. Although described with respect to MV_x, the technique could also be applied to encode the vertical component of the two-dimensional vector (MV_y), or the horizontal or vertical components of a residual two-dimensional vector that represents the difference between the current vector and a predictive vector, e.g., mvd_x and mvd_y.

MV_x may be represented by a sign value, and a binarization string (for abs(MV_x)) b0 b1 . . . . The first bin b0 indicates if abs(Mv_x)>0 (b0=1) or not (b0=0). Video encoder 20 may encoder the first bin b0 using CABAC, with a context. The b0 for Mv_x and Mv_y may have separate contexts, or may share the same contexts. In some examples, the i-th bin in MV coding of IntraBC share the same contexts with the i-th bins in motion vector coding of Inter motion compensation. In some examples, the i-th bins in MV coding of IntraBC and motion vector coding of Inter motion compensation do not share contexts.

The following bins b1 b2 . . . represent the value of abs(MV_x)−1, and video encoder 20 may encode these bins using Exponential Golomb codes with parameter 3 in bypass mode. In some examples, video encoder 20 uses other orders of Exponential Golomb codes, e.g., 1, 2, 4, 5. In some examples, b1 represents if abs(MV_x)=(b1=1) or not (b1=0). In some examples, video encoder 20 may encode b1 with bypass mode or with CABAC context.

In some examples, b2b3 . . . represent the value of abs(MV_x)−2, and video encoder 20 may encode these bins using Exponential Golomb codes with parameter 3, or other orders of Exponential Golomb codes, in bypass mode. The last bin may indicate the sign of MV_x, and video encoder 20 may encode this bin in bypass mode without any context. In other examples, video encoder 20 may encode the sign bin encoded using CABAC with one or multiple contexts. The sign bins for MV_x and MV_y may have separate contexts, or it is possible that they share the same contexts.

In some examples, video coders, e.g., video encoder 20 and/or video decoder 30, may limit application of the IntraBC mode, and any associated coding of flags, vector components, or other syntax, to video blocks of a certain size, i.e., that meet a certain size criteria. The size criteria may be one or both of a maximum block size and/or a minimum block size (e.g., IntraMC_MaxSize and IntraMC_MinSize). Video encoder 20 may indicate the one or more size criteria to video decoder 30 in the encoded video bitstream, e.g., using flags or other syntax elements, or video coders may implicitly determine the size criteria based on other information, such as the specific color space (e.g., YUV, RGB, or the like), the specific color format (e.g., 4:2:0, 4:4:4, or the like), the frame size, the frame rate, the quantization parameter (QP), or based on previously coded frames. For example, IntraBC for small sizes might have an impact on the memory bandwidth requirements of the system, and video coders may apply a minimum block size criteria to restrict IntraBC to blocks above a size threshold.

Figure 8:
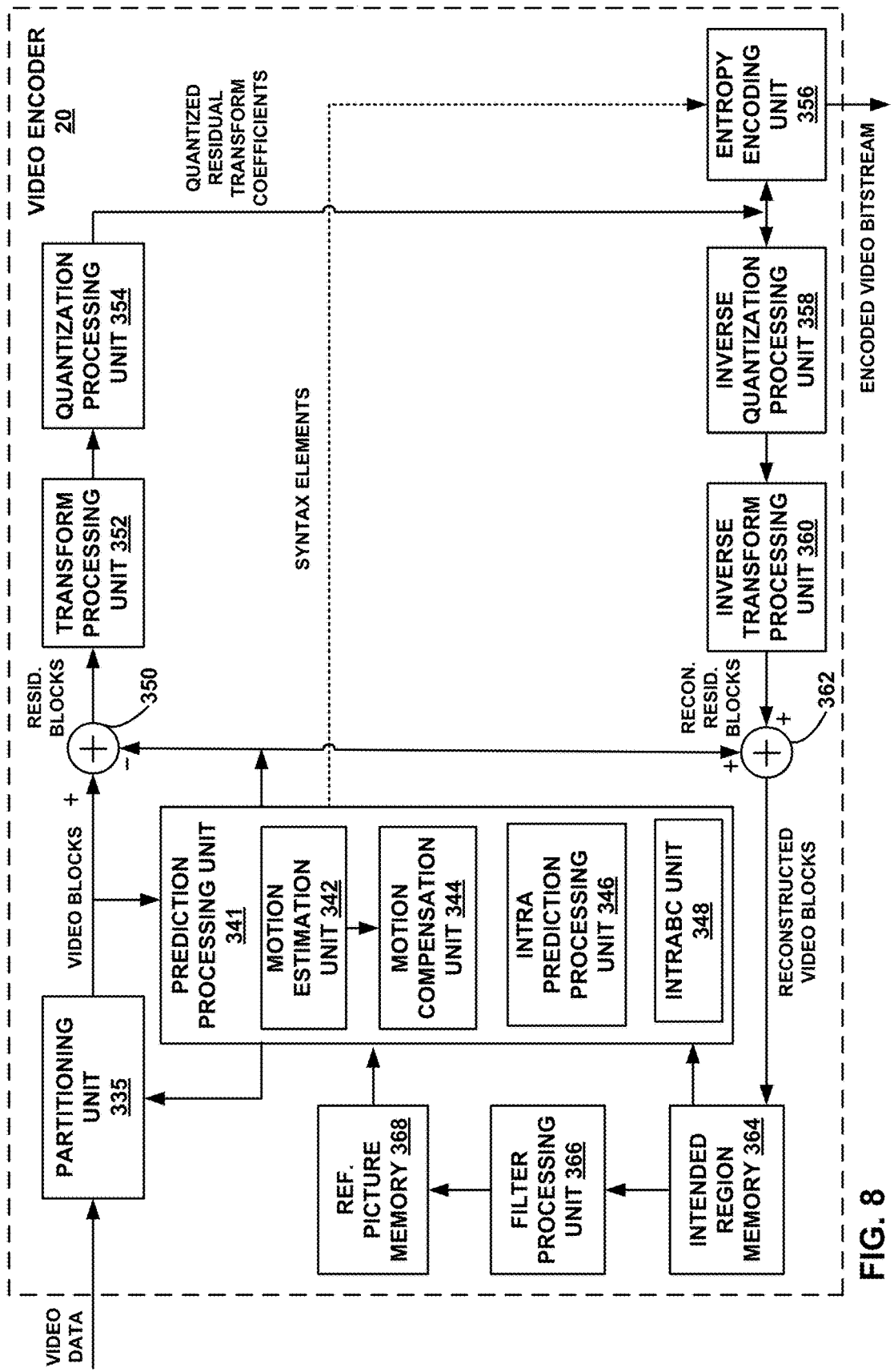
FIG. 8 is a block diagram illustrating an example video encoder that may implement the techniques described in this disclosure.
Figure 9:
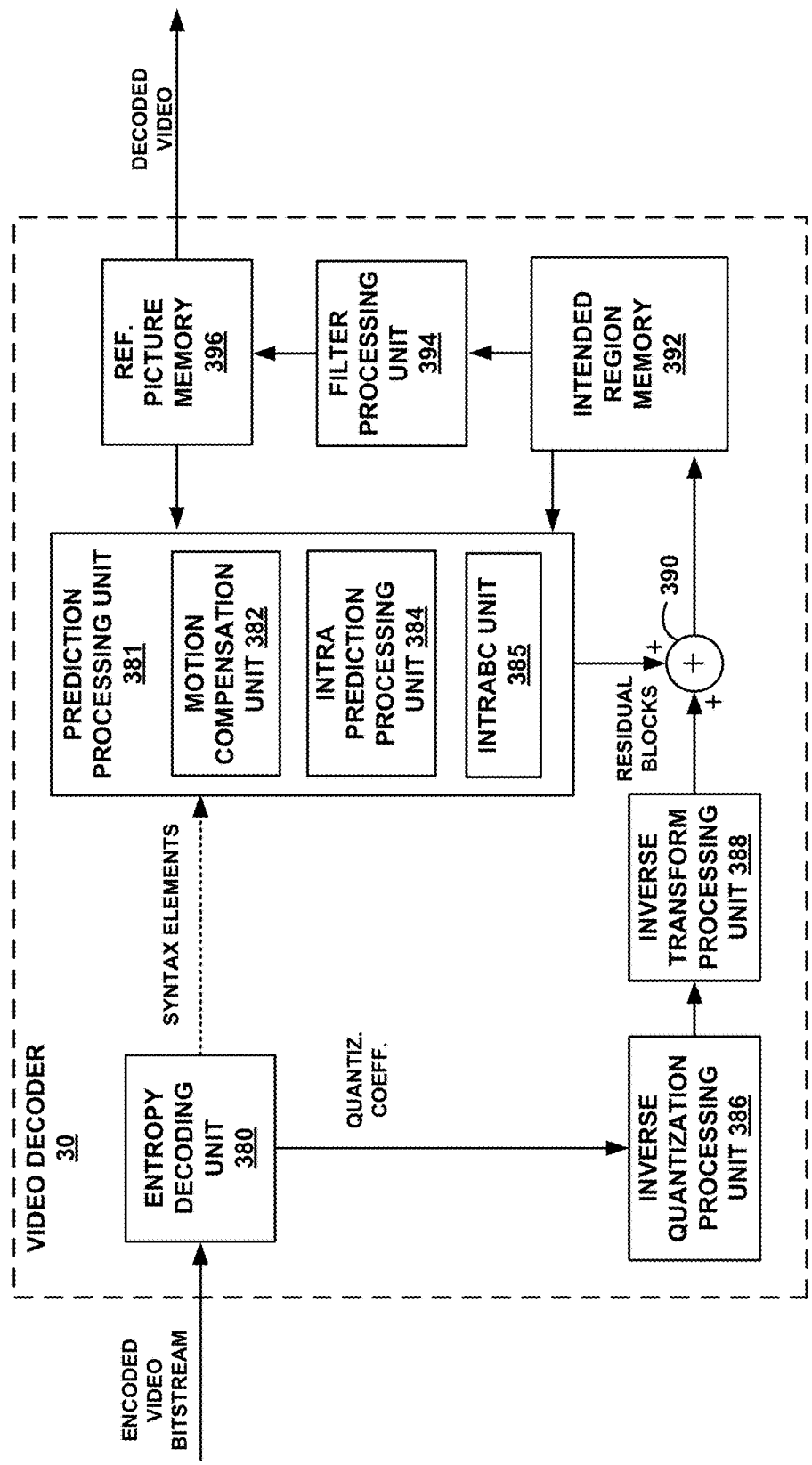
FIG. 9 is a block diagram illustrating an example video decoder that may implement the techniques described in this disclosure.

FIG. 8 is a block diagram illustrating an example video encoder that may implement the techniques described in this disclosure. Video encoder 20 may perform intra- and inter-coding of video blocks within video slices. Intra coding relies on spatial prediction to reduce or remove spatial redundancy in video within a given video frame or picture. Inter-coding relies on temporal or inter-view prediction to reduce or remove redundancy in video within adjacent frames or pictures of a video sequence. Intra-mode (I mode) may refer to any of several spatial based compression modes. Inter-modes, such as uni-directional prediction (P mode) or bi-prediction (B mode), may include to any of several temporal-based compression modes. Video encoder 20 may also be configured to utilize a mode for intra prediction of blocks of video data from predictive blocks of video data within the same picture, e.g., an IntraBC or IntraMC mode, as described herein.

In the example of FIG. 8, video encoder 20 includes a partitioning unit 335, prediction processing unit 341, intended region memory 364, filler processing unit 366, reference picture memory 368, summer 350, transform processing unit 352, quantization processing unit 354, and entropy encoding unit 356. Prediction processing unit 341 includes motion estimation unit 342, motion compensation unit 344, intra prediction processing unit 346, and Intra Block Copy (IntraBC) unit 348, and. For video block reconstruction, video encoder 20 also includes inverse quantization processing unit 358, inverse transform processing unit 360, and summer 362.

In various examples, a unit of video encoder 20 may be tasked to perform the techniques of this disclosure. Also, in some examples, the techniques of this disclosure may be divided among one or more of the units of video encoder 20. For example, IntraBC unit 348 may perform the techniques of this disclosure, alone, or in combination with other units of video encoder, such as motion estimation unit 342, motion compensation unit 344, intra prediction processing unit 346, intended region memory 364, and entropy encoding unit 356.

As shown in FIG. 8, video encoder 20 receives video data, and partitioning unit 335 partitions the data into video blocks. This partitioning may also include partitioning into slices, tiles, or other larger units, as well as video block partitioning, e.g., according to a quadtree structure of LCUs and CUs. Video encoder 20 generally illustrates the components that encode video blocks within a video slice to be encoded. The slice may be divided into multiple video blocks (and possibly into sets of video blocks referred to as tiles).

Prediction processing unit 341 may select one of a plurality of possible coding modes, such as one of a plurality of intra coding modes, one of a plurality of inter coding modes, or an IntraBC mode according to the techniques described in this disclosure, for the current video block based on error results (e.g., coding rate and the level of distortion). Prediction processing unit 341 may provide the resulting predictive block to summer 250 to generate residual block data and to summer 262 to reconstruct the current block for use in prediction of other video blocks, e.g., as a reference picture.

Intra prediction unit 346 within prediction processing unit 341 may perform intra-predictive coding of the current video block relative to one or more neighboring blocks in the same frame or slice as the current block to be coded to provide spatial compression. Motion estimation unit 342 and motion compensation unit 344 within prediction processing unit 341 perform inter-predictive coding of the current video block relative to one or more predictive blocks in one or more reference pictures, e.g., to provide temporal compression.

Motion estimation unit 342 may be configured to determine the inter-prediction mode for a video slice according to a predetermined pattern for a video sequence. Motion estimation unit 342 and motion compensation unit 344 may be highly integrated, but are illustrated separately for conceptual purposes. Motion estimation, performed by motion estimation unit 342, is the process of generating motion vectors, which estimate motion for video blocks. A motion vector, for example, may indicate the displacement of a PU of a video block within a current video frame or picture relative to a predictive block within a reference picture. Similarly, the two-dimensional vectors used for IntraBC according to the techniques of this disclosure indicate the displacement of a PU of a video block within a current video frame or picture relative to a predictive block within the same frame or picture. IntraBC unit 348 may determine two-dimensional vectors, e.g., block vectors or motion vectors, for IntraBC coding in a manner similar to the determination of motion vectors by motion estimation unit 342 for inter prediction, or may utilize motion estimation unit 342 to determine the two-dimensional vectors.

A predictive block, e.g., identified by motion estimation unit 342 and/or IntraBC unit for inter prediction or IntraBC prediction, is a block that is found to closely match the PU of the video block to be coded in terms of pixel difference, which may be determined by sum of absolute difference (SAD), sum of square difference (SSD), or other difference metrics. In some examples, video encoder 20 may calculate values for sub-integer pixel positions of reference pictures stored in reference picture memory 366 or the intended region of the current picture stored in intended region memory 364. For example, video encoder 20 may interpolate values of one-quarter pixel positions, one-eighth pixel positions, or other fractional pixel positions of the reference picture. Therefore, motion estimation unit 342 and/or IntraBC unit 348 may perform a search for a predictive block relative to the full pixel positions and fractional pixel positions and output a vector with fractional pixel precision.

Motion estimation unit 342 calculates a motion vector for a PU of a video block in an inter-coded slice by comparing the position of the PU to the position of a predictive block of a reference picture. The reference picture may be selected from a first reference picture list (List 0 or RefPicList0) or a second reference picture list (List 1 or RefPicList1), each of which identify one or more reference pictures stored in reference picture memory 364. Motion estimation unit 342 sends the calculated motion vector to entropy encoding unit 356 and motion compensation unit 346.

Motion compensation, performed by motion compensation unit 344, may involve fetching or generating the predictive block based on the motion vector determined by motion estimation, possibly performing interpolations to sub-pixel precision. Upon receiving the motion vector for the PU of the current video block, motion compensation unit 344 may locate the predictive block to which the motion vector points in one of the reference picture lists.

In some examples, IntraBC unit 348 may generate two-dimensional vectors and fetch predictive blocks in a manner similar to that described above with respect to motion estimation unit 342 and motion compensation unit 344, but with the predictive blocks being in the same picture or frame as the current block. In other examples, IntraBC unit 348 may use motion estimation unit 342 and motion compensation unit 344, in whole or in part, to perform such functions for IntraBC prediction according to the techniques described herein. In either case, for IntraBC, a predictive block may be a block that is found to closely match the block to be coded, in terms of pixel difference, which may be determined by sum of absolute difference (SAD), sum of square difference (SSD), or other difference metrics, and identification of the block may include calculation of values for sub-integer pixel positions.

Whether the predictive video block is from the same picture according to IntraBC prediction, or a different picture according to inter prediction, video encoder 20 may form a residual video block by subtracting pixel values of the predictive block from the pixel values of the current video block being coded, forming pixel difference values. The pixel difference values form residual data for the block, and may include both luma and chroma difference components. Summer 250 represents the component or components that perform this subtraction operation. IntraBC unit 348 and/or motion compensation unit 344 may also generate syntax elements associated with the video blocks and the video slice for use by video decoder 30 in decoding the video blocks of the video slice. The syntax elements may include, for example, syntax elements defining the vector used to identify the predictive block, any flags indicating the prediction mode, or any other syntax described with respect to the techniques of this disclosure.

Intra-prediction processing unit 346 may intra-predict a current block, as an alternative to the inter-prediction performed by motion estimation unit 342 and motion compensation unit 344, or the IntraBC prediction performed by IntraBC unit 348, as described above. In particular, intra-prediction processing unit 346 may determine an intra-prediction mode to use to encode a current block. In some examples, intra-prediction processing unit 346 may encode a current video block using various intra-prediction modes, e.g., during separate encoding passes, and intra-prediction module 346 (or prediction processing unit 341, in some examples) may select an appropriate intra-prediction mode to use from the tested modes. For example, intra-prediction processing unit 346 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra-prediction processing unit 346 may calculate ratios from the distortions and rates for the various encoded blocks to determine which intra-prediction mode exhibits the best rate-distortion value for the block.

In any case, after selecting an intra-prediction mode for a block, intra-prediction processing unit 346 may provide information indicative of the selected intra-prediction mode for the block to entropy encoding unit 356. Entropy encoding unit 356 may encode the information indicating the selected intra-prediction mode in accordance with the techniques of this disclosure. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

After prediction processing unit 341 generates the predictive block for the current video block via inter-prediction, intra-prediction, or IntraBC prediction, video encoder 20 forms a residual video block by subtracting the predictive block from the current video block, e.g., via summer 350. The residual video data in the residual block may be included in one or more TUs and applied to transform processing unit 352. Transform processing unit 352 transforms the residual video data into residual transform coefficients using a transform, such as a discrete cosine transform (DCT) or a conceptually similar transform. Transform processing unit 352 may convert the residual video data from a pixel domain to a transform domain, such as a frequency domain.

Transform processing unit 352 may send the resulting transform coefficients to quantization processing unit 354. Quantization processing unit 354 quantizes the transform coefficients to further reduce bit rate. The quantization process may reduce the bit depth associated with some or all of the coefficients. The degree of quantization may be modified by adjusting a quantization parameter. In some examples, quantization processing unit 354 may then perform a scan of the matrix including the quantized transform coefficients. Alternatively, entropy encoding unit 356 may perform the scan.

Following quantization, entropy encoding unit 356 entropy encodes the quantized transform coefficients. For example, entropy encoding unit 356 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding methodology or technique. Entropy encoding unit 356 may perform any of the techniques described herein for binarization and encoding syntax elements, including vector components, flags, and other syntax elements, for the prediction according to the IntraBC mode. Following the entropy encoding by entropy encoding unit 356, the encoded video bitstream may be transmitted to video decoder 30, or archived for later transmission or retrieval by video decoder 30.

Inverse quantization processing unit 358 and inverse transform processing unit 360 apply inverse quantization and inverse transformation, respectively, to reconstruct the residual block in the pixel domain for later use as a reference block for prediction of other video blocks. Motion compensation unit 344 and/or IntraBC unit 348 may calculate a reference block by adding the residual block to a predictive block of one of the reference pictures within one of the reference picture lists. Motion compensation unit 344 and/or IntraBC unit 348 may also apply one or more interpolation filters to the reconstructed residual block to calculate sub-integer pixel values for use in motion estimation.

Summer 362 adds the reconstructed residual block to the motion compensated prediction block produced by motion compensation unit 344 and/or IntraBC unit 348 to produce a reconstructed video block. Intended region memory 364 stores reconstructed video blocks according to the definition of the intended region for IntraBC of a current video block by video encoder 20, e.g., IntraBC unit 348, as described herein. Intended region memory 364 may store reconstructed video blocks that have not been in-loop filtered by filter processing unit 366. Summer 362 may provide the reconstructed video blocks to filter processing unit 366 in parallel with intended region memory 364, or intended region memory 364 may release the reconstructed video blocks to filter processing unit 366 when no longer need for the intended region for IntraBC. In either case, IntraBC unit 348 may search the reconstructed video blocks in intended region memory 364 for a predictive video block within the same picture as the current video block to predict the current video block.

Filter processing unit 366 may perform in-loop filtering on the reconstructed video blocks. In-loop filtering may include deblock filtering to filter block boundaries to remove blockiness artifacts from reconstructed video. In-loop filtering may also include SAO filtering to improve the reconstructed video. Reconstructed blocks, some of which may be in-loop filtered, may be stored in reference picture memory 368 as reference pictures. The reference pictures may include reconstructed blocks that may be used by motion estimation unit 342 and motion compensation unit 344 as a predictive blocks to inter-predict a block in a subsequent video frame or picture.

In this manner, video encoder 20 may be configured to implement the example techniques of this disclosure for intra prediction of blocks of video data from prediction blocks of video data within the same picture, e.g., according to an IntraBC mode. For example, video encoder 20 may be an example of a video encoder configured to perform a method of encoding video data including a mode for intra prediction of blocks of video data from predictive blocks of video data within the same picture, the method comprising selecting a predictive block of video data for a current block of video data from a set of previously encoded blocks of video data within the same picture as the current block of video data. The method further comprises determining a two-dimensional vector, wherein the two-dimensional vector has a horizontal displacement component and a vertical displacement component, wherein the horizontal displacement component represents a horizontal displacement between the predictive block of video data and the current block of video data and the vertical displacement component represents a vertical displacement between the predictive block of video data and the current block of video data. The method further comprises determining a residual block based on the current block of video data and the predictive block of video data, and encoding, in an encoded video bitstream, one or more syntax elements that define the horizontal displacement component and the vertical displacement component of the two-dimensional vector and the residual block Video encoder 20 may also be an example of a video encoder that comprises a memory configured to store an encoded video bitstream, and one or more processors. The one or more processor are configured to select a predictive block of video data for a current block of video data from a set of previously encoded blocks of video data within the same picture as the current block of video data. The one or more processors are further configured to determine a two-dimensional vector, wherein the two-dimensional vector has a horizontal displacement component and a vertical displacement component, wherein the horizontal displacement component represents a horizontal displacement between the predictive block of video data and the current block of video data and the vertical displacement component represents a vertical displacement between the predictive block of video data and the current block of video data. The one or more processor are further configured to determine a residual block based on the current block of video data and the predictive block of video data, and encode, in the encoded video bitstream, one or more syntax elements that define the horizontal displacement component and the vertical displacement component of the two-dimensional vector and the residual block.

FIG. 9 is a block diagram illustrating an example video decoder that may implement the techniques described in this disclosure. In the example of FIG. 9, video decoder 30 includes an entropy decoding unit 380, prediction processing unit 381, inverse quantization processing unit 386, inverse transformation processing unit 388, summer 390, an intended region memory 392, a filter processing unit 394, and reference picture memory 396. Prediction processing unit 381 includes motion compensation unit 382, intra prediction processing unit 384, and an Intra Block Copy (IntraBC) unit 385. Video decoder 30 may, in some examples, perform a decoding pass generally reciprocal to the encoding pass described with respect to video encoder 20 from FIG. 8.

In various examples, a unit of video decoder 30 may be tasked to perform the techniques of this disclosure. Also, in some examples, the techniques of this disclosure may be divided among one or more of the units of video decoder 30. For example, IntraBC writ 385 may perform the techniques of this disclosure, alone, or in combination with other units of video decoder 30, such as motion compensation unit 382, intra prediction processing unit 384, intended region memory 392, and entropy decoding unit 380.

During the decoding process, video decoder 30 receives an encoded video bitstream that represents video blocks of an encoded video slice and associated syntax elements from video encoder 20. Entropy decoding unit 380 of video decoder 30 entropy decodes the bitstream to generate quantized coefficients, motion vectors for inter prediction, two-dimensional vectors for IntraBC prediction, and other syntax elements described herein. Entropy decoding unit 380 may perform the inverse of any of the techniques described herein for binarization and encoding syntax elements, including vector components, flags, and other syntax elements, for the prediction according to the IntraBC mode. Entropy decoding unit 380 forwards the vectors and other syntax elements to prediction processing unit 381. Video decoder 30 may receive the syntax elements at the sequence level, the picture level, the video slice level and/or the video block level.

When the video slice is coded as an intra-coded (I) slice, intra prediction unit 384 of prediction processing unit 381 may generate prediction data for a video block of the current video slice based on a signaled intra prediction mode and data from previously decoded blocks of the current frame or picture. When the video frame is coded as an inter-coded (i.e., B or P) slice, motion compensation unit 382 of prediction processing unit 381 produces predictive blocks for a video block of the current video slice based on the motion vectors and other syntax elements received from entropy decoding unit 280. The predictive blocks may be produced from one of the reference pictures within one of the reference picture lists. Video decoder 30 may construct the reference frame lists, RefPicList0 and RefPicList1, using default construction techniques or any other technique based on reference pictures stored in reference picture memory 396. When the video block is coded according to the IntraBC mode described herein, IntraBC unit 385 of prediction processing unit 381 produces predictive blocks for the current video block based on the two-dimensional vectors and other syntax elements received from entropy decoding unit 380. The predictive blocks may be within an intended region within the same picture as the current video block defined by video encoder 20, and retrieved from intended region memory 392.

Motion compensation unit 382 and IntraBC unit 385 determine prediction information for a video block of the current video slice by parsing the vectors and other syntax elements, and uses the prediction information to produce the predictive blocks for the current video block being decoded. For example, motion compensation unit 282 uses some of the received syntax elements to determine a prediction mode (e.g., intra- or inter-prediction) used to code the video blocks of the video slice, an inter-prediction slice type (e.g., B slice or P slice), construction information for one or more of the reference picture lists for the slice, motion vectors for each inter-encoded video block of the slice, inter-prediction status for each inter-coded video block of the slice, and other information to decode the video blocks in the current video slice. Similarly, IntraBC unit 385 may use some of the received syntax elements, e.g., a flag, to determine that the current video block was predicted using the IntraBC mode, construction information for intended region memory 392 indicating which video blocks of the picture are within the intended region and should be stored in intended region memory, two-dimensional vectors for each IntraBC, predicted video block of the slice, IntraBC prediction status for each IntraBC predicted video block of the slice, and other information to decode the video blocks in the current video slice.

Motion compensation unit 382 and IntraBC unit 385 may also perform interpolation based on interpolation filters. Motion compensation unit 382 and IntraBC unit 385 may use interpolation fillers as used by video encoder 20 during encoding of the video blocks to calculate interpolated values for sub-integer pixels of predictive blocks. In this case, motion compensation unit 382 and IntraBC unit 385 may determine the interpolation filters used by video encoder 20 from the received syntax elements and use the interpolation filters to produce predictive blocks.

Inverse quantization processing unit 386 inverse quantizes, dequantizes, the quantized transform coefficients provided in the bitstream and decoded by entropy decoding unit 380. The inverse quantization process may include use of a quantization parameter calculated by video encoder 20 for each video block in the video slice to determine a degree of quantization and, likewise, a degree of inverse quantization that should be applied, inverse transform processing unit 388 applies an inverse transform, e.g. an inverse DCT, an inverse integer transform, or a conceptually similar inverse transform process, to the transform coefficients in order to produce residual blocks in the pixel domain.

After motion compensation unit 382 or IntraBC unit 385 generates the predictive block for the current video block based on the vectors and other syntax elements, video decoder 30 forms a decoded video block by summing the residual blocks from inverse transform processing unit 388 with the corresponding predictive blocks generated by motion compensation unit 382 and IntraBC unit 385. Summer 390 represents the component or components that perform this summation operation to produce reconstructed video blocks.

Intended region memory 392 stores reconstructed video blocks according to the definition of the intended region for IntraBC of a current video block by video encoder 20, as described herein. Intended region memory 392 may store reconstructed video blocks that have not been in-loop filtered by filter processing unit 394. Summer 390 may provide the reconstructed video blocks to filter processing unit 394 in parallel with intended region memory 392, or intended region memory 392 may release the reconstructed video blocks to filter processing unit 394 when no longer need for the intended region for IntraBC. In either case, IntraBC unit 385 retrieve a predictive video block for a current video block from intended region memory 392.

Filter processing unit 394 may perform in-loop filtering on the reconstructed video blocks. In-loop filtering may include deblock filtering to filter block boundaries to remove blockiness artifacts from reconstructed video. In-loop filtering may also include SAO filtering to improve the reconstructed video. Reconstructed blocks, some of which may be in-loop filtered, may be stored in reference picture memory 368 as reference pictures. The reference pictures may include reconstructed blocks that may be used by motion compensation unit 382 as a predictive blocks to inter-predict a block in a subsequent video frame or picture. Reference picture memory 396 also stores decoded video for later presentation on a display device, such as display device 32 of FIG. 1.

In this manner, video decoder 30 may be configured to implement the example techniques of this disclosure for intra predicting current blocks of video data based on a predictive blocks of video data within the same picture. For example, video decoder 30 may be an example of a video decoder configured to perform a method of decoding video data including a mode for intra prediction of blocks of video data from predictive blocks of video data within the same picture, the method comprising receiving, in an encoded video bitstream, one or more syntax elements that define a horizontal displacement component and a vertical displacement component of a two-dimensional vector and a residual block for a current block of video data, and decoding the one or more syntax elements. The method further comprises determining a predictive block of video data for the current block of video data based on the decoded syntax elements that define the horizontal displacement component and the vertical displacement component of the two-dimensional vector, wherein the predictive block of video data is a reconstructed block of video data within the same picture as the current block of video data, and reconstructing the current block of video data based on the predictive block of video data and the residual block Video decoder 30 may also be an example of a video decoder that comprises a memory configured to store an encoded video bitstream that encodes the video data, and one or more processors. The one or more processors of the video decoder may be configured to decode the one or more syntax elements, determine a predictive block of video data for the current block of video data based on the decoded syntax elements that define the horizontal displacement component and the vertical displacement component of the two-dimensional vector, wherein the predictive block of video data is a reconstructed block of video data within the same picture as the current block of video data, and reconstruct the current block of video data based on the predictive block of video data and the residual block.

Figure 10:
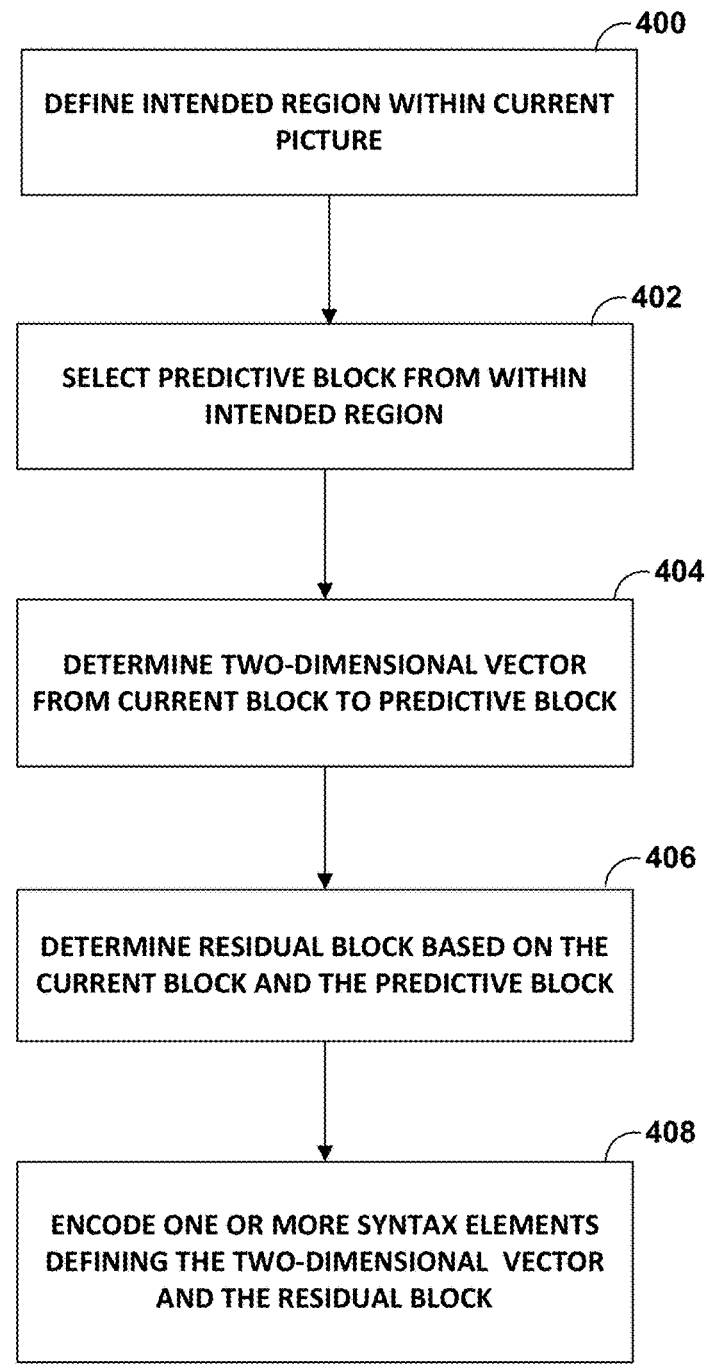
FIG. 10 is a flow diagram illustrating an example method for encoding video data including a mode for intra prediction of blocks of video data from predictive blocks of video data within the same picture.

FIG. 10 is a flow diagram illustrating an example method for encoding video data including a mode for intra prediction of blocks of video data from predictive blocks of video data within the same picture, e.g., an IntraBC mode. The example method of FIG. 10 may be performed by a video encoder, such as video encoder 20, which may include an IntraBC unit 348.

According to the example method of FIG. 10, video encoder 20 defines an intended region within a current picture of a current video block (400). As described herein, video encoder 20 may define the intended region to include the current LCU, or the current LCU and a portion of a left-neighboring LCU that includes reconstructed video blocks that have not been in-loop filtered. In some examples, video encoder 20 may define the intended region such that its height or most vertical position does not exceed the vertical limit of the current LCU. In some examples, video encoder 20 may define the intended region to extend an integer number of pixels, e.g., 64 or the LCU width, in a horizontal direction. By defining intended region, video encoder 20 may constrain one or both of the horizontal and vertical displacement components of a two-dimensional vector, e.g., to be less than a maximum threshold value or greater than a minimum threshold value.

Video encoder 20 selects a predictive block for the current video block from within the intended region (402). Video encoder 20 then determines a two-dimensional vector, e.g., block vector or motion vector (MV), from the current video block to the selected predictive video block (404). Video encoder 20 determines a residual block based on, e.g., based on the difference between, the current video block and the selected predictive video block (406). Video encoder 20 encodes one or more syntax elements in an encoded video bitstream that define the two-dimensional vector and the residual block for prediction of the current video block.

Figure 11:
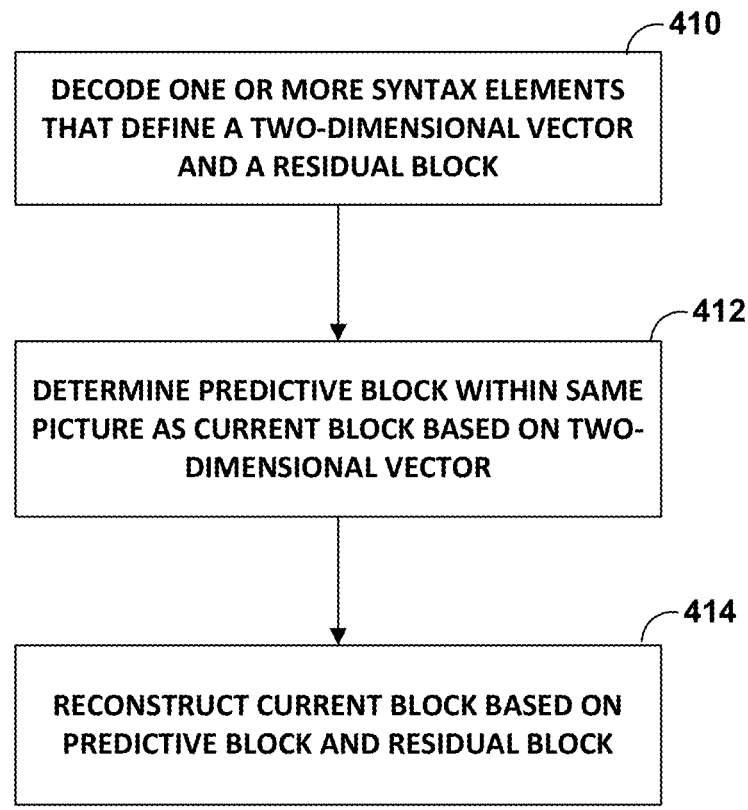
FIG. 11 is a flow diagram illustrating an example method for decoding video data including a mode for intra prediction of blocks of video data from predictive blocks of video data within the same picture.

FIG. 11 is a flow diagram illustrating an example method for decoding video data including a mode for intra prediction of blocks of video data from predictive blocks of video data within the same picture, e.g., an IntraBC mode. The example method of FIG. 11 may be performed by a video decoder, such as video decoder 30, which may include an IntraBC unit 385.

According to the example method of FIG. 11, video decoder 30 decodes one or more syntax elements from the encoded video bitstream that define a two-dimensional vector and a residual block that predict the current video block (410). Video decoder 30 determines a predictive block within the same picture as the current video block based on the two-dimensional vector (412). As described herein, the predictive block may be within an intended region defined by video encoder 20, and stored within intended region memory 392. Video decoder 30 may then reconstruct the current video block based on, e.g., based on the sum of, the predictive video block and the residual block (414).

Figure 12:
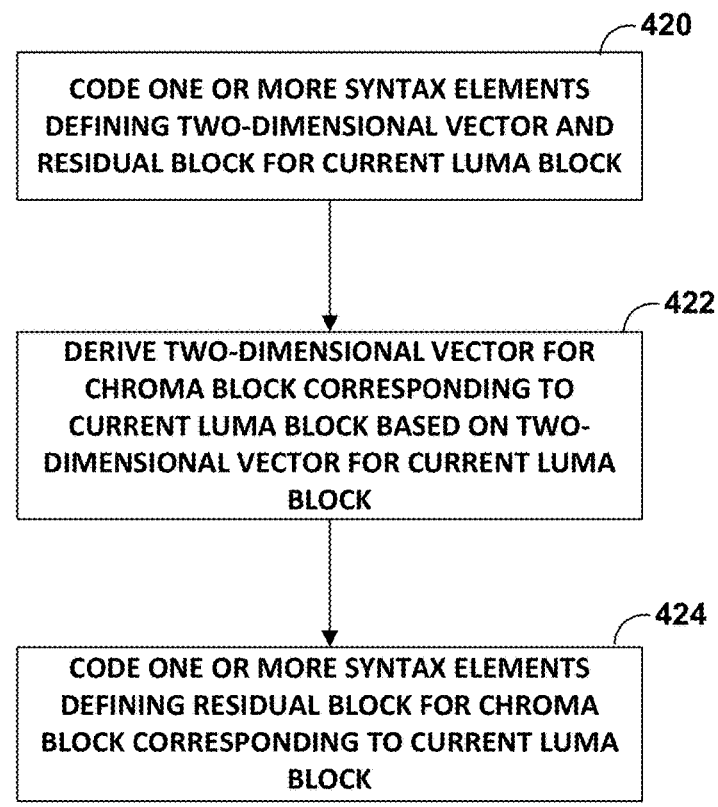
FIG. 12 is a flow diagram illustrating an example method that includes deriving a two-dimensional vector for a block of chroma video data from a two-dimensional vector of a corresponding block of luma video data.

FIG. 12 is a flow diagram illustrating an example method that includes deriving a two-dimensional vector for a block of chroma video data from a two-dimensional vector of a corresponding block of luma video data. The example method of FIG. 12 may be performed by a video coder, such as video encoder 20 and/or video decoder 30, which may include an intra BC unit, such as IntraBC unit 348 or IntraBC unit 385.

According to the example method of FIG. 12, the video coder codes, e.g., encodes or decodes, one or more syntax elements defining a two-dimensional vector and a residual block for a current luma block that is predicted according to the IntraBC mode (420). The video coder may then derive a two-dimensional vector for a chroma block corresponding to the luma block to predict the chroma block according to the IntraBC mode (422). As discussed herein, the video coder may scale or downsample the two-dimensional vector for the luma block, depending on the color format (e.g., 4:4:4, 4:2:2, or 4:2:0) of the coded video, so that the vector points to useable samples in the chroma domain. The video coder may code one or more syntax elements defining a residual block for the chroma block corresponding to the luma block (424). The video coder need not code syntax elements indicating a separate two-dimensional vector for the chroma block.

Figure 13:
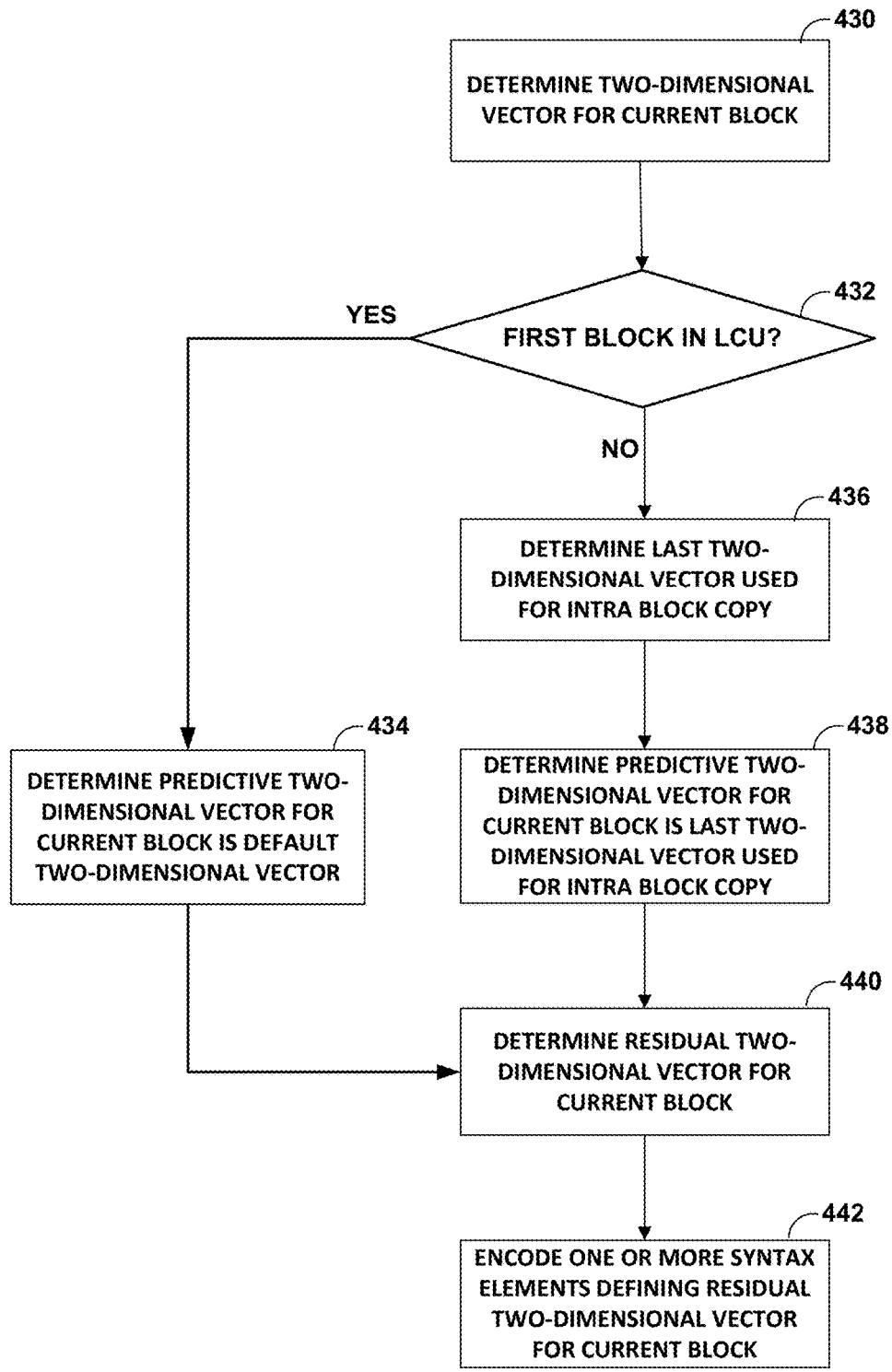
FIG. 13 is a flow diagram illustrating an example method encoding video data including a mode for intra prediction of blocks of video data from predictive blocks of video data within the same picture that includes determining predictive two-dimensional vectors.

FIG. 13 is a flow diagram illustrating an example method encoding video data including a mode for intra prediction of blocks of video data from predictive blocks of video data within the same picture, e.g., an IntraBC mode, that includes determining predictive two-dimensional vectors. The example method of FIG. 13 may be performed by a video encoder, such as video encoder 20, which may include IntraBC unit 348.

According to the example method of FIG. 13, video encoder 20 determines a two-dimensional vector, based on the predictive block selected from the intended region in the same picture as the current block, for the current video block (430). Video encoder 20 determines whether the current video block is the first block predicted with the IntraBC mode in the current LCU (432). If the current video block is the first video block (YES of 432), video encoder 20 may determine that the predictive two-dimensional vector for the current video block is a default two-dimensional vector (434). As discussed herein, an example of a default two-dimensional vector is (−w, 0), where w is the width of the current coding unit comprising the current video block.

If the current video block is not the first video block predicted with the IntraBC mode in the current LCU (NO of 432), video encoder 20 may determine the last two-dimensional vector used for prediction of a most-recently previously-predicted video block according to the IntraBC mode (436). Video encoder 20 determines the predictive vector for the current video block to be this last two-dimensional vector used for IntraBC (438). Based on the predictive two-dimensional vector, e.g., the default or last vector, video encoder 20 may determine a residual two-dimensional vector for the current video block (440). Video encoder 20 may then encode one or more syntax elements defining the residual two-dimensional vector for the current video block in the encoded video bitstream, e.g., rather than the two-dimensional vector determined for the current video block (442).

Figure 14:
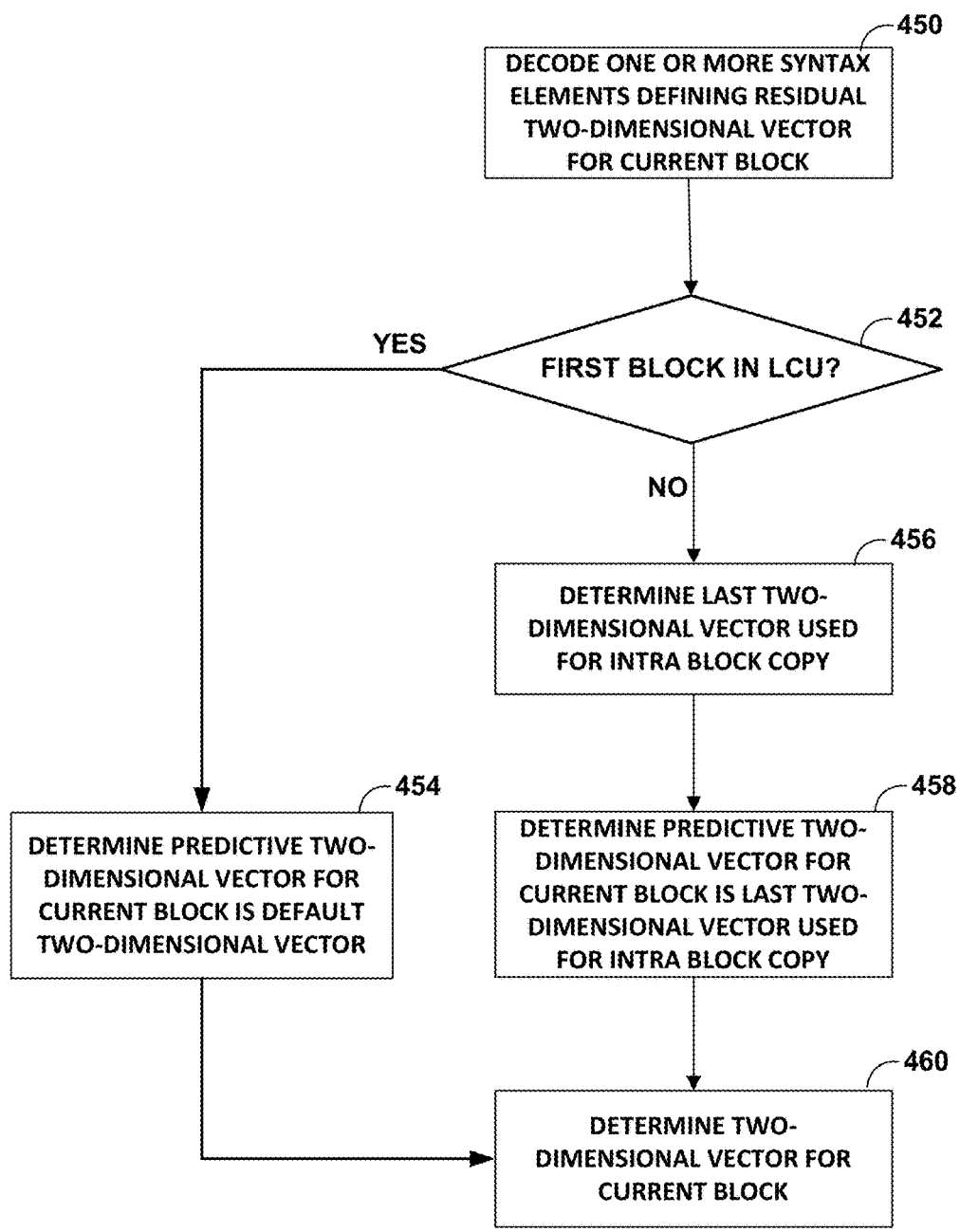
FIG. 14 is a flow diagram illustrating an example method decoding video data including a mode for intra prediction of blocks of video data from predictive blocks of video data within the same picture that includes determining predictive two-dimensional vectors.

FIG. 14 is a flow diagram illustrating an example method decoding video data including a mode for intra prediction of blocks of video data from predictive blocks of video data within the same picture that includes determining predictive two-dimensional vectors. The example method of FIG. 14 may be performed by a video decoder, such as video decoder 30, which may include IntraBC unit 385.

According to the example method of FIG. 14, video decoder 30 decodes one or more syntax elements that define a residual two-dimensional vector for the current video block from an encoded video bitstream, e.g., rather than the two-dimensional vector determined for the current video block by video encoder 20 (450). Video decoder 30 determines whether the current video block is the first block predicted with the IntraBC mode in the current LCU (452). If the current video block is the first video block (YES of 452), video decoder 30 may determine that the predictive two-dimensional vector for the current video block is a default two-dimensional vector (454).

If the current video block is not the first video block predicted with the IntraBC mode in the current LCU (NO of 452), video decoder 30 may determine the last two-dimensional vector used for prediction of a most-recently previously-predicted video block according to the IntraBC mode (456). Video decoder 30 determines the predictive vector for the current video block to be this last two-dimensional vector used for IntraBC (458). Based on the predictive two-dimensional vector, e.g., the default or last vector, and the residual two-dimensional vector, e.g., based on their sum, video decoder 30 may determine the current two-dimensional vector for the current video block (460).

Figure 15:
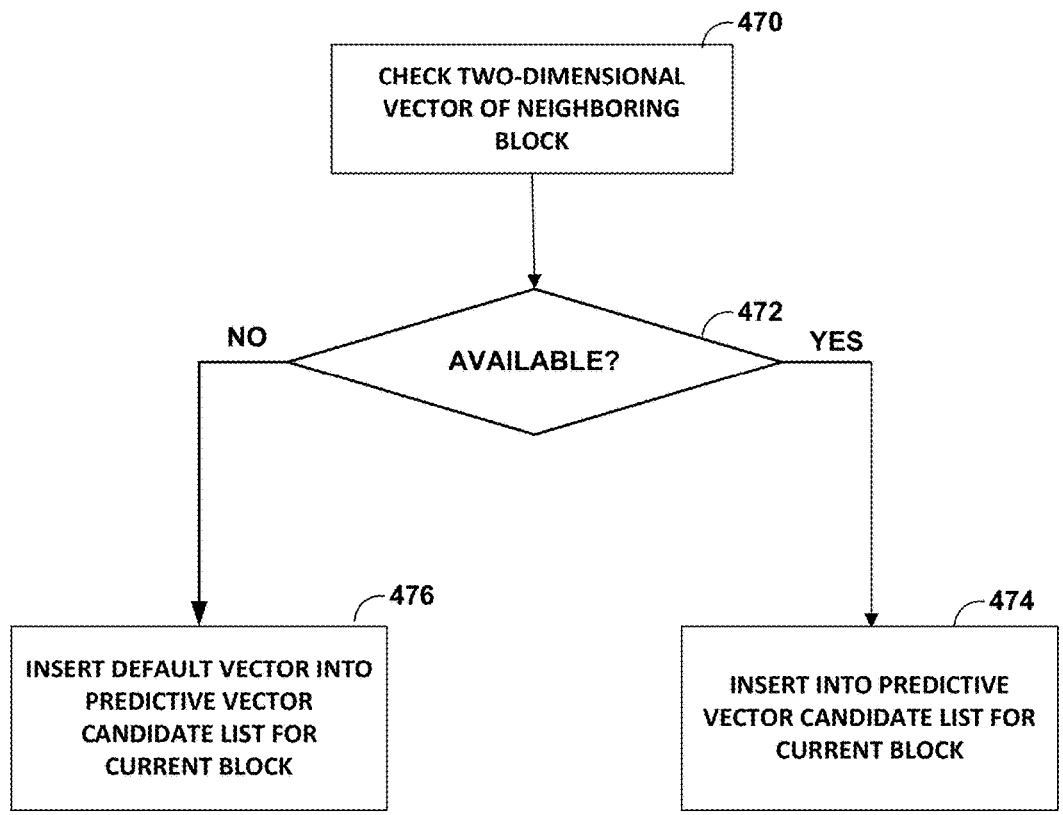
FIG. 15 is a flow diagram illustrating an example method for determining predictive two-dimensional vector candidates for a current block of video data.

FIG. 15 is a flow diagram illustrating an example method for determining predictive two-dimensional vector candidates for a current block of video data. The example method of FIG. 15 may be performed by a video coder, such as video encoder 20 and/or video decoder 30, which may include an IntraBC unit, such as IntraBC unit 348 or IntraBC unit 385.

According to the example method of FIG. 15, the video coder checks a two-dimensional vector of a neighboring block of the current video block (470), and determines whether the vector is available, e.g., whether the neighboring block was coded using IntraBC (472). If the vector is available (YES of 472), the video coder may insert the vector into a predictive vector candidate list for the current video block (474). If the vector is not available (NO of 472), the video coder may insert a default vector into the predictive candidate list for the current video block (476).

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or More processors as described above, in conjunction with suitable software and/or firmware.

Various examples have been described. These and other examples are within the scope of the following claims.

What is claimed is:

1. A method of decoding video data including a mode for intra prediction of blocks of video data from predictive blocks of video data within the same picture, the method comprising:

for a current block of video data that is a first video block in a largest coding unit, receiving, in an encoded video bitstream, one or more syntax elements that define a residual horizontal displacement component and a residual vertical displacement component of a residual two-dimensional vector;

determining a horizontal displacement component of a two-dimensional vector and a vertical displacement component of the two-dimensional vector based on the residual horizontal displacement component and the residual vertical displacement component of the residual two-dimensional vector and based on a default predictive two-dimensional vector;

determining a predictive block of video data for the current block of video data based on the horizontal displacement component and the vertical displacement component of the two-dimensional vector, wherein the predictive block of video data is one of a plurality of reconstructed blocks of video data within an intended region within the same picture as the current block of video data, and wherein the intended region comprises a limited set of the plurality of reconstructed blocks of video data, and the predictive block of video data is within the intended region, wherein the intended region is limited to the limited set of the plurality of reconstructed blocks of video data within the same picture that have not been in-loop filtered; and reconstructing the current block of video data by adding the predictive block of video data to the residual block.

2. The method of claim 1, wherein the horizontal displacement component and the vertical displacement component of the two-dimensional vector are constrained to have integer pixel resolution.

3. The method of claim 2, wherein the current block of video data and the predictive block of video data comprise blocks of a luma component of the video data.

4. The method of claim 2, wherein the current block of video data and the predictive block of video data comprise blocks of a chroma component of the video data.

5. The method of claim 1, wherein at least one of a height or a width of the intended region are defined based on a size of the largest coding unit.

6. The method of claim 5, wherein the height of the intended region is defined based on a height of the largest coding unit.

7. The method of claim 1, wherein at least one of a height or a width of the intended region is defined based on an integer number of samples.

8. The method of claim 7, wherein the width of the intended region is defined based on the integer number of samples.

9. The method of claim 8, wherein the integer number of samples is 64.

10. The method of claim 1, wherein at least one of a height or a width of the intended region is constrained such that the intended region is within at least one of the largest coding unit and a left neighboring largest coding unit of the largest coding unit.

11. The method of claim 1, wherein decoding the syntax elements comprises decoding syntax elements encoded with values truncated based on a size of the intended region.

12. The method of claim 1, wherein the default predictive two-dimensional vector comprises (−w, 0), wherein w comprises a width of a current coding unit comprising the current video block.

13. The method of claim 1, wherein previously-determined vectors of neighboring blocks not used to determine a predictive block of video data within the same picture as the current block of video data according to the mode for intra prediction of blocks of video data from predictive blocks of video data within the same picture are unavailable as predictive two-dimensional vectors for the current block of video data.

14. The method of claim 1, wherein the current block of video data comprises a prediction unit of a coding unit.

15. The method of claim 14, wherein a size of the coding unit is 2N×2N, and a size of the prediction unit is one of N×N, 2N×2N, 2N×N, or N×2N.

16. The method of claim 1, wherein the current block of video data comprises a current block of a luma component of the video data and the two-dimensional vector comprises a two-dimensional vector for the luma component, the method further comprising deriving a two-dimensional vector for a block of a chroma component of the video data that corresponds to the current block of the luma component based on the two-dimensional vector for the luma component and a color sampling format for the video data.

17. The method of claim 1, further comprising determining a size of the current block of video data, wherein receiving the one or more syntax elements, determining the predictive block, and reconstructing the current block of video data according to the mode for intra prediction of blocks of video data from predictive blocks of video data within the same picture comprises receiving the one or more syntax elements, determining the predictive block, and reconstructing the current block of video data according to the mode for intra prediction of blocks of video data from predictive blocks of video data within the same picture only when the size of the current block meets a size criteria.

18. The method of claim 17, wherein the size criteria comprises a minimum size.

19. The method of claim 1, further comprising decoding a flag that indicates whether the current block of video data is predicted using the mode for intra prediction of blocks of video data from predictive blocks of video data within the same picture,
wherein receiving the one or more syntax elements, determining the predictive block, and reconstructing the current block of video data according to the mode for intra prediction of blocks of video data from predictive blocks of video data within the same picture comprises receiving the one or more syntax elements, determining the predictive block, and reconstructing the current block of video data according to the mode for intra prediction of blocks of video data from predictive blocks of video data within the same picture in response to the flag indicating that the current block of video data is predicted using the mode for intra prediction of blocks of video data from predictive blocks of video data within the same picture,
wherein decoding the flag comprises arithmetic decoding the flag with a single, fixed context.

20. The method of claim 1, further comprising applying an intra-prediction mode deblocking filter to the current block of video data.

21. A method of encoding video data including a mode for intra prediction of blocks of video data from predictive blocks of video data within the same picture, the method comprising:
for a current block of video data that is a first video block in a largest coding unit, defining an intended region within the same picture as the current block of video data, the intended region comprising a set of previously encoded blocks of video data within the same picture as the current block of video data, wherein the set of previously encoded blocks comprises a plurality of reconstructed blocks of video data within the same picture that have not been in-loop filtered;
selecting a predictive block of video data for the current block of video data from the set of previously encoded blocks of video data within the intended region within the same picture as the current block of video data;
determining a two-dimensional vector, wherein the two-dimensional vector has a horizontal displacement component and a vertical displacement component, wherein the horizontal displacement component represents a horizontal displacement between the predictive block of video data and the current block of video data and the vertical displacement component represents a vertical displacement between the predictive block of video data and the current block of video data;
determining a residual horizontal displacement component and a residual vertical displacement component based on a difference between the two-dimensional vector and a default predictive two-dimensional vector;
determining a residual block by determining a difference between the current block of video data and the predictive block of video data; and
encoding, in an encoded video bitstream, one or more syntax elements that define the residual horizontal displacement component and the residual vertical displacement component of the two-dimensional vector and the residual block.

22. The method of claim 21, wherein selecting the predictive block of video data comprises constraining the horizontal displacement component and the vertical displacement component of the two-dimensional vector to have integer pixel resolution.

23. The method of claim 22, wherein the current block of video data and the predictive block of video data comprise blocks of a luma component of the video data.

24. The method of claim 22, wherein the current block of video data and the predictive block of video data comprise blocks of a chroma component of the video data.

25. The method of claim 21, wherein the current block of video data is located within a largest coding unit, and defining the intended region comprises defining the intended region based on a size of the largest coding unit.

26. The method of claim 25, wherein defining the intended region based on the size of the largest coding unit comprises defining a height of the intended region based on a height of the largest coding unit.

27. The method of claim 21, wherein defining the intended region comprises defining at least one of a height or a width of the intended region based on an integer number of samples.

28. The method of claim 27, wherein defining the size of the intended region to an integer number of samples comprises defining a width of the intended region based on integer number of samples.

29. The method of claim 28, wherein the integer number of samples is 64.

30. The method of claim 21, wherein the current block of video data is located within a largest coding unit, wherein defining the intended region comprises defining the intended region to be within at least one of the largest coding unit and a left neighboring largest coding unit of the largest coding unit.

31. The method of claim 21, wherein encoding the syntax elements comprises encoding syntax elements with values truncated based on a size of the intended region.

32. The method of claim 21, wherein the default predictive two-dimensional vector comprises (−w, 0), wherein w comprises a width of a current coding unit comprising the current video block.

33. The method of claim 21, wherein previously-determined vectors of neighboring blocks not used to determine a predictive block of video data within the same picture as the current block of video data according to the mode for intra prediction of blocks of video data from predictive blocks of video data within the same picture are unavailable as predictive two-dimensional vectors for the current block of video data.

34. The method of claim 21, wherein the current block of video data comprises a prediction unit of a coding unit.

35. The method of claim 34, wherein a size of the coding unit is 2N×2N, and a size of the prediction unit is one of N×N, 2N×2N, 2N×N, or N×2N.

36. The method of claim 21, wherein the current block of video data comprises a current block of a luma component of the video data and the two-dimensional vector comprises a two-dimensional vector for the luma component, the method further comprising deriving a two-dimensional vector for a block of a chroma component of the video data that corresponds to the current block of the luma component based on the two-dimensional vector for the luma component and a color sampling format for the video data.

37. The method of claim 21, further comprising determining a size of the current block of video data, wherein selecting the predictive block, determining the two-dimensional vector, determining the residual block, and encoding the one or more syntax elements according to the mode for intra prediction of blocks of video data from predictive blocks of video data within the same picture comprises selecting the predictive block, determining the two-dimensional vector, determining the residual block, and encoding the one or more syntax elements according to the mode for intra prediction of blocks of video data from predictive blocks of video data within the same picture only when the size of the current block meets a size criteria.

38. The method of claim 37, wherein the size criteria comprises a minimum size.

39. The method of claim 21, further comprising encoding a flag that indicates whether the current block of video data is predicted using the mode for intra prediction of blocks of video data from predictive blocks of video data within the same picture, wherein encoding the flag comprises arithmetic encoding the flag with a single, fixed context.

40. The method of claim 21, further comprising applying an intra-prediction mode deblocking filter to the current block of video data.

41. A device comprising a video decoder configured to decode video data using a mode for intra prediction of blocks of video data from predictive blocks of video data within the same picture, wherein the video decoder comprises:

a memory configured to store video data; and
one or more processors configured to:
for a current block of the video data that is a first video block in a largest coding unit, receiving, in an encoded video bitstream, one or more syntax elements that define a residual horizontal displacement component and a residual vertical displacement component of a residual two-dimensional vector;
determining a horizontal displacement component of a two-dimensional vector and a vertical displacement component of the two-dimensional vector based on the residual horizontal displacement component and the residual vertical displacement component of the residual two-dimensional vector and based on a default predictive two-dimensional vector;
determine a predictive block of video data for the current block of video data based on the decoded syntax elements that define the horizontal displacement component and the vertical displacement component of the two-dimensional vector, wherein the predictive block of video data is one of a plurality of reconstructed blocks of video data within an intended region within the same picture as the current block of video data, wherein the intended region comprises a limited set of the plurality of reconstructed blocks of video data, and the predictive block of video data is within the intended region, wherein the intended region is limited to the limited set of the plurality of reconstructed blocks of video data within the same picture that have not been in-loop filtered; and
reconstruct the current block of video data by adding the predictive block of video data to the residual block.

42. The device of claim 41, wherein the horizontal displacement component and the vertical displacement component of the two-dimensional vector are constrained to have integer pixel resolution.

43. The device of claim 42, wherein the current block of video data and the predictive block of video data comprise blocks of a luma component of the video data.

44. The device of claim 42, wherein the current block of video data and the predictive block of video data comprise blocks of a chroma component of the video data.

45. The device of claim 41, wherein the current block of video data is located within a largest coding unit, and at least one of a height or a width of the intended region are defined based on a size of the largest coding unit.

46. The device of claim 45, wherein the height of the intended region is defined based on a height of the largest coding unit.

47. The device of claim 41, wherein at least one of a height or a width of the intended region is defined based on an integer number of samples.

48. The device of claim 47, wherein the width of the intended region is defined based on the integer number of samples.

49. The device of claim 48, wherein the integer number of samples is 64.

50. The device of claim 41, wherein the current block of video data is located within a largest coding unit, and at least one of a height or a width of the intended region is constrained such that the intended region is within at least one of the largest coding unit and a left neighboring largest coding unit of the largest coding unit.

51. The device of claim 41, wherein the one or more processors are configured to decode the syntax elements when the syntax elements are encoded with values truncated based on a size of the intended region.

52. The device of claim 41, wherein the default predictive two-dimensional vector comprises (−w, 0), wherein w comprises a width of a current coding unit comprising the current video block.

53. The device of claim 41, wherein previously-determined vectors of neighboring blocks not used to determine a predictive block of video data within the same picture as the current block of video data according to the mode for intra prediction of blocks of video data from predictive blocks of video data within the same picture are unavailable as predictive two-dimensional vectors for the current block of video data.

54. The device of claim 41, wherein the current block of video data comprises a prediction unit of a coding unit.

55. The device of claim 54, wherein a size of the coding unit is 2N×2N, and a size of the prediction unit is one of N×N, 2N×2N, 2N×N, or N×2N.

56. The device of claim 41, wherein the current block of video data comprises a current block of a luma component of the video data and the two-dimensional vector comprises a two-dimensional vector for the luma component, and the one or more processors are configured to derive a two-dimensional vector for a block of a chroma component of the video data that corresponds to the current block of the luma component based on the two-dimensional vector for the luma component and a color sampling format for the video data.

57. The device of claim 41, wherein the one or more processors are configured to:
  determine a size of the current block of video data; and
  decode the one or more syntax elements, determine the predictive block, and reconstruct the current block of video data according to the mode for intra prediction of blocks of video data from predictive blocks of video data within the same picture only when the size of the current block meets a size criteria.

58. The device of claim 57, wherein the size criteria comprises a minimum size.

59. The device of claim 41, wherein the encoded video bitstream includes a flag that indicates whether the current block of video data is predicted using the mode for intra prediction of blocks of video data from predictive blocks of video data within the same picture, and wherein the one or more processors are configured to:
  arithmetic decode the flag with a single, fixed context; and
  decode the one or more syntax elements, determine the predictive block, and reconstruct the current block of video data according to the mode for intra prediction of blocks of video data from predictive blocks of video data within the same picture in response to the flag indicating that the current block of video data is predicted using the mode for intra prediction of blocks of video data from predictive blocks of video data within the same picture.

60. The device of claim 41, wherein the one or more processors are configured to apply an intra-prediction mode deblocking filter to the current block of video data.

61. The device of claim 41, wherein the device comprises one of:
  a microprocessor;
  an integrated circuit (IC); and
  a wireless communication device comprising the video decoder.

62. A device comprising a video encoder configured to encode video data using a mode for intra prediction of blocks of video data from predictive blocks of video data within the same picture, wherein the video encoder comprises:
  a memory configured to store an encoded video bitstream; and
  one or more processors configured to:
    for a current block of video data that is a first video block in a largest coding unit, define an intended region within the same picture as the current block of video data, the intended region comprising a set of previously encoded blocks of video data within the same picture as the current block of video data, wherein the set of previously encoded blocks comprises a plurality of reconstructed blocks of video data within the same picture that have not been in-loop filtered;
    select a predictive block of video data for the current block of video data from the set of previously encoded blocks of video data within the intended region within the same picture as the current block of video data;
    determine a two-dimensional vector, wherein the two-dimensional vector has a horizontal displacement component and a vertical displacement component, wherein the horizontal displacement component represents a horizontal displacement between the predictive block of video data and the current block of video data and the vertical displacement component represents a vertical displacement between the predictive block of video data and the current block of video data;
    determine a residual horizontal displacement component and a residual vertical displacement component based on a difference between the two-dimensional vector and a default predictive two-dimensional vector;
    determine a residual block by determining a difference between the current block of video data and the predictive block of video data; and
    encode, in the encoded video bitstream, one or more syntax elements that define the residual horizontal displacement component and the residual vertical displacement component of the two-dimensional vector and the residual block.

63. The device of claim 62, wherein the one or more processors are configured to constrain the horizontal displacement component and the vertical displacement component of the two-dimensional vector to have integer pixel resolution.

64. The device of claim 63, wherein the current block of video data and the predictive block of video data comprise blocks of a luma component of the video data.

65. The device of claim 63, wherein the current block of video data and the predictive block of video data comprise blocks of a chroma component of the video data.

66. The device of claim 62, wherein the current block of video data is located within a largest coding unit, and the one or more processors are configured to define the intended region based on a size of the largest coding unit.

67. The device of claim 66, wherein the one or more processors are configured to define a height of the intended region based on a height of the largest coding unit.

68. The device of claim 62, wherein the one or more processors are configured to define at least one of a height or a width of the intended region based on an integer number of samples.

69. The device of claim 68, wherein the one or more processors are configured to define a width of the intended region based on the integer number of samples.

70. The device of claim 69, wherein the integer number of samples is 64.

71. The device of claim 62, wherein the current block of video data is located within a largest coding unit, wherein the one or more processors are configured to define the intended region to be within at least one of the largest coding unit and a left neighboring largest coding unit of the largest coding unit.

72. The device of claim 62, wherein the one or more processors are configured to encode the syntax elements with values truncated based on a size of the intended region.

73. The device of claim 62, wherein the default predictive two-dimensional vector comprises (−w, 0), wherein w comprises a width of a current coding unit comprising the current video block.

74. The device of claim 62, wherein previously-determined vectors of neighboring blocks not used to determine a predictive block of video data within the same picture as the current block of video data according to the mode for intra prediction of blocks of video data from predictive blocks of video data within the same picture are unavailable as predictive two-dimensional vectors for the current block of video data.

75. The device of claim 62, wherein the current block of video data comprises a prediction unit of a coding unit.

76. The device of claim 75, wherein a size of the coding unit is 2N×2N, and a size of the prediction unit is one of N×N, 2N×2N, 2N×N, or N×2N.

77. The device of claim 62, wherein the current block of video data comprises a current block of a luma component of the video data and the two-dimensional vector comprises a two-dimensional vector for the luma component, and the one or more processors are configured to derive a two-dimensional vector for a block of a chroma component of the video data that corresponds to the current block of the luma component based on the two-dimensional vector for the luma component and a color sampling format for the video data.

78. The device of claim 62, wherein the one or more processors are configured to:
determine a size of the current block of video data; and
select the predictive block, determine the two-dimensional vector, determine the residual block, and encode the one or more syntax elements according to the mode for intra prediction of blocks of video data from predictive blocks of video data within the same picture only when the size of the current block meets a size criteria.

79. The device of claim 78, wherein the size criteria comprises a minimum size.

80. The device of claim 62, wherein the one or more processors are configured to arithmetic encode a flag that indicates whether the current block of video data is predicted using the mode for intra prediction of blocks of video data from predictive blocks of video data within the same picture with a single, fixed context.

81. The device of claim 62, wherein the one or more processors are configured to apply an intra-prediction mode deblocking filter to the current block of video data.

82. The device of claim 62, wherein the device comprises one of:
a microprocessor;
an integrated circuit (IC); and
a wireless communication device comprising the video encoder.

83. A device comprising a video coder configured to code video data using a mode for intra prediction of blocks of video data from predictive blocks of video data within the same picture, wherein the video coder comprises:
means for coding a video bitstream that includes one or more syntax elements that define a residual horizontal displacement component and a residual vertical displacement component of a two-dimensional vector and a residual block for a current block of video data that is a first video block in a largest coding unit; and
means for determining a predictive block of video data for the current block of video data;
means for determining a horizontal displacement component of a two-dimensional vector and a vertical displacement component of the two-dimensional vector based on the residual horizontal displacement component and the residual vertical displacement component of a residual two-dimensional vector and based on a default predictive two-dimensional vector, wherein the horizontal displacement component of the two-dimensional vector represents a horizontal displacement between the predictive block of video data and the current block of video data and the vertical displacement component of the two-dimensional vector represents a vertical displacement between the predictive block of video data and the current block of video data,
wherein the predictive block of video data is one of a plurality of reconstructed blocks of video data within an intended region within the same picture as the current block of video data, and wherein the intended region comprises a limited set of the plurality of reconstructed blocks of video data, and the predictive block of video data is within the intended region, wherein the intended region is limited to the limited set of the plurality of reconstructed blocks of video data within the same picture that have not been in-loop filtered, and
wherein the residual block represents a difference between the current block of video data and the predictive block of video data.

84. A non-transitory computer-readable storage medium having stored thereon instructions for coding video data including a mode for intra prediction of blocks of video data from predictive blocks of video data within the same picture that, when executed, cause one or more processors to:
code a video bitstream that includes one or more syntax elements that define a residual horizontal displacement component and a residual vertical displacement component of a two-dimensional vector and a residual block for a current block of video data that is a first video block in a largest coding unit; and
determine a predictive block of video data for the current block of video data;
determine a horizontal displacement component of a two-dimensional vector and a vertical displacement component of the two-dimensional vector based on the residual horizontal displacement component and the residual vertical displacement component of a residual two-dimensional vector and based on a default predictive two-dimensional vector, wherein the horizontal displacement component of the two-dimensional vector represents a horizontal displacement between the predictive block of video data and the current block of video data and the vertical displacement component of the two-dimensional vector represents a vertical displacement between the predictive block of video data and the current block of video data, wherein the predictive block of video data is one of a plurality of reconstructed blocks of video data within an intended region within the same picture as the current block of video data, wherein the intended region comprises a limited set of the plurality of reconstructed blocks of video data, and the predictive block of video data is within the intended region, wherein the intended region is limited to the limited set of the plurality of reconstructed blocks of video data within the same picture that have not been in-loop filtered, and wherein the residual block represents a difference between the current block of video data and the predictive block of video data.

* * * * *